US012788656B2

(12) United States Patent
Gwinn et al.

(10) Patent No.: US 12,788,656 B2
(45) Date of Patent: Nov. 10, 2026

(54) ADOLESCENT IDIOPATHIC SCOLIOSIS PATIENT POSITIONING SYSTEM

(71) Applicant: Alphatec Spine, Inc., Carlsbad, CA (US)

(72) Inventors: William Gwinn, San Diego, CA (US); Aaron Shein, El Cajon, CA (US); Andrew Rajek, Escondido, CA (US); Thomas Hackathorn, Vista, CA (US); Aaron Brinker, Carlsbad, CA (US); Christopher Khoury, Folsom, CA (US); Ethan Padgett, Carlsbad, CA (US); Maximilian Garcia, Los Angeles, CA (US); Alexis Fiechtner, Carlsbad, CA (US)

(73) Assignee: Alphatec Spine, Inc., Carlsbad, CA (US)

( * ) Notice: Subject to any disclaimer, the term of this patent is extended or adjusted under 35 U.S.C. 154(b) by 0 days.

(21) Appl. No.: 18/940,764

(22) Filed: Nov. 7, 2024

(65) Prior Publication Data

US 2025/0152444 A1 May 15, 2025

Related U.S. Application Data

(60) Provisional application No. 63/547,987, filed on Nov. 9, 2023.

(51) Int. Cl.
*A61G 13/12* (2006.01)
*A61G 13/00* (2006.01)

(52) U.S. Cl.
CPC ........ *A61G 13/0054* (2016.11); *A61G 13/122* (2013.01); *A61G 13/123* (2013.01);
(Continued)

(58) Field of Classification Search
CPC .............. A61G 13/0054; A61G 13/122; A61G 13/123; A61G 13/128; A61G 13/1285; A61G 13/129; A61G 13/1295
See application file for complete search history.

(56) References Cited

U.S. PATENT DOCUMENTS

| | | | |
|---|---|---|---|
| 1,830,071 | A | 11/1931 | Patton |
| 2,691,979 | A | 10/1954 | Watson |

(Continued)

FOREIGN PATENT DOCUMENTS

| | | | |
|---|---|---|---|
| CA | 2962567 | A1 | 3/2016 |
| CN | 202342383 | U | 7/2012 |

(Continued)

OTHER PUBLICATIONS

International Searching Authority, "International Search Report and Written Opinion" for PCT Application No. PCT/US2024/055004, Jan. 24, 2025.

(Continued)

*Primary Examiner* — Keri J Nelson
(74) *Attorney, Agent, or Firm* — Dentons Durham Jones Pinegar; Sarah W. Matthews

(57) ABSTRACT

A patient positioning system includes a thoracic bolster assembly and a pelvic bolster assembly, each of which may be comprise of a base having a lower portion and an upper portion, the upper portion in rotatable connection with the lower portion to adjust the upper portion in a coronal plane. The thoracic bolster assembly may also include a top patient support portion pivotably connected to the base, with a vertical adjustment mechanism in connection with the base and the top patient support portion to allow the top patient support portion to be adjusted vertically relative to the base to adjust kyphosis of a patient.

20 Claims, 62 Drawing Sheets

(52) U.S. Cl.
CPC ........ *A61G 13/129* (2013.01); *A61G 2200/14* (2013.01); *A61G 2200/325* (2013.01)

(56) References Cited

U.S. PATENT DOCUMENTS

| | | | |
|---|---|---|---|
| 3,823,709 A | 7/1974 | Mcguire | |
| 5,079,789 A | 1/1992 | Jandrakovic | |
| 5,088,706 A | 2/1992 | Jackson | |
| 5,131,106 A | 7/1992 | Jackson | |
| 5,311,622 A | 5/1994 | Allen | |
| 5,390,383 A | 2/1995 | Carn | |
| 5,422,928 A | 6/1995 | Payne | |
| D390,958 S | 2/1998 | Lathrop | |
| 5,724,970 A | 3/1998 | Votruba et al. | |
| 5,758,647 A | 6/1998 | Cummins | |
| 6,003,176 A | 12/1999 | Wasley et al. | |
| 6,076,525 A | 6/2000 | Hoffman | |
| 6,260,220 B1 | 7/2001 | Lamb et al. | |
| 6,311,349 B1 | 11/2001 | Kazakia et al. | |
| 6,374,438 B1 | 4/2002 | Fox et al. | |
| 6,934,987 B2 | 8/2005 | Newkirk et al. | |
| 6,941,951 B2 | 9/2005 | Hubert et al. | |
| 7,120,954 B2 | 10/2006 | Traut et al. | |
| 7,185,656 B2 | 3/2007 | Wakhloo et al. | |
| 7,189,214 B1 | 3/2007 | Saunders | |
| 7,600,281 B2 | 10/2009 | Skripps | |
| 8,099,808 B1 | 1/2012 | Mckeon | |
| 8,118,029 B2 | 2/2012 | Gneiting et al. | |
| 8,234,730 B2 | 8/2012 | Skripps | |
| 8,286,283 B2 | 10/2012 | Copeland et al. | |
| D676,971 S | 2/2013 | Sharps | |
| 8,635,725 B2 | 1/2014 | Tannoury et al. | |
| 8,707,476 B2 | 4/2014 | Sharps | |
| 8,973,188 B1 * | 3/2015 | Amini | A61G 9/003 5/604 |
| 9,072,646 B2 | 7/2015 | Skripps et al. | |
| 9,168,009 B2 | 10/2015 | Lee | |
| 9,192,534 B2 | 11/2015 | Coppens et al. | |
| 9,254,217 B2 | 2/2016 | Zacharopoulos et al. | |
| 9,339,430 B2 | 5/2016 | Jackson et al. | |
| 9,446,260 B2 | 9/2016 | Jagger | |
| 9,498,397 B2 | 11/2016 | Hight et al. | |
| 9,522,078 B2 | 12/2016 | Pizzini | |
| 9,554,959 B2 | 1/2017 | Carn | |
| 9,622,928 B2 | 4/2017 | Jackson et al. | |
| 9,750,657 B2 | 9/2017 | Drake | |
| 9,937,006 B2 | 4/2018 | Skripps et al. | |
| 10,045,768 B2 | 8/2018 | Garcia-Bengochea et al. | |
| 10,314,758 B2 | 6/2019 | Dolliver | |
| 10,335,097 B2 | 7/2019 | Kaiser et al. | |
| 10,335,338 B2 | 7/2019 | Nichols et al. | |
| 10,426,684 B2 | 10/2019 | Dubois et al. | |
| 10,729,607 B2 | 8/2020 | Jackson et al. | |
| 10,751,240 B2 | 8/2020 | Lim et al. | |
| 10,813,807 B2 | 10/2020 | Bartley | |
| 10,835,438 B2 | 11/2020 | Jackson | |
| 10,835,439 B2 | 11/2020 | Lim et al. | |
| 10,849,809 B2 | 12/2020 | Lim et al. | |
| 10,869,798 B2 | 12/2020 | Jackson et al. | |
| 10,874,570 B2 | 12/2020 | Lim et al. | |
| 10,881,566 B2 | 1/2021 | Jackson | |
| 10,881,570 B2 | 1/2021 | Lim et al. | |
| 10,888,484 B2 | 1/2021 | Lim et al. | |
| 10,893,996 B2 | 1/2021 | Lim et al. | |
| 10,900,448 B2 | 1/2021 | Lim et al. | |
| 11,013,570 B2 | 5/2021 | Skripps et al. | |
| 2004/0133979 A1 | 7/2004 | Newkirk et al. | |
| 2006/0123546 A1 | 6/2006 | Horton et al. | |
| 2006/0162076 A1 | 7/2006 | Bartlett et al. | |
| 2006/0248650 A1 | 11/2006 | Skripps | |
| 2009/0199339 A1 | 8/2009 | Barr | |
| 2010/0192300 A1 | 8/2010 | Tannoury et al. | |
| 2014/0137327 A1 | 5/2014 | Tannoury | |
| 2016/0000621 A1 | 1/2016 | Jackson et al. | |
| 2016/0151224 A1 | 6/2016 | Ferro et al. | |
| 2016/0193098 A1 | 7/2016 | Nichols et al. | |
| 2016/0193099 A1 | 7/2016 | Drake | |
| 2016/0331613 A1 | 11/2016 | Lee et al. | |
| 2017/0112698 A1 | 4/2017 | Hight et al. | |
| 2017/0319411 A1 | 11/2017 | Jackson | |
| 2018/0011689 A1 | 1/2018 | Motamedi et al. | |
| 2018/0221229 A1 | 8/2018 | Kaiser et al. | |
| 2019/0000707 A1 | 1/2019 | Lim et al. | |
| 2019/0117488 A1 | 4/2019 | Ebara | |
| 2019/0209409 A1 | 7/2019 | Jackson | |
| 2019/0281984 A1 * | 9/2019 | Richardson | A47C 9/02 |
| 2020/0281787 A1 | 9/2020 | Ruiz | |
| 2020/0281788 A1 | 9/2020 | Lim et al. | |
| 2020/0281789 A1 | 9/2020 | Jackson | |
| 2020/0297568 A1 | 9/2020 | Lim et al. | |
| 2020/0315892 A1 | 10/2020 | Jackson | |
| 2020/0330309 A1 | 10/2020 | Jackson et al. | |
| 2020/0330310 A1 | 10/2020 | Jackson et al. | |
| 2020/0337923 A1 | 10/2020 | Lim | |
| 2020/0337926 A1 | 10/2020 | Lim et al. | |
| 2020/0337927 A1 | 10/2020 | Lim et al. | |
| 2020/0337929 A1 | 10/2020 | Lim | |
| 2020/0360214 A1 | 11/2020 | Lim et al. | |
| 2021/0015693 A1 | 1/2021 | Lim | |
| 2021/0113395 A1 | 4/2021 | Viveros Hudin et al. | |
| 2021/0236369 A1 | 8/2021 | Lee et al. | |
| 2022/0040021 A1 * | 2/2022 | Ebara | A61G 13/1295 |
| 2022/0125396 A1 | 4/2022 | Lim et al. | |
| 2022/0280367 A1 * | 9/2022 | Diodato | A61G 13/1265 |

FOREIGN PATENT DOCUMENTS

| | | |
|---|---|---|
| CN | 213788296 U | 7/2021 |
| DE | 102009034613 A1 | 2/2011 |
| DE | 202013100213 U1 | 3/2013 |
| EP | 1163881 B1 | 3/2006 |
| EP | 1219276 B1 | 8/2006 |
| EP | 1874255 B1 | 2/2014 |
| FR | 2814941 A1 | 4/2002 |
| JP | 4083129 B2 | 4/2008 |
| JP | 5311235 B2 | 10/2013 |
| WO | 2005034827 A1 | 4/2005 |
| WO | 2009076483 A1 | 6/2009 |
| WO | 2013058806 A1 | 4/2013 |
| WO | 2014193739 A1 | 12/2014 |
| WO | 2017183632 A1 | 10/2017 |
| WO | 2021158488 A1 | 8/2021 |

OTHER PUBLICATIONS

Australian Patent Office, "First Examination Report," Australian Application No. 2021215729, Sep. 6, 2023.
EPO acting as International Searching Authority, "International Search Report and Written Opinion," for international application No. PCT/US2024/023746, mailed Jul. 9, 2024.
European Patent Office, "Extended European Search Report," European Application No. 21750233, Jan. 29, 2024.
International Bureau, "Notification Concerning International Preliminary Report on Patentability," for International Application No. PCT/US2021/016095, issued Jul. 28, 2022, mailed Aug. 18, 2022.
USPTO acting as International Searching Authority, "International Search Report and Written Opinion," for international application No. PCT/US2021/016095, mailed Apr. 8, 2021.
IP Australia, "Examination Report No. 2," Australian Patent Application No. 2024260506, Aug. 31, 2026.
IP Australia, "Examination Report No. 1," Australian Patent Application No. 2024260506, Jun. 23, 2026.

* cited by examiner

ADOLESCENT IDIOPATHIC SCOLIOSIS PATIENT POSITIONING SYSTEM

CROSS REFERENCE TO RELATED APPLICATION

A claim for priority to the Nov. 9, 2023 filing date of U.S. Provisional Patent Application No. 63/547,987, titled ADOLESCENT IDIOPATHIC SCOLIOSIS PATIENT POSITIONING SYSTEM ("the '987 Provisional Application"), is hereby made pursuant to 35 U.S.C. § 119(e). The entire disclosure of the '987 Provisional Application is hereby incorporated herein.

TECHNICAL FIELD

The present disclosure relates generally to a patient positioning system which may be used to position and/or manipulate a patient during spine surgery. More specifically, the present disclosure relates to a patient positioning system that may be used during surgery to correct adolescent idiopathic scoliosis.

RELATED ART

Scoliosis is a condition characterized by sideways curvature of the spine or back bone, often noted during growth spurts just before a child attains puberty, usually in the thoracic or thoracolumbar region. Adolescent idiopathic scoliosis (AIS) can affect children between ages 10 and 16, and typically becomes most severe during growth spurts that occur as the body is developing.

Spinal surgery may be used to treat various types of AIS. Various approaches may be taken by a surgeon for spinal surgery, including from the back (posterior), front (anterior), and side (lateral).

SUMMARY

According to one aspect, a patient positioning system comprises a thoracic bolster assembly that includes a base comprised of a lower portion and an upper portion. The upper portion may be in rotatable connection with the lower portion to adjust the upper portion in a coronal plane. The thoracic bolster assembly can also include a top patient support portion pivotably connected to the base, with a vertical adjustment mechanism in connection with the base and the top patient support portion to allow the top patient support portion to be adjusted vertically relative to the base.

According to another aspect, a removably attachable arm may be in connection with the top patient support portion, the removably attachable arm being adjustable. In some configurations, the removably attachable arm is used to put pressure on a rib hump of a patient, and the arm may be adjustable at at least two points.

The patient support system can also include a pelvic bolster assembly comprising a base comprised of a lower portion and an upper portion, the upper portion in rotatable connection with the lower portion to adjust the base in a coronal plane.

According to another aspect, the top patient support portion is comprised of a base plate and a top plate, the top patient support portion pivotably connected to the base.

The patient positioning system can also include a thoracic lateral paddle in connection with the thoracic bolster assembly.

According to another aspect, the pelvic bolster assembly can include one or more lateral pelvic paddles. In some configurations, at least one of the thoracic lateral paddle, first lateral pelvic paddle, and second lateral pelvic paddle are removable. The lateral pelvic paddle(s) further comprise a deformable pad removably attached thereto.

According to yet another aspect, the lateral pelvic paddle(s) may comprise a shaped paddle that forms an opening for pelvic access.

According to another aspect, the thoracic bolster assembly further comprises a head support coupled to the top patient support portion. In some configurations, a length of the head support is adjustable relative to the thoracic bolster assembly.

Other aspects of the disclosed subject matter, as well as features and advantages of various aspects of the disclosed subject matter, should be apparent to those of ordinary skill in the art through consideration of the ensuing description, the accompanying drawings, and the appended claims.

BRIEF DESCRIPTION OF DRAWINGS

The following drawings illustrate what are currently considered to be specific representative configurations for carrying out the disclosed subject matter and are not limiting as to embodiments which may be made in accordance with this disclosure. The components in the drawings are not necessarily to scale relative to each other. Like reference numerals designate corresponding parts throughout the several views.

DETAILED DESCRIPTION

Figure 1:
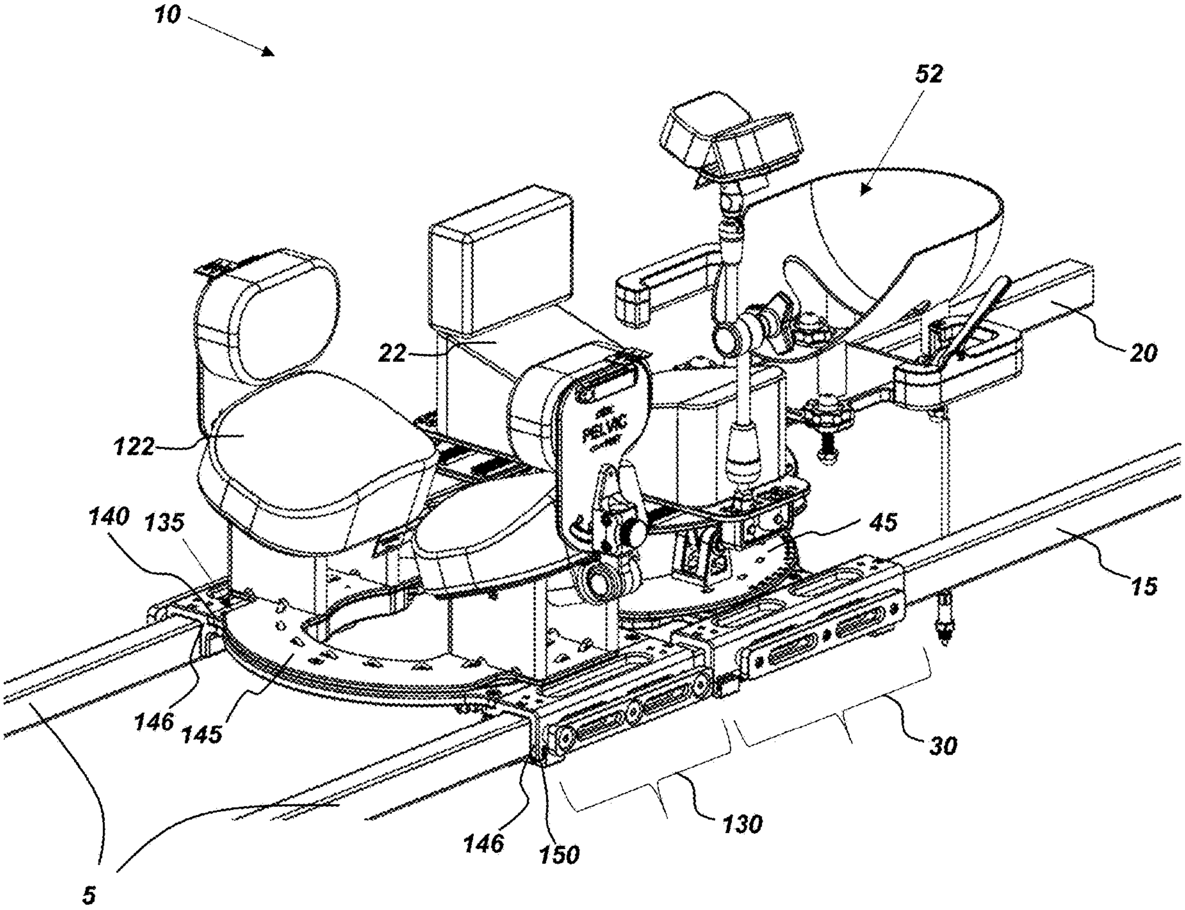
FIG. 1 is a perspective view of a surgical table with a patient positioning system according to the present disclosure secured to the surgical table.

This disclosure generally relates to a patient positioning system that may be used in spinal surgical procedures. One embodiment of the present disclosure is shown and described in a patient positioning system of FIG. 1. FIG. 1 shows the patient positioning system 10 positioned on opposing rails 15 and 20 of a surgical bed frame, such as a Jackson Table® or a Mizuho surgical table. Patient positioning system 10 generally includes a thoracic bolster assembly 30 and a pelvic bolster assembly 130.

Figure 2:
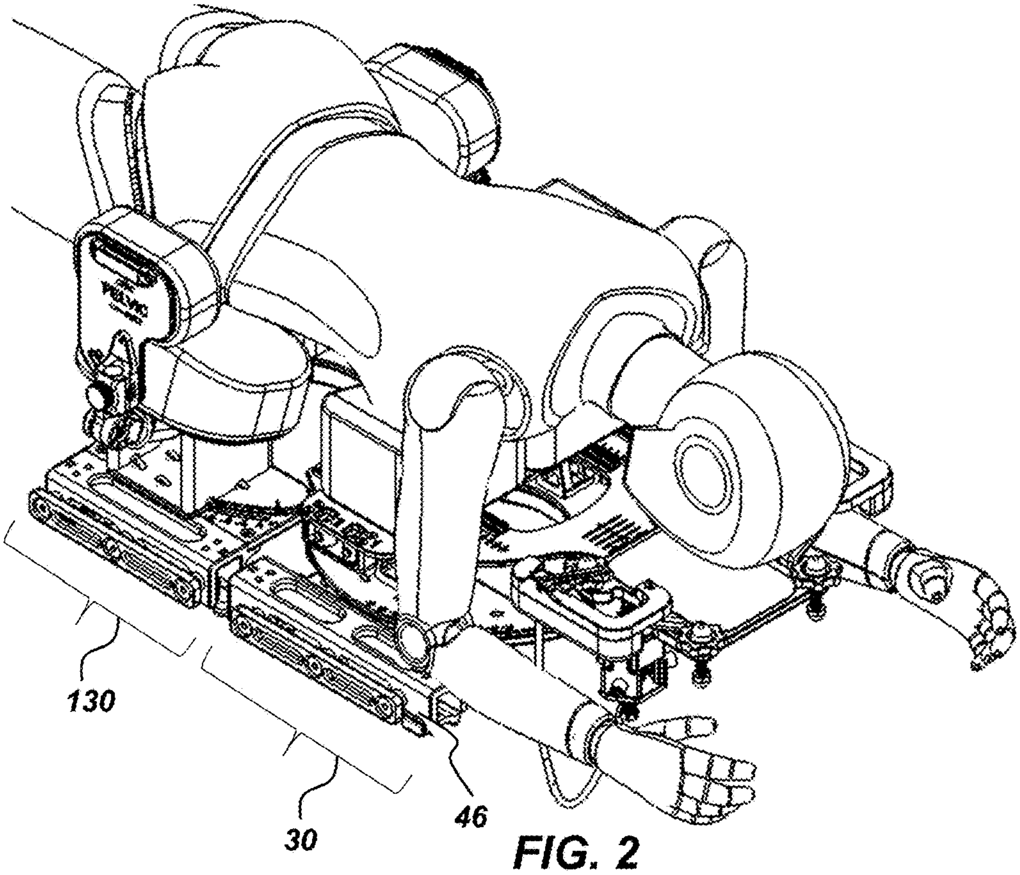
FIG. 2 is a perspective superior/cranial right side view of a patient positioning system with a patient positioned in a prone position on the patient positioning system.
Figure 3:
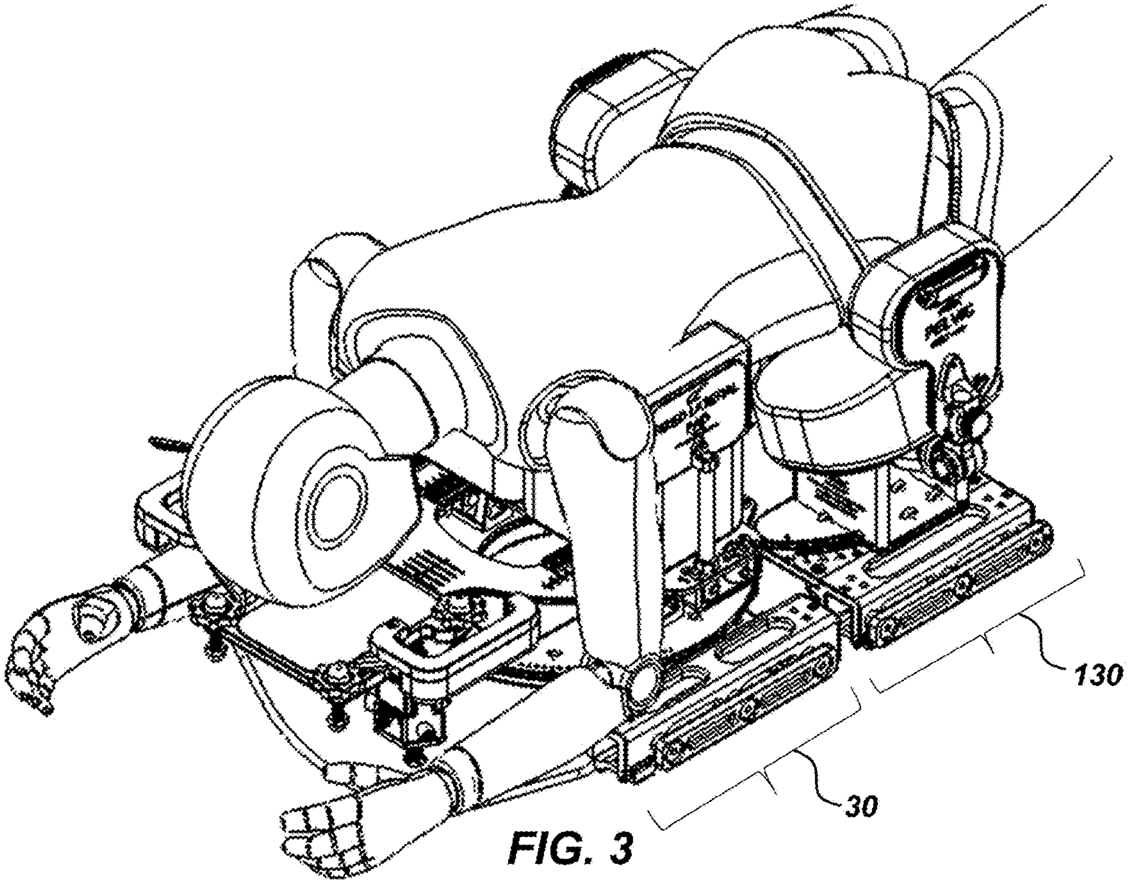
FIG. 3 is a perspective superior/cranial left side view of the patient positioning system of FIG. 2.
Figure 4:
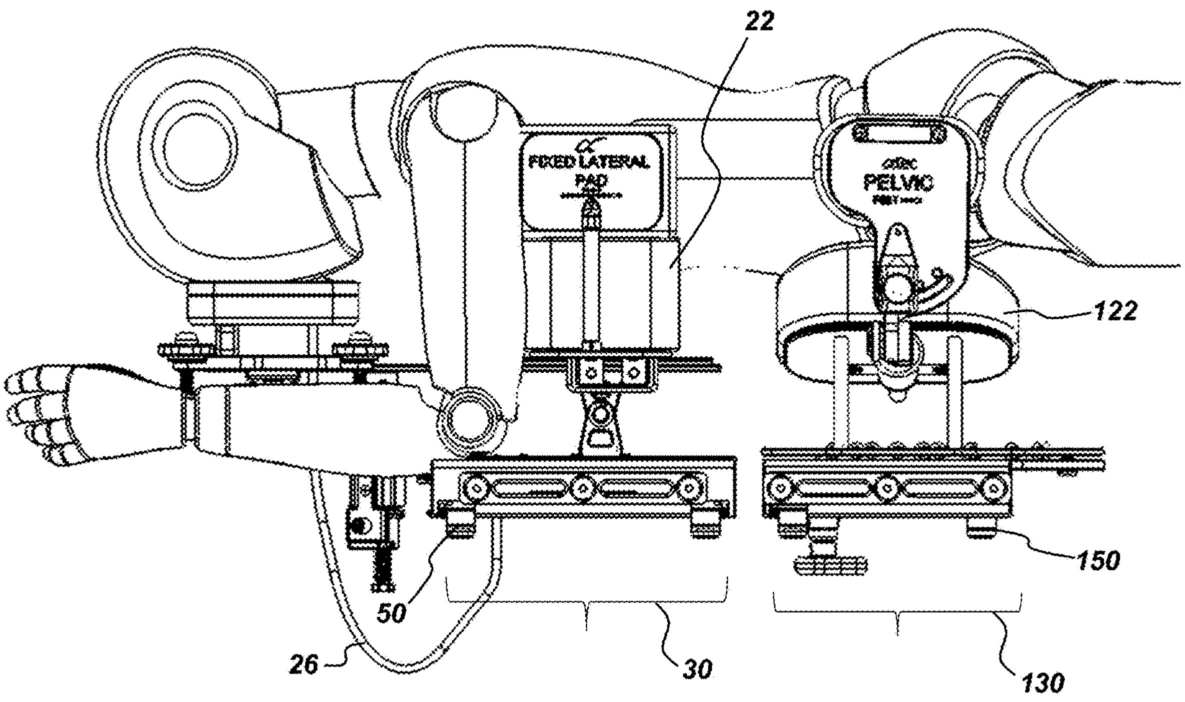
FIG. 4 shows a left side view of the patient positioning system of FIG. 2.
Figure 5:
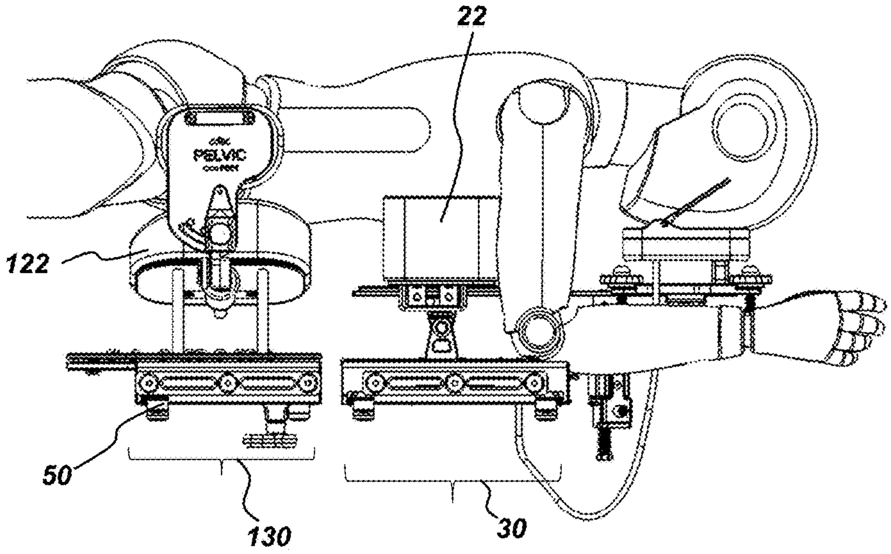
FIG. 5 shows a right side view of the patient positioning system of FIG. 2.
Figure 6:
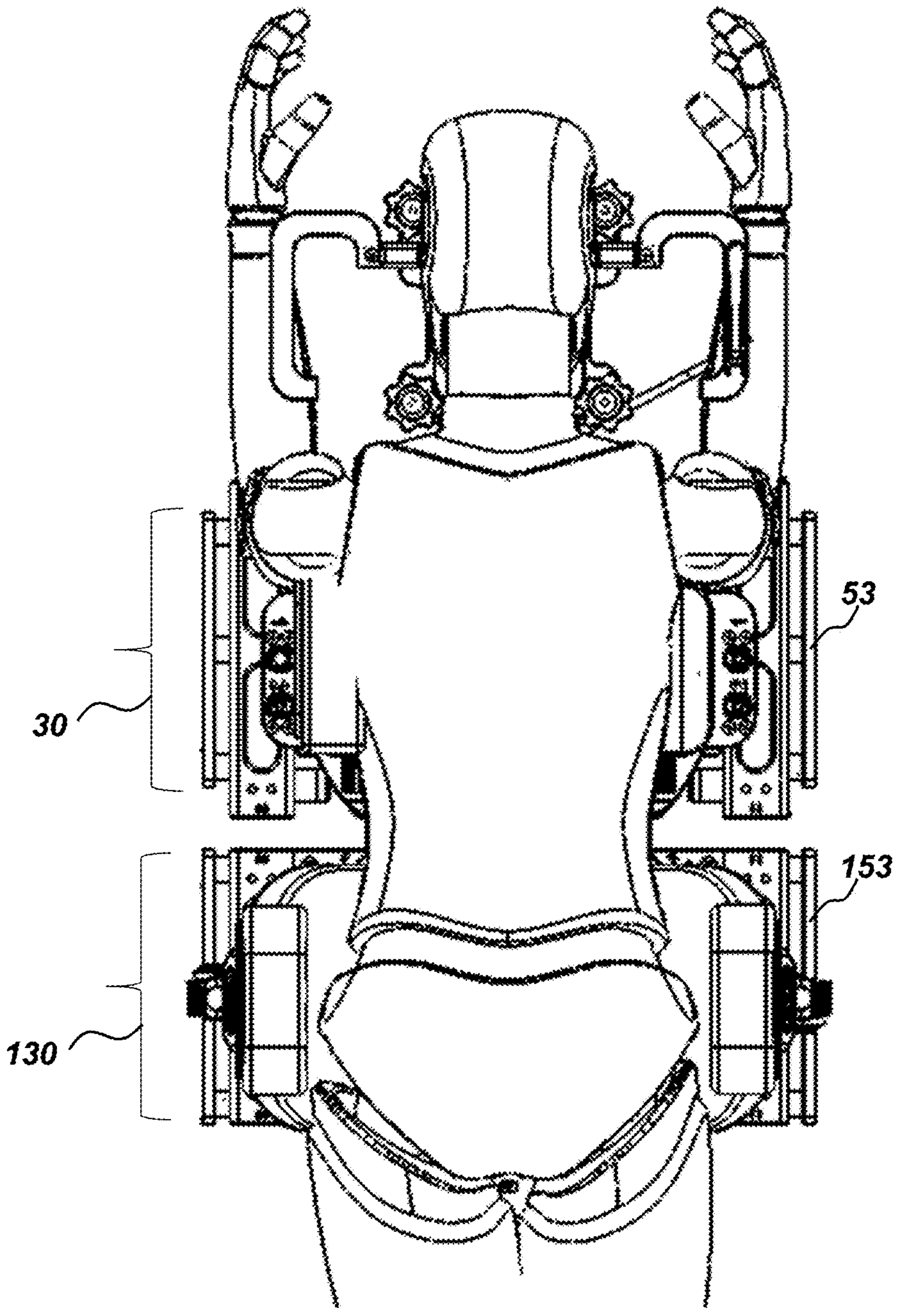
FIG. 6 shows a top view of the patient positioning system of FIG. 2.

Each of the thoracic bolster assembly 30 and pelvic bolster assembly 130 may be more simply referred to as "bolster assembly 30" and "bolster assembly 130" or as "bolster assemblies 30 and 130." The pelvic bolster assembly 130 may support a portion of a pelvis of a patient, while the thoracic bolster assembly 30 may support a portion of a chest or thoracic region of a patient. FIGS. 2 and 3 show, respectively, a perspective superior/cranial right side view and a perspective superior/cranial left side view of the patient positioning system of FIG. 1 with an exemplary patient lying in a prone position. FIG. 4 shows a left side view and FIG. 5 shows a right side view. FIG. 6 shows a top view of the exemplary patient lying in a prone position on the patient positioning system 10.

Bolster assemblies 30 and 130 are removably secured to rails 15 and 20 of surgical bed frame. Rails 15, 20 may extend from the superior or cranial end of surgical bed frame 5 or surgical frame 5 to the inferior or caudal end of surgical bed frame 5. Rail couplers, as described in more detail below, are slidably mountable on opposing rails of a surgical bed frame 5 allowing the bolster assemblies 30, 130 to be adjusted longitudinally along the opposing rails of the surgical bed frame 5. Bolster assemblies 30 and 130 may be positioned at any point along the distance from the superior/cranial end to the inferior/caudal end, though preferably in those positions that will provide the best support for a patient while allowing desirable surgical access to the patient's spine.

Bolster assemblies 30, 130 include a base 35, 135 which is comprised of a lower base portion 40, 140 and an upper base portion 45, 145. For example, lower base portion 40 may include a lower base plate and upper base portion 45 may be an upper base plate. Each lower base portion 40, 140 may be mountable onto parallel rails 15 and 20 of surgical frame bed 5. In some configurations, the upper portions 45, 145 of the base are movable relative to the lower portion 40, 140 in one, two, or more directions. Alternatively, the upper portion 45, 145 may be fixed relative to the lower portion 40, 140 in one or two directions.

In some configurations, the base 35, 135 of the bolster assemblies 30, 130 includes means for attaching the bolster assemblies 30, 130 to rails 15, 20 of a surgical frame bed. For example, the lower base portion 40 can include the rail couplers 46, 146 that are sized and shaped for receiving the parallel rails 15 and 20, respectively, of surgical frame bed 5, and may be provided on opposing sides of the base 35, 135. The rail couplers can have an open side to receive surgical bed rails 15, 20. In some configurations, the rail couplers may be slidably connected to or mounted onto each of the rails 15, 20, to allow bolster assemblies 30, 130 to be longitudinally adjustable along the rails of the surgical bed frame and to allow for further unique adjustments based on the size of the patient and the access needs of the surgeon for the particular procedure.

In some embodiments, one or more fasteners or locking mechanisms may be provided on one or both of the opposing lateral sides to lock the rail couplers 46, 146 of lower base portion 40, 140 to the rails 15, 20 of the surgical frame 5. For example, a locking mechanism may be provided that consists of a latch 50, 150 (see FIGS. 4-5) that has a closed position wherein the latch extends across the open side of the rail coupler 46, 146 of lower base portion 40, 140 and connects to the inner side of the rail coupler 46, 146.

The latch 50, 150 can include an outwardly extending lip which mates with a groove provided on the exterior side of the inner portion of the rail coupler 46, 146. A release can be provided on the inner side of the latch 50, 150, allowing a clinician to reach under the base 35 and pull downwardly on the release to release the latch 50, 150 manually. The latch 50, 150 can also include one or more gussets formed of resilient material, such as rubber or any other suitable material. When the latch 50 is closed, it may compress a gusset against the rail of the surgical frame 5, reducing slippage of the rail coupler relative to the rails of the surgical frame when the latch 50 is closed.

Each of the thoracic bolster assembly 30 and pelvic bolster assembly 130 may be in connection with one or more support pads, such as thoracic chest pads 22 and pelvic base pads 122. The support pads 22, 122, may be removably connected to the bolster assemblies 30, 130, (for example, via hook-and-loop fasteners) such that the pads can be customized for patients depending on the size of the patient and the particular surgical needs. Larger pads, smaller pads, pads with different contours, shapes, etc., may be used. For example, pads can be used both to support the patient and to achieve the desired pressure/counter pressure for spinal fixation, as discussed in more detail below.

Although not illustrated, the base 35, 135 may include one or more straps to secure cords or cables to prevent them from interfering with the surgery. Such straps may be hook-and-loop straps located at each lateral side of the base 35, 135, and each lateral side may include both caudal- and cephalad-positioned straps, which straps may be laced through two or more holes in the base 35, 135.

Adaptors 53, 153, also known as bed rails, may be mounted to the rail couplers 46, 146 of the lower base portion 40, 140 of the thoracic assembly 30 and/or pelvic assembly 130 to allow a user to attach various instruments such as one or more A-arms, arm boards, etc., to the surgical frame (FIG. 6). In the non-limiting example shown in FIG. 6, adaptors 53, 153 are attached to the lateral sides of each of the rail couplers 46, 146. Adaptors 53, 153 may provide a convenient method for a clinician to attach table-mounted surgical accessories, such as retractors, A-arms, robotic equipment, etc. Instead of being mounted on both rail couplers, an adaptor 53, 153 may be mounted on only one rail coupler. Alternatively, the adaptors 53, 153 could be mounted on another portion of the base 35, 135 of the bolster assembly 30, 130. As another alternative, adaptors 53, 153 may be provided in a plurality of different locations and configurations of one or more of the bolster assemblies 30, 130. Or adaptors(s) 53, 153 may not be provided. Instead of adaptor(s), one or more Clark sockets may be provided attached to one or more of the lateral sides of the base 35, 135 of one or more of the bolster assemblies 30, 130. Clark sockets may be attached either directly to the lateral sides or may be attached to the adaptors 53, 153.

Thoracic Bolster Assembly Coronal Adjustment

Figure 7:
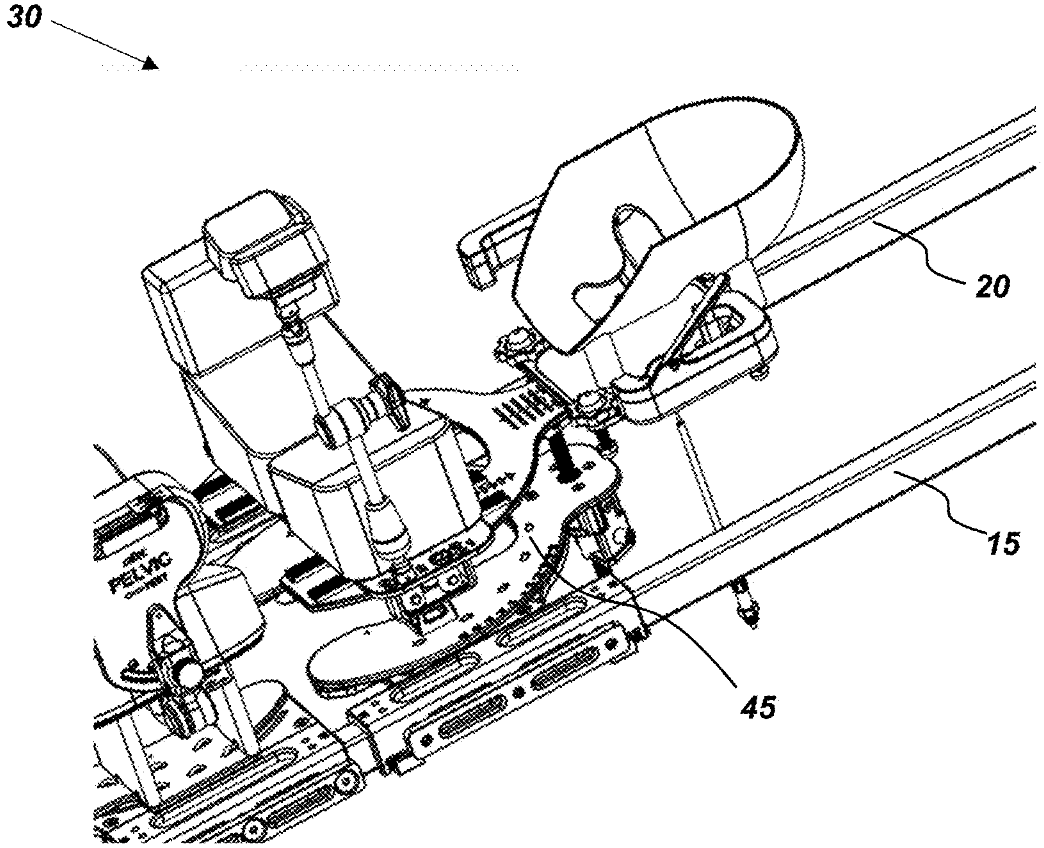
FIG. 7 shows a perspective view of a thoracic bolster assembly attached to opposing rails of a surgical bed frame.
Figure 8:
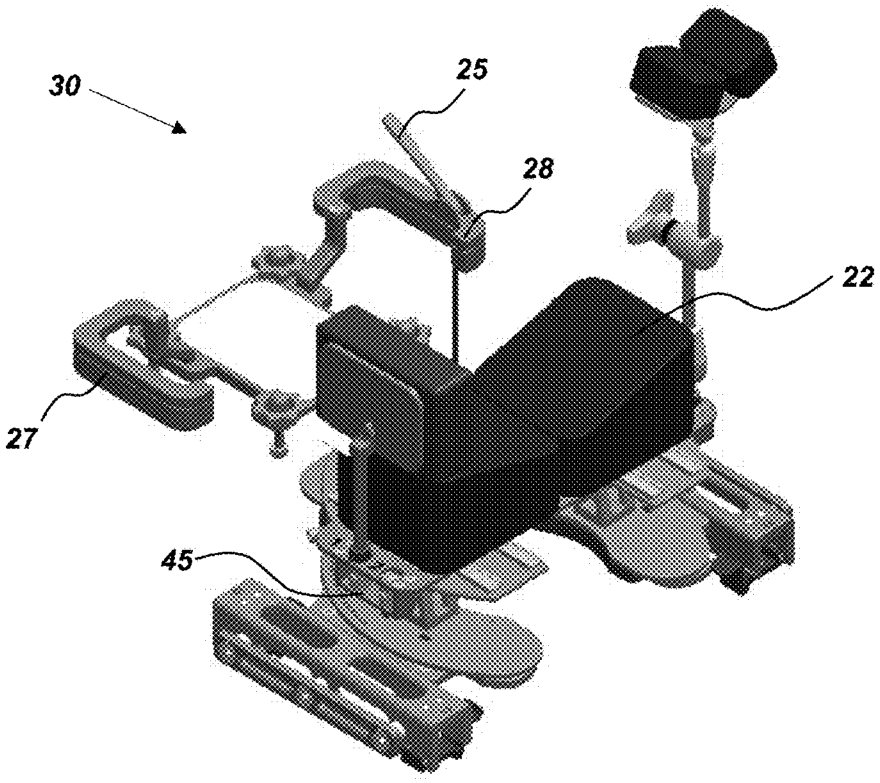
FIGS. 8-9 show perspective views of a thoracic bolster assembly.
Figure 9:
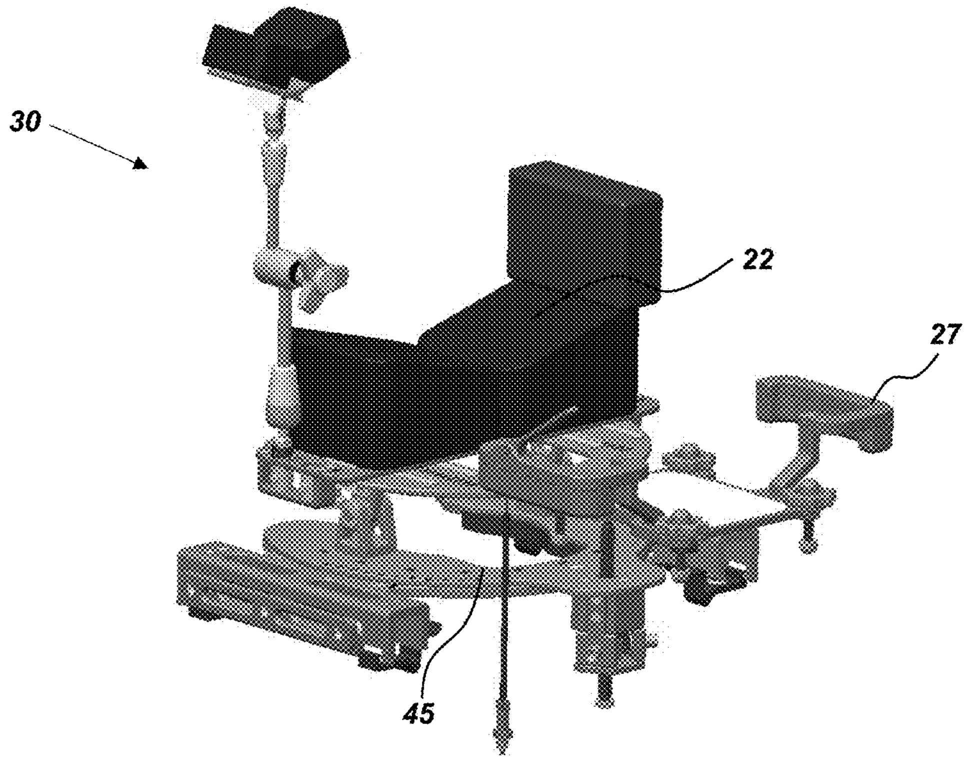
Figure 10:
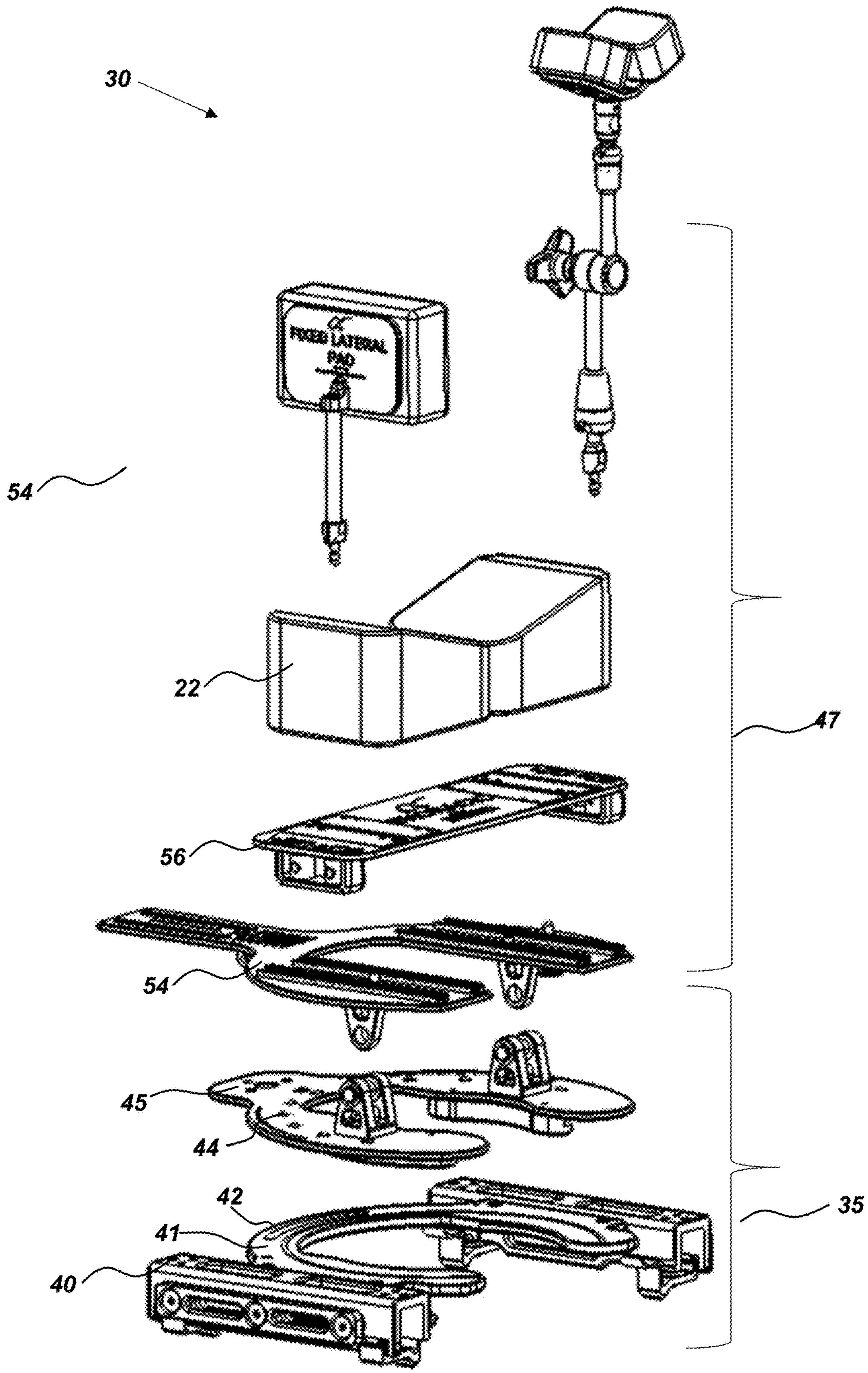
FIG. 10 shows a partially exploded perspective view of a thoracic bolster assembly.

Turning to the thoracic bolster assembly 30 specifically, FIGS. 7-9 show perspective views of the thoracic bolster assembly 30. FIG. 10 shows a partially exploded view of the thoracic bolster assembly 30. The thoracic bolster assembly generally includes a base 35 and a top patient support portion 47. The base 35 includes a lower portion 40 that is fixed to the rail couplers 46 and a base upper portion 45 that is rotatable relative to the lower portion 40. The top patient support portion 47 is pivotably connected to the base 35. The top patient support portion 47 can be comprised of a base plate 54 and top plate 56 to provide an adjustable length of the top patient support portion 47, with the base plate 54 adjustable cranially/caudally as described in more detail below. In other configurations, the top patient support portion 47 can be configured as a single piece rather than two separate plates.

In some configurations, the thoracic bolster assembly 30 can be adjusted in a coronal plane relative to the surgical frame. The thoracic bolster assembly 30 may be provided with an upper portion 45 of the base that may be rotatably connected to the lower portion 40, such that the upper portion 45 may rotate relative to the lower portion 40 in a coronal plane. The upper portion 45 may be connected to the lower portion 40 in a manner allowing the upper portion 45 to be rotated with respect to the lower portion 40. The rotational motion can be actuated by the surgeon rotating the upper portion 45 with respect to the lower portion 40, or in other embodiments, the motion may be actuated by a drive mechanism.

The lower portion 40 may include a plate 41 extending from a first rail coupler 46 to a second rail coupler 46. In some configurations, the plate 41 of the lower portion 40 may include one or more recessed tracks 42 (best seen in the exploded view of FIG. 10 and the cross-sectional view of FIG. 14), with the upper portion 45 having one or more roller bearings 44 which travel in the recessed tracks 42 of the plate 41 of the lower portion 40. In other configurations, the upper portion 45 may have the recessed track and the lower portion 40 may include the roller bearings. The recessed track and roller bearings may improve the supported rotation of the upper portion 45 relative to the lower portion 40, as well as make it easier to rotate the upper portion 45 to achieve coronal adjustment.

Figure 11:
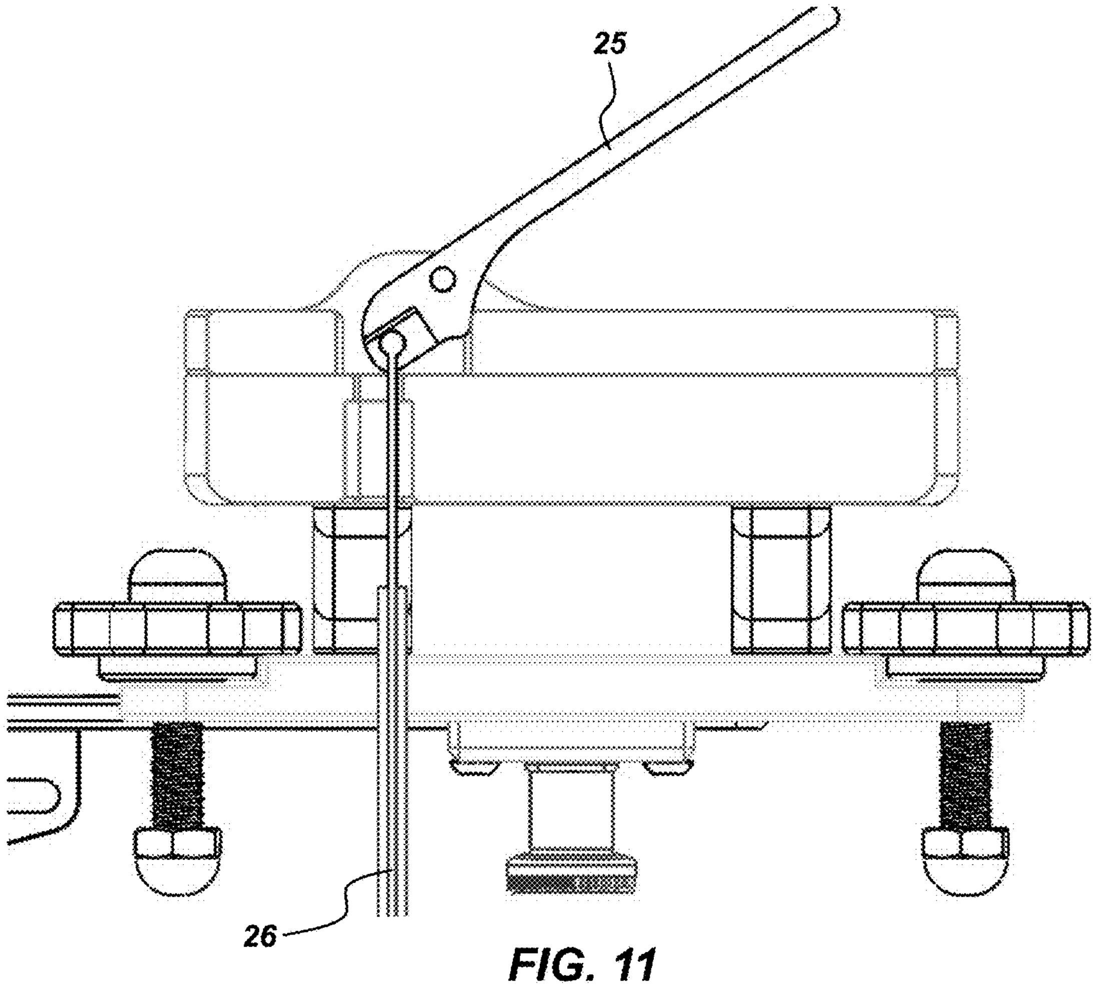
FIG. 11 shows a side view of a portion of a thoracic bolster assembly showing a coronal rotation locking mechanism.
Figure 12:
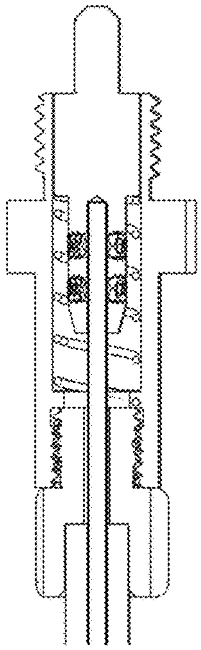
FIG. 12 shows a cross-sectional view of a coronal locking mechanism.

In the configuration shown in FIGS. 7-10, the thoracic bolster assembly 30 is provided with a locking release mechanism 25 (shown as a lever) to allow the surgeon to make the coronal adjustment in the sterile field. Without the locking release mechanism 25 actuated, the upper portion 45 of the base 35 remains locked with respect to the lower portion 40 of the base 35. If the surgeon wants to make a coronal adjustment to the thoracic bolster assembly 30, the surgeon first actuates the locking release mechanism 25 (see FIGS. 11-12). Actuating the locking release mechanism 25 moves locking cable 26, as shown in FIG. 11, and releases the coronal adjustment lock, or moves the coronal adjustment lock into an unlocked position.

In the unlocked position, the upper portion 45 can be rotated relative to the lower portion 40, allowing coronal adjustment of the thoracic bolster assembly 30. In the configuration shown in FIGS. 7-10, the surgeon is provided with one or more handles 27, 28 to grip and rotate. For example, handle 27 can be provided on one lateral side of the thoracic bolster assembly 30, and handle 28 (provided with locking release mechanism 25) can be provided on the opposing lateral side of the thoracic bolster assembly 30. Both the locking release mechanism 25 and the handles 27, 28 can be within the sterile field to allow the surgeon to make coronal adjustments within the sterile field. For example, if draping is provided over the handles, the surgeon may still actuate the locking release mechanism 25 and grip the handles 27, 28 through the draping and within the sterile field to make the coronal adjustments within the sterile field.

Thoracic Bolster Assembly Sagittal Adjustment

Figure 13:
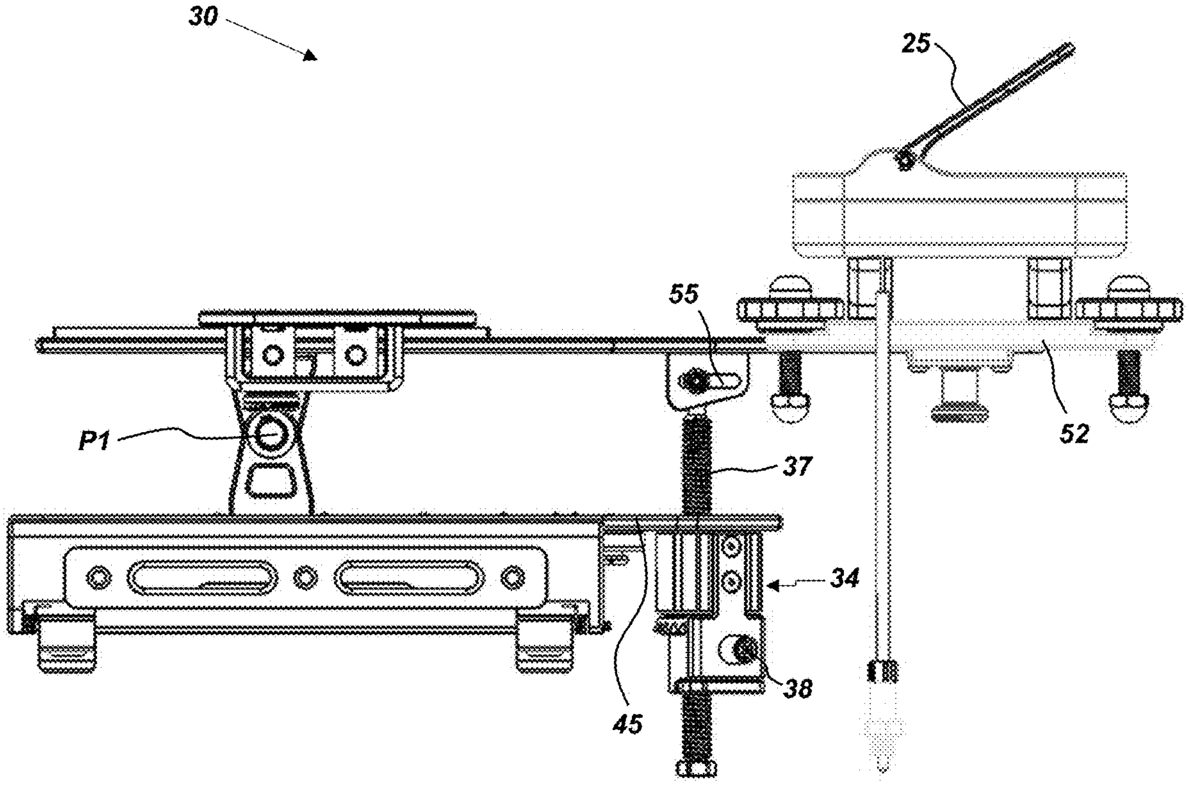
FIG. 13 shows a side view of a thoracic bolster assembly.
Figure 14:
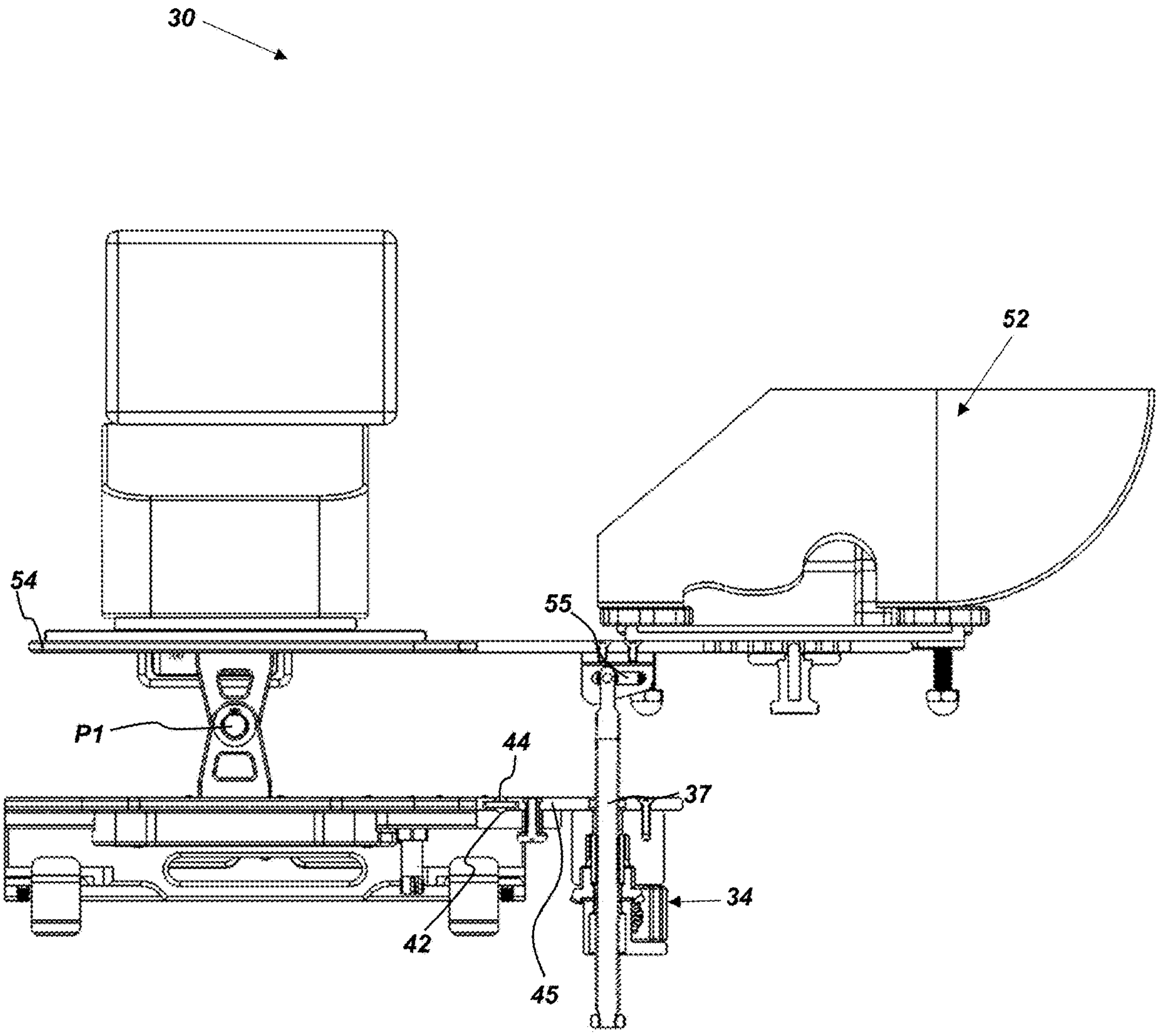
FIG. 14 shows a cross-sectional view of FIG. 13.

The thoracic bolster assembly 30 may also include means for sagittal adjustment of the thoracic bolster assembly 30 to achieve a desired kyphosis (e.g., outward curvature of the spine). In some configurations, the thoracic bolster assembly 30 includes a top patient support portion 47 that may be pivotably connected to the base 35, such that patient support portion 47 may pivot relative to the base 35 in a sagittal plane to add or subtract thoracic kyphosis. In some configurations, top patient support portion 47 may additionally or alternatively pivot relative to base 35 in an axial or transverse plane. FIG. 13 shows a side view of the thoracic bolster assembly 30 with no sagittal adjustment of the patient support portion 47. FIG. 14 shows a cross-sectional view of FIG. 13. Patient support portion 47 is pivotably connected to the upper portion 45 of the thoracic bolster assembly 30 at pivot P1.

Figure 15:
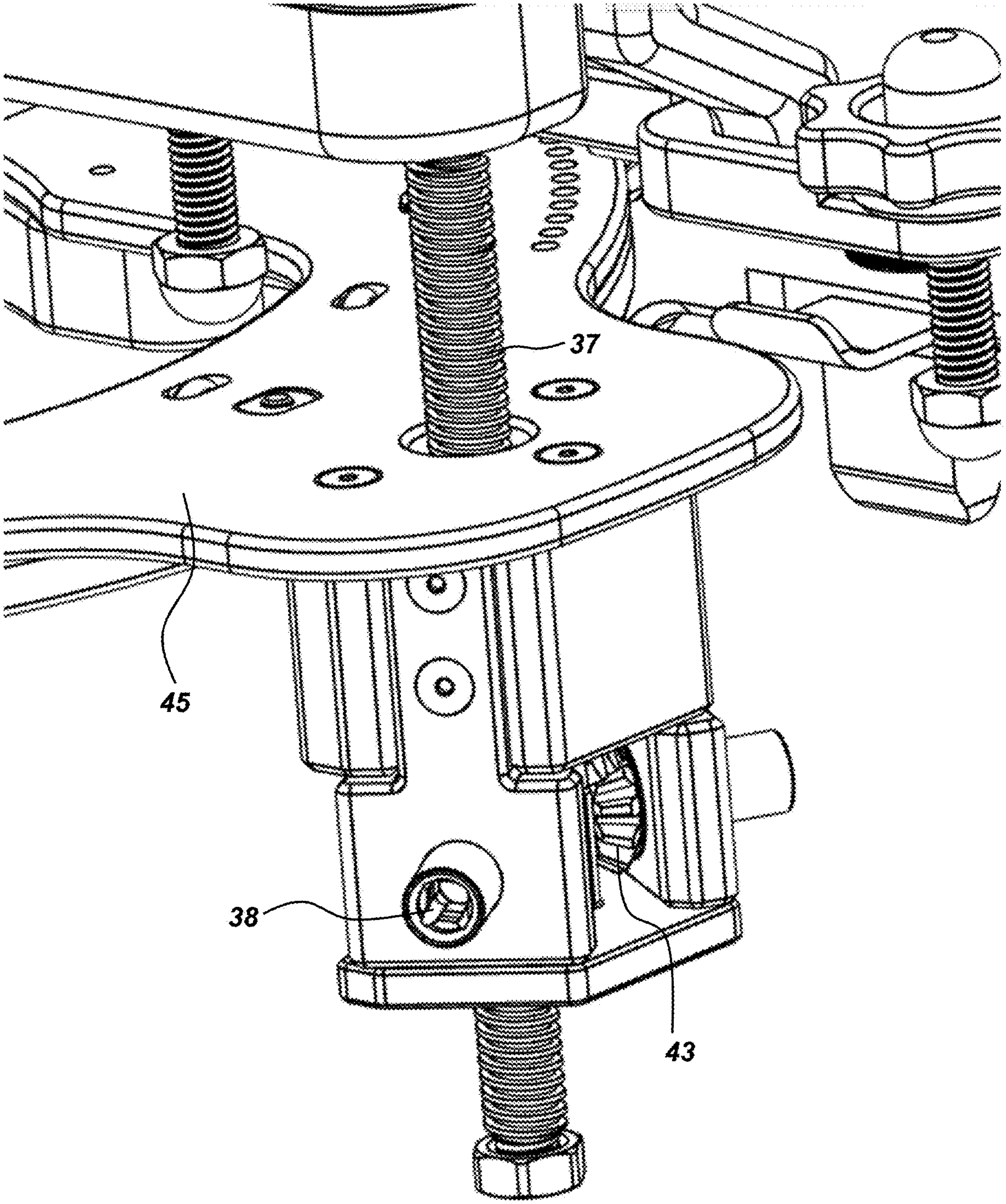
FIG. 15 shows a perspective view of a vertical adjustment mechanism.

In some configurations, top patient support portion 47 is comprised of a base plate 54 and a top plate 56, and the base plate 54 may include the pivot P1. The base plate 54 can be in connection with a vertical adjustment mechanism 34, such as rails that allow the top plate 56 to move relative to the base plate 54. FIGS. 13-15 show that the top patient support portion 47 of the thoracic bolster assembly 30 is attached to the base 35 of the thoracic bolster assembly 30 at a pivot point P1.

The upper portion 45 of the base 35 of the thoracic bolster assembly 30 includes a vertical adjustment mechanism 34, which in the non-limiting embodiment illustrated includes a gear mechanism that is rotated by a socket which in turn adjusts screw 37. Screw 37 vertically adjusts the top patient support portion 47 of the thoracic bolster assembly 30 by turning of one or more gears 43 (such as bevel gears, see FIG. 15) located in a gear housing on the geared end of the screw 37. The opposing end of the screw 37 is in connection with the base plate 54 of patient support portion 47. The screw 37 may be in connection with the patient support portion 47 in any suitable manner and in one configuration the screw 37 is attached to a slot housing 55 (FIG. 13) connected to the patient support portion 47.

The geared end of the screw 37 can also include a drive or socket 38, that, when rotated by a removable handle, rotates one or more gears 43 that in turn rotate screw 37, thereby adjusting the sagittal thoracic position of the patient as patient support portion 47 pivots about pivot point P1. Some configurations include a means for resisting rotation to limit or prevent undesirable sagittal adjustment of the patient support portion 47.

As is visible in FIGS. 13 and 15, a drive or socket 38 is included on one or both lateral sides of the screw 37 of the thoracic bolster assembly 30. The drive 38 includes a shaped recess to allow a handled drive rod with a complementary-shaped boss to be inserted into the recess of the drive 38 to turn gears 43 and drive screw 37. This allows a surgeon or clinician to insert a drive rod with a handle into the drive 38, adjust the patient support portion 47 upwardly or downwardly relative to the upper portion 45 to achieve the desired kyphosis, and then remove the rod. This may prevent any accidental movement of the gears 43 and also maximize space for access to the patient. In other configurations, the drive rod and/or handle may be integral to the screw to be non-removable.

Figure 16A:
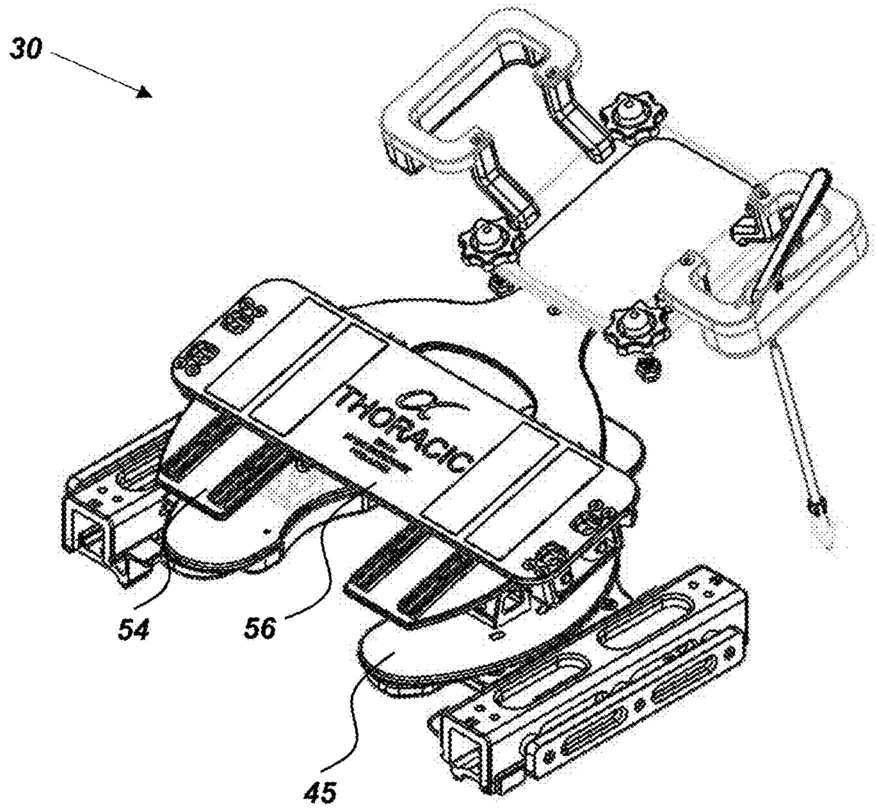
FIGS. 16*a* and 16*b* show perspective and side views, respectively, of a thoracic bolster assembly with an upward adjustment for kyphosis.
Figure 16B:
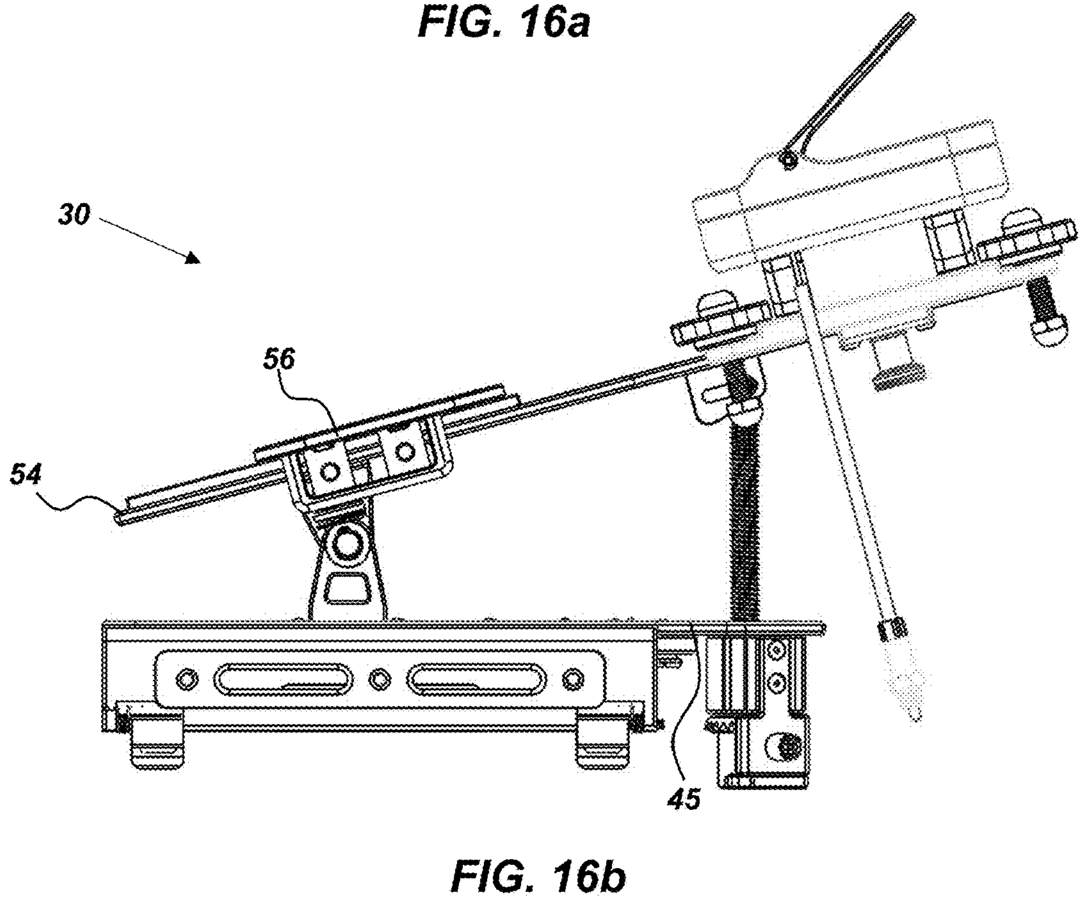
Figure 17A:
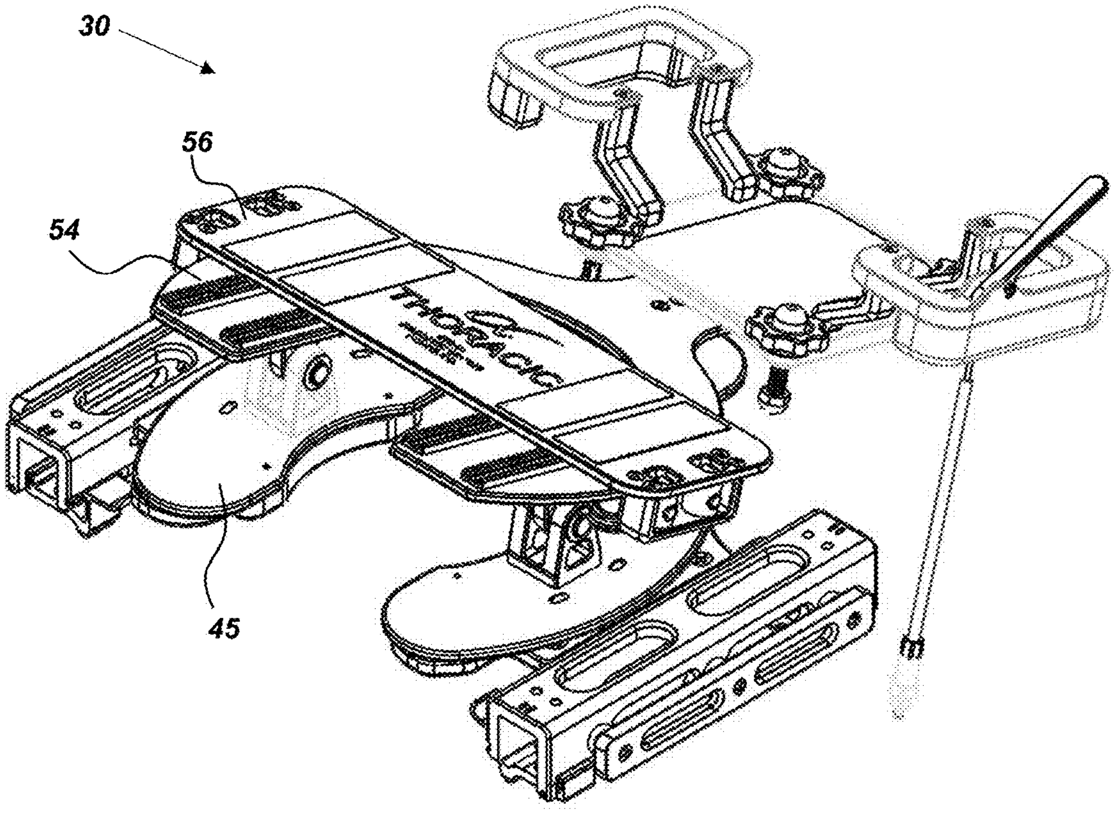
FIGS. 17*a* and 17*b* show perspective and side views, respectively, of a thoracic bolster assembly with a downward adjustment for kyphosis.
Figure 17B:
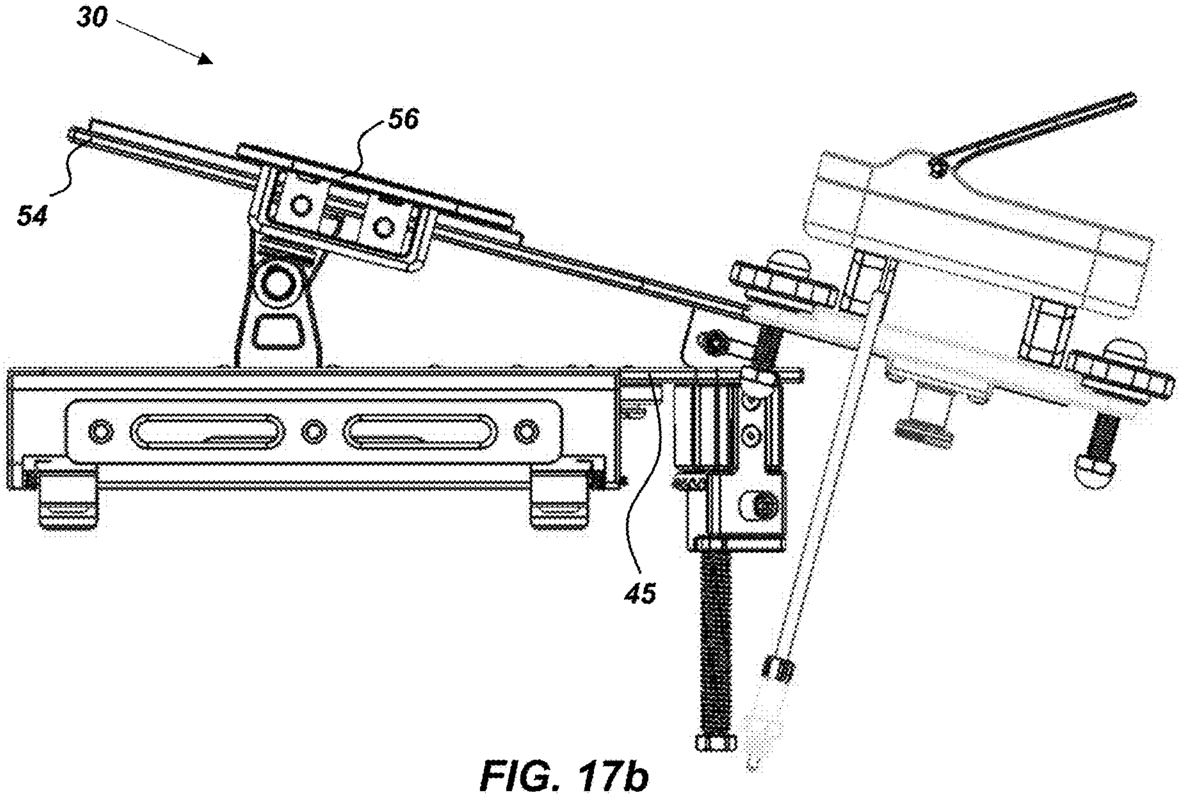

FIGS. 16*a*-16*b* show the patient support portion 47 adjusted upwardly relative to the upper portion 45 of the base of the thoracic bolster assembly 30. FIGS. 17*a*-17*b* show the patient support portion 47 adjusted downwardly relative to the base 35 of the thoracic bolster assembly 30.

According to another aspect, the patient support portion 47 of the thoracic bolster assembly 30 may have an adjustable length. In one configuration, the thoracic bolster assembly 30 is formed of two sliding plates. In this manner, the two plates allow for the length of the bolster assembly 30 to be adjusted as needed depending on the size of the patient and the surgeon's needs. In some configurations, patient support portion 47 includes a base plate 54 and a top plate 56, with an adjustment mechanism to allow the base plate 54 to be adjusted cranially/caudally with respect to the top plate 56. In the configuration shown, one or more of the base plate 54 and/or top plate 56 include rails and/or guides to allow the plates 54, 56 to slide relative to each other to adjust for patients of different sizes/heights.

In some configurations, thoracic bolster assembly 30 further includes a head support portion 52. The head support portion 52 can be in connection with the patient support portion 47, such that the head support portion 52 moves with the patient support portion 47, including sagittal and coronal adjustments. For example, the head support portion 52 can be in connection with the top plate 56 of the top patient support portion 47. In some configurations, the head support portion 52 is removable from the top patient support portion 47. The head support portion 52 may also be adjustable cranially/caudally with respect to the patient support portion 47 to accommodate patients of different sizes/heights. Additional functionality of the head support portion can include a mirror for visualization of the patient's eyes and/or breathing tube, etc.

Thoracic Bolster Assembly Arm Adjustment

Figure 18A:
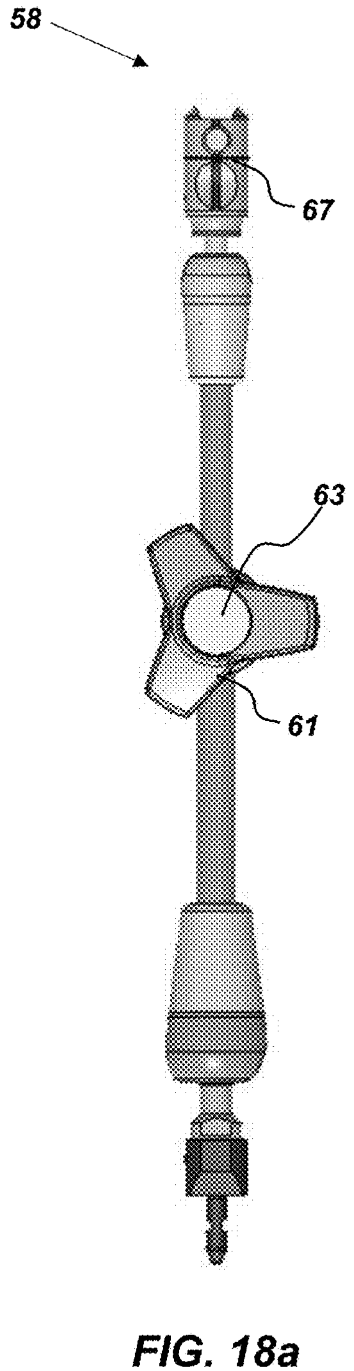
FIGS. 18*a* and 18*b* show a front view and a perspective view, respectively, of an adjustable arm attachable to a thoracic bolster assembly.
Figure 18B:
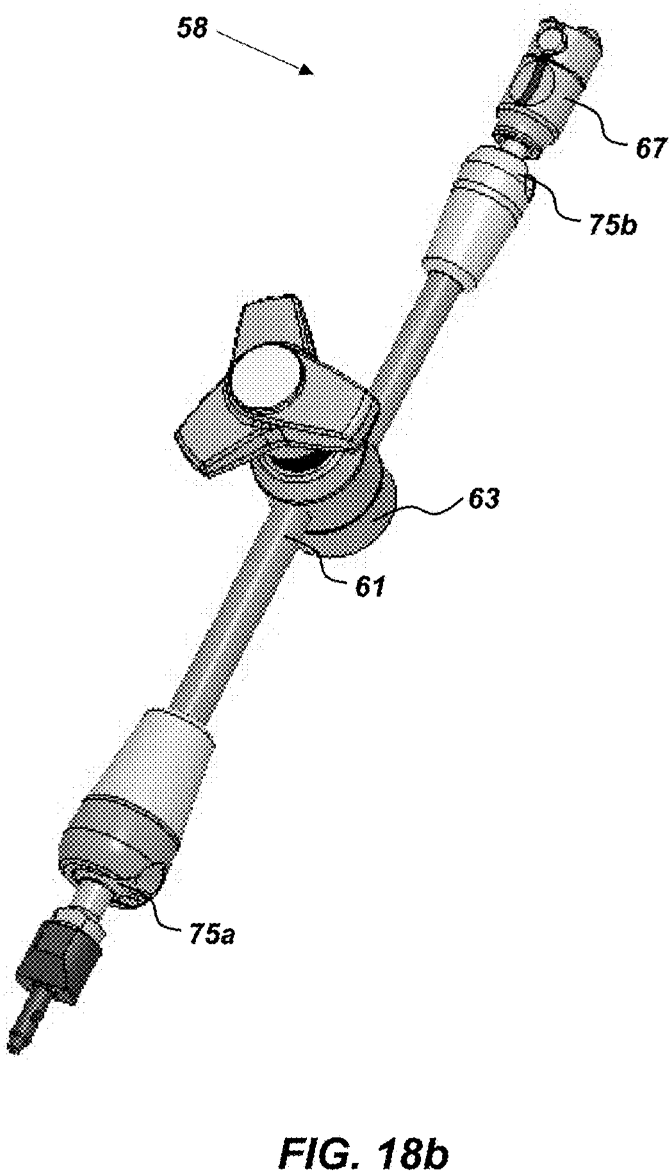
Figure 19:
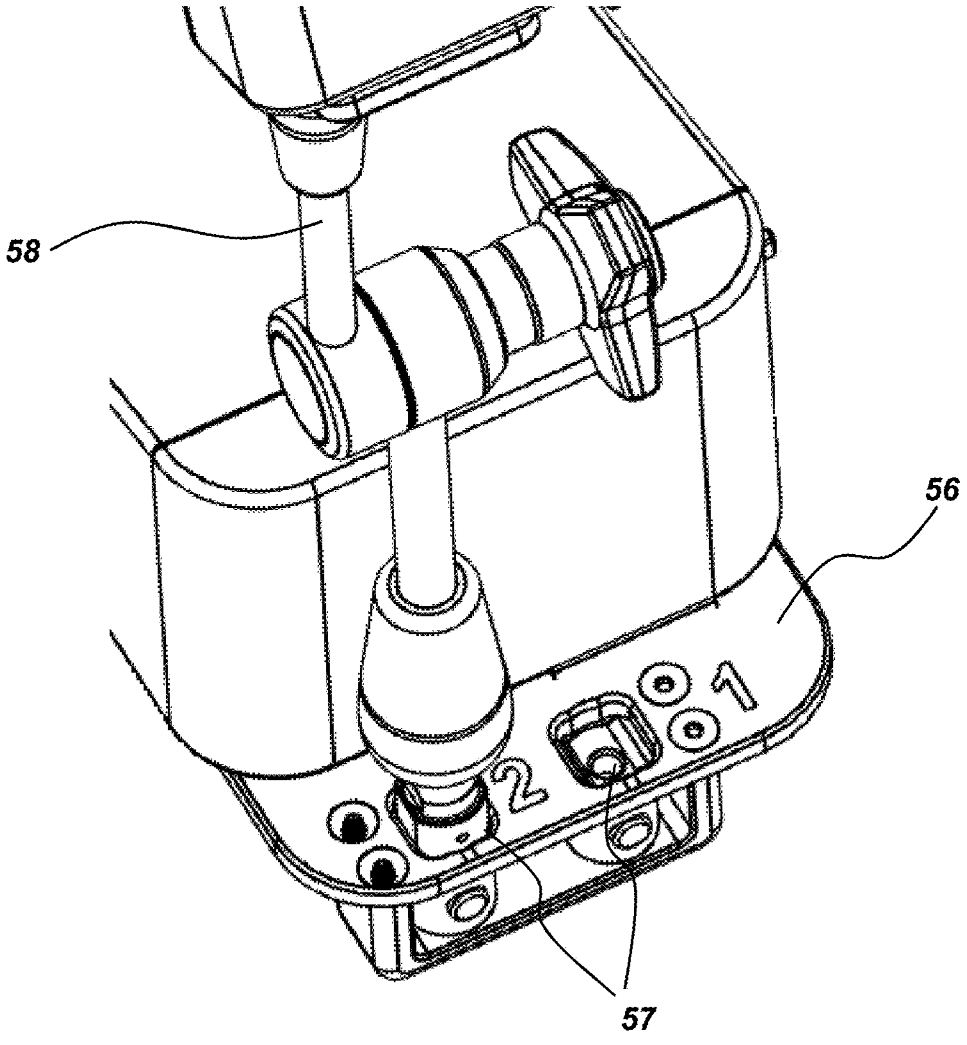
FIG. 19 shows a perspective view of an upper plate 56 of a thoracic bolster assembly connected to an adjustable arm.

In some configurations, thoracic bolster assembly 30 further includes an arm 58, as seen in FIGS. 18*a* and 18*b*. Arm 58 can be attached to the thoracic bolster assembly 30, such as on the top patient support portion 47. Arm 58 can also be entirely removable. For example, arm 58 can be removed during patient placement on the thoracic bolster assembly 30, and then arm 58 can be attached after the patient has been placed on the thoracic bolster assembly 30. In one configuration shown in FIG. 19, arm 58 is attached to the top patient support portion 47 through a slot 57 formed in the top plate 56 of the top patient support portion 47. In the configuration shown in FIG. 19, the top plate 56 has two slots (labeled "1" and "2") to allow for different arm 58 position placement. In other configurations, one slot can be provided, or three or more slots can be provided. Other methods can also be used to removably or non-removably attach the arm 58 to a portion of the thoracic bolster assembly 30.

For a patient with thoracic scoliosis, the posterior ribs on the convex side of the patient are pushed posteriorly, causing a characteristic rib hump; arm 58 can be used to selectively apply pressure on the rib hump during spinal fusion. In some configurations, arm 58 can be adjusted at multiple points to allow for proper positioning and pressure application for patients of different sizes, as well as rib humps of different sizes and locations. In the configuration shown in FIGS. 18*a*-19, arm 58 includes an arm joint 61 pivotally connected at a first end to the thoracic bolster assembly 30 and pivotally connected at a second end to a pad base connector 67. The arm joint 61 may include one or more elbows 63 for angular adjustment of the arm joint 61. Arm joint 61 can be connected to the thoracic bolster assembly 30 via a lower ball joint 75*a* to allow for adjustment in multiple directions. Similarly, the pad base connector 67 can be connected to the arm joint 61 via an upper ball joint 75*b* to allow for adjustment in multiple directions.

The pad base connector 67 can be used to connect a pad base that supports one or more pads. The pad base connector 67 can be removed from the arm joint 61 of the arm 58 to allow for pad bases of various shapes and sizes depending on the needs of the surgeon for the particular patient. Similarly, pads can be provided in different shapes and sizes and can be removably attached to the selected pad base. Pads can be connected to the pad base through any suitable means, such as hook-and-loop fasteners, etc.

Figure 20A:
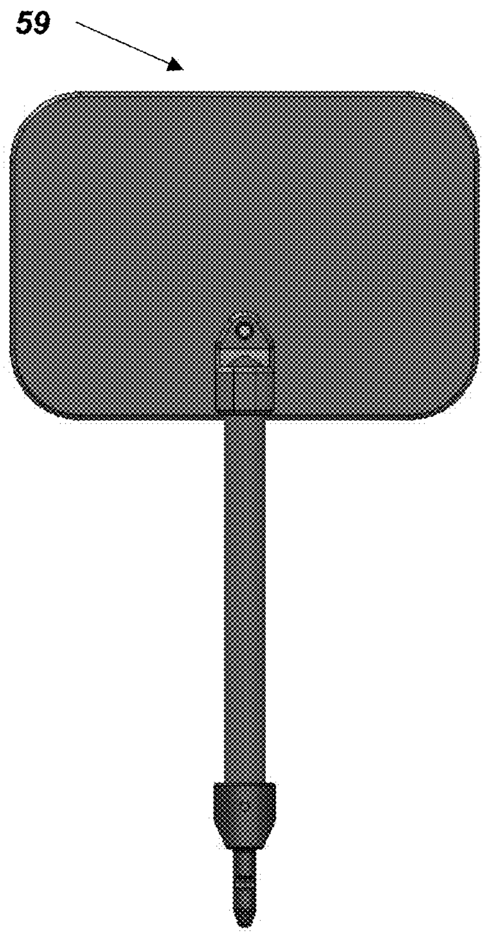
FIGS. 20*a* and 20*b* show a front view and a perspective view, respectively, of a thoracic lateral paddle.
Figure 20B:
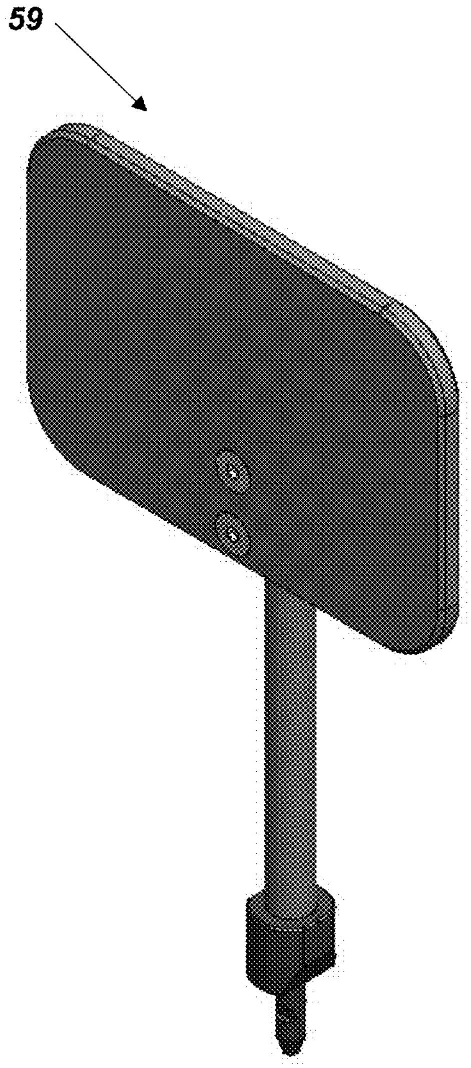

The arm 58 may be provided on one lateral side of the thoracic bolster assembly 30, and one or more of a thoracic lateral paddle 59 (see FIGS. 20*a*-20*b*) may be provided on the opposing lateral side of the thoracic bolster assembly 30. Thoracic lateral paddle 59 may be attached to the thoracic bolster assembly 30 similar to the arm 58; in some configurations thoracic lateral paddle 59 is in connection with the top patient support portion 47. Thoracic lateral paddle 59 can also be entirely removable. For example, thoracic lateral paddle 59 can be removed during patient placement on the thoracic bolster assembly 30, and then thoracic lateral paddle 59 can be attached after the patient has been placed on the thoracic bolster assembly 30.

In one configuration, thoracic lateral paddle 59 is attached to the top patient support portion 47 through a slot 57 formed in the top plate 56 of the top patient support portion 47. One or more slots can be provided to allow for different positioning of the thoracic lateral paddle 59. Other methods can also be used to removably or non-removably attach the thoracic lateral paddle 59 to a portion of the thoracic bolster assembly 30. The thoracic lateral paddle 59 can have a lateral pad removably attached thereto to provide lateral support to a patient on the thoracic bolster assembly 30.

Pelvic Bolster Assembly

Figure 21:
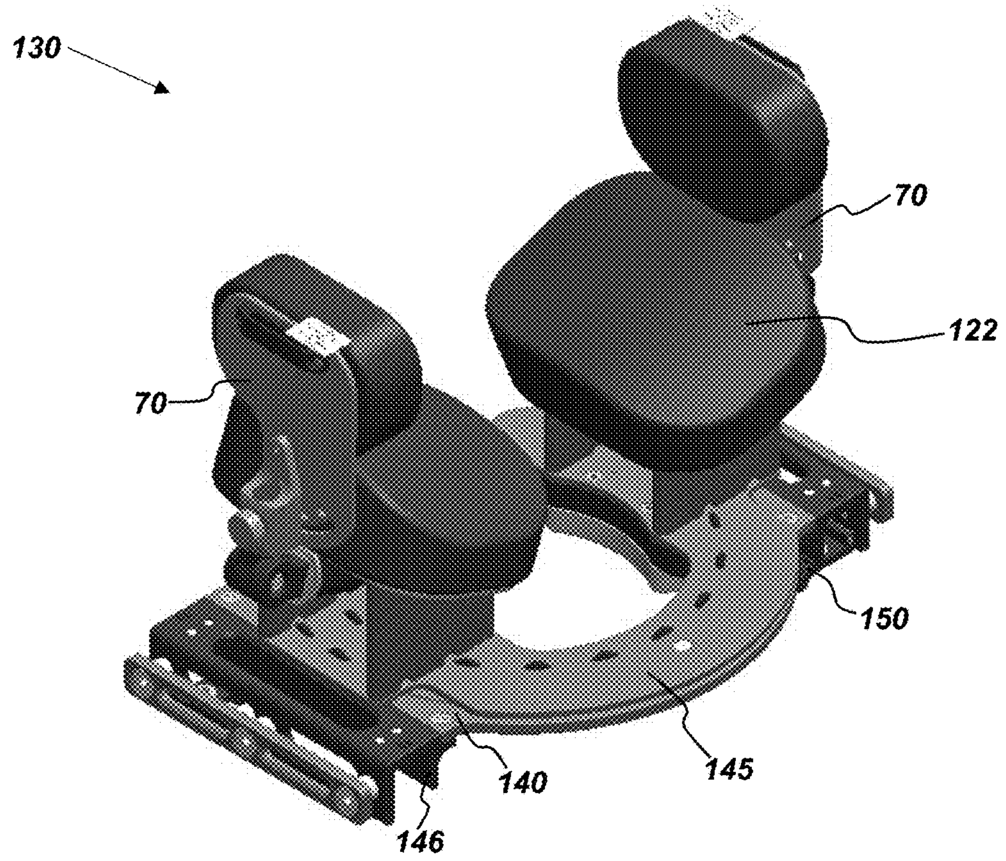
FIGS. 21-22 show perspective views of a pelvic bolster assembly.
Figure 22:
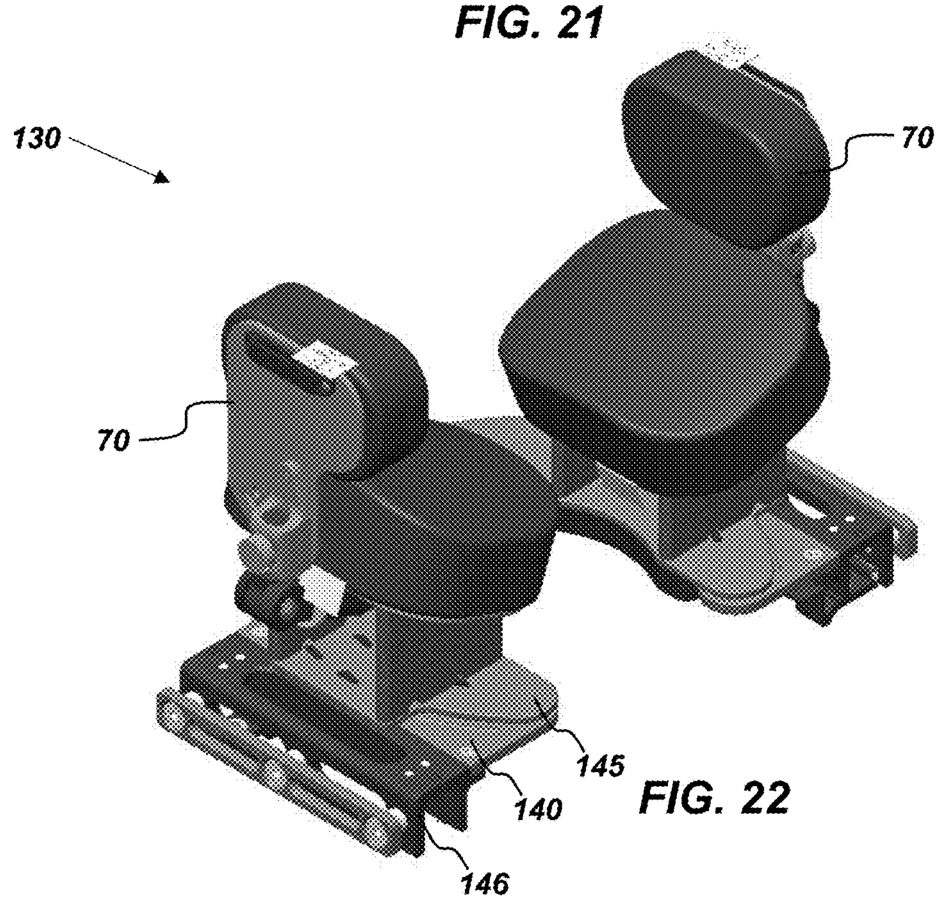
Figure 23:
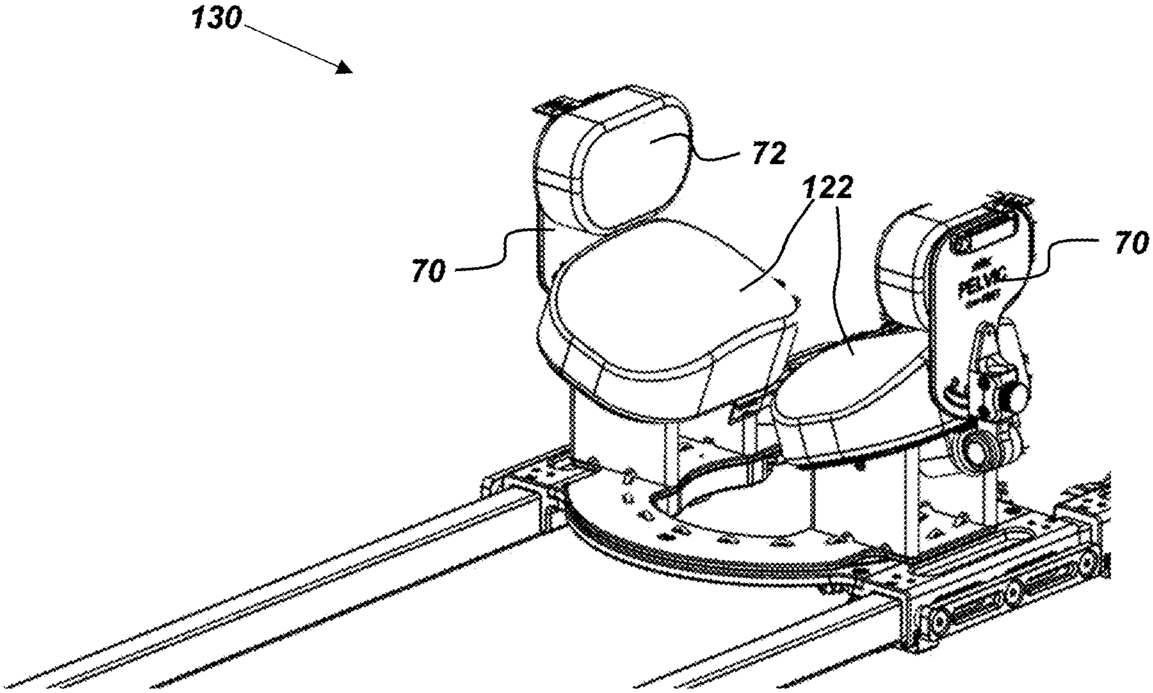
FIG. 23 shows a perspective view of a pelvic bolster assembly attached to opposing rails of a surgical table.

FIGS. 21-23 show perspective views of the pelvic bolster assembly 130. Like the thoracic bolster assembly 30 described above, the pelvic bolster assembly 130 can be configured to allow coronal adjustment. Depending on the desired rotation, the pelvic bolster assembly 130 can typically be provided with at least about 25 degrees of rotation in any desired increment. In some embodiments, the amount of coronal rotation is at least about 10 degrees, at least about 15 degrees, or even at least about 30 degrees. In some embodiments, the amount of coronal rotation is no more than about 35 degrees, no more than about 30 degrees, nor more than about 25 degrees, or no more than about 20 degrees. The coronal adjustment of the pelvic bolster assembly 130 can be similar to the coronal adjustment of the thoracic assembly 30 described above, or coronal adjustment can be achieved by moving the upper portion 145 relative to the base 135 via a mechanical connection such as a drive shaft. The connection can be to a bolt, drive shaft, or screw of the base 135, with a drive or socket to allow for adjustment. This allows a surgeon or clinician to insert a drive rod with a handle into the drive, adjust the upper portion 145 relative to the base 135, and then remove the rod.

In some embodiments, the base 135 of the pelvic bolster assembly 130 is adjustable relative to the lower base portion 140 through other suitable means. For example, any type of gear may be used. Gears that are non-back drivable, such as worm gears, may be preferred. Other drive mechanisms and/or linkages may be provided such as leadscrew/nut mechanism, rack and pinion, a hypoid, a spiral bevel gear, or another gear driven mechanism could be used in place of a worm drive. In some embodiments, the mechanism is manually operated, and in other embodiments, the mechanism is driven by an electric motor, which can be controlled with the push of a button or other actuator proximal to the patient and/or bolster assemblies or from a remote device.

In some embodiments, no drive mechanism is utilized to rotate base 135 relative to lower base portion 140. For example, some embodiments utilize a locking mechanism to prevent base 135 from rotating but that, when unlocked, allow a surgeon or other user to manually twist base 135 (such as with a handle removably or permanently attached to base 135) and then lock base 135 relative to lower base portion 140 when a desired amount of rotation is achieve. In some embodiments, the locking mechanism comprises a handle extending from base 135 configured to pivot up and down, which when pivoted down locks base 135 relative to lower base portion 140, but when pivoted up or away from pelvic bolster assembly 130 not only allows for rotation of base 135 but also provides a handle allowing the surgeon or other user to apply the required force to achieve the rotation.

The pelvic bolster assembly 130 may be provided with one or more lateral bolsters or paddles 70 attached thereto. In the non-limiting embodiment shown in FIGS. 21-23, two lateral pelvic paddles 70 are attached to the pelvic bolster assembly 130. Alternatively, one lateral pelvic paddle 70 may be provided, or in other configurations, lateral paddles 70 may not be provided. The lateral paddles 70 may be provided on opposing lateral sides of the upper portion of the base 135. In some configurations, the lateral paddles 70 may be provided with one or more hinges such that the lateral paddles may be adjusted as described in more detail below. Lateral paddles 70 may also have one or more lateral pads 72 attached thereto. The lateral pads 72 may be comprised of a deformable material.

Figure 24:
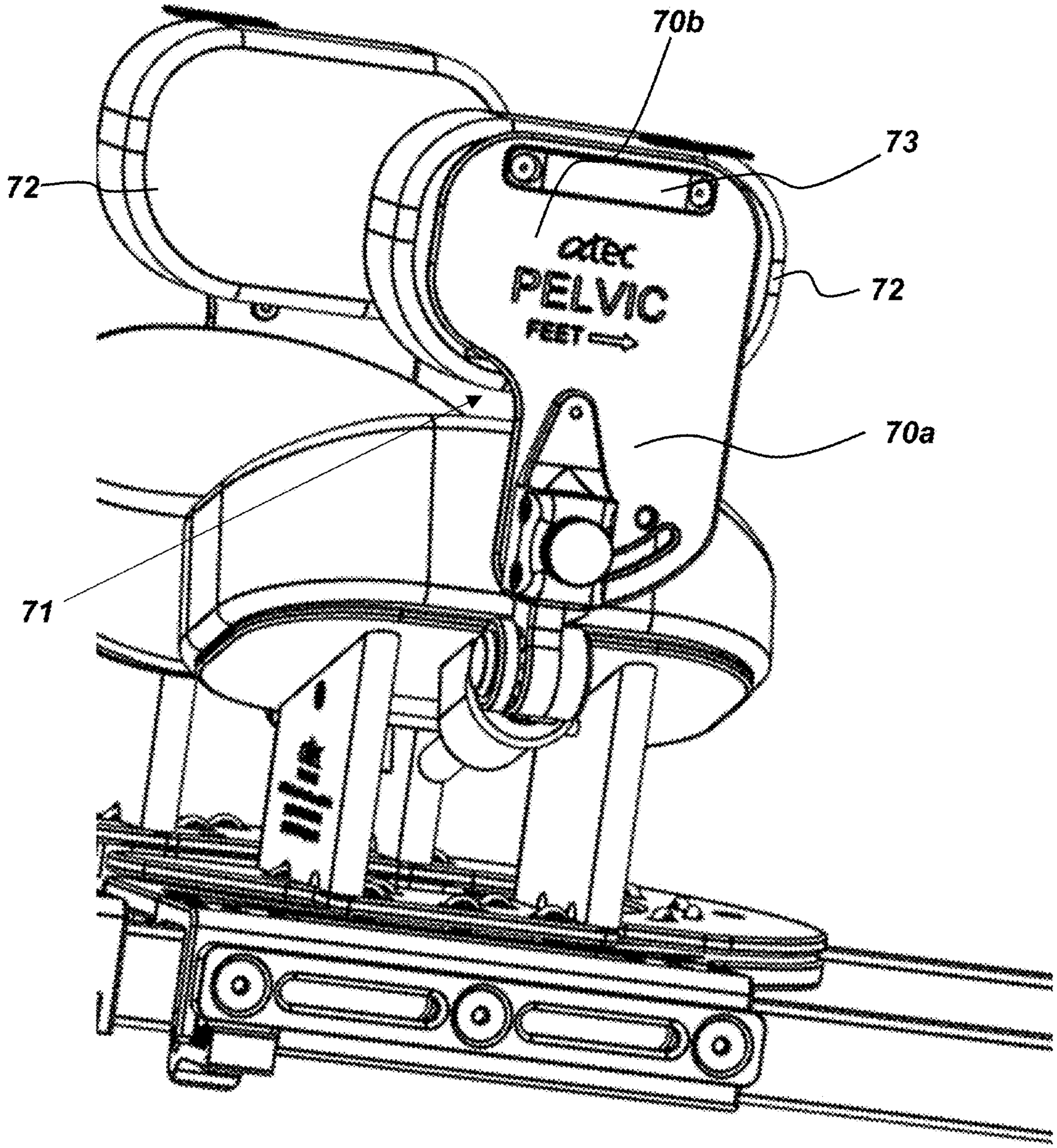
FIG. 24 shows a side perspective view of a pelvic bolster assembly.

Lateral paddles 70 on the pelvic bolster assembly 130 may be shaped to provide lateral support while also maximizing pelvic access for the surgeon. For example, as shown in FIG. 24, the lateral paddle 70 can have a vertical portion 70*a* that connects to the pelvic bolster assembly 130, and a horizontal portion 70*b* that extends horizontally from the vertical portion 70*a*. This configuration creates a shape with a space or opening 71, indicated in FIG. 24 by an arrow, for pelvic access.

According to another aspect, one or more of the lateral paddles 70 may be provided with a strap, which may be permanently secured to the lateral bolsters or may be removable from the lateral bolsters. An opposing lateral bolster may be provided with a strap brace 73 or other mechanism for receiving the strap. The strap may be stretched across the patient's body to the opposing side and buckled or otherwise attached. This may secure the patient to the bolster assemblies 30, 130 while providing additional support and stability during the procedure. It may also reduce and/or eliminate the need to use tape to assist in positioning and retaining the patient within the patient positioning system 10. In some embodiments, a strap extends from a first bolster, loops through a D-ring or similar structure on the second bolster, and is secured to the first bolster. Such a configuration allows a strap to be used from one side of the bed. In some embodiments, a strap extends from one bolster around the patient and around the entire bed and is secured to the original bolster.

Lateral pelvic paddles 70 may be adjusted at multiple points based on the unique needs of the particular patient and the particular access needed by the surgeon. In some configurations, one or more of the lateral bolsters includes one or more hinges. For example, a locking hinge may be adjustable inwardly and outwardly to adjust for the varying patient size. These hinges, along with any strap system used in conjunction with the lateral bolsters, may also be used to vary the amount of lateral compression by the bolsters on the patient. The hinges may also allow the lateral bolsters to be positioned substantially horizontally to facilitate loading of a patient onto pelvic bolster assembly 130.

Lateral paddles 70 may also be capable of rotating cranially and/or caudally, etc. Locking hinge mechanisms may be used, and/or indexed locking hinge mechanisms may be used to allow for adjustment to various indexed positions. In other configurations, there may be fewer hinges provided and fewer degrees of rotation.

Lateral paddles 70 may also be adjustable in the sagittal plane of the patient (i.e., inwardly towards the patient and outwardly away from the patient). In one configuration, the hinge connection of one or both lateral pelvic paddles 70 includes a shaft that inserts into a receiver. The shaft is slidably adjustable relative to the receiver to provide greater customization depending on patient size and surgeon preference. This configuration also allows lateral bolsters to be (1) installed after the patient has been loaded onto pelvic bolster assembly 130 prior to surgery; (2) removed prior to removing the patient from pelvic bolster assembly 130 after surgery; and (3) removably connected to either of the opposing sides of the surgical frame 5.

Lateral paddles 70 can also include one or more strap braces 73. A strap (not shown) can be threaded through a first strap brace 73, across the patient's body and threaded through a second strap brace 73. Any suitable material may be used for the strap, such as nylon, etc. Providing strap braces and a strap may reduce and/or eliminate the need to use tape to assist in positioning and retaining the patient within the patient positioning system 10. In some embodiments, the strap extends from one bolster around the patient, around the entire bed, and is secured to the original bolster. In other embodiments, the strap extends from a first bolster, loops through a D-ring or similar structure on the second bolster, and is secured to the first bolster. Such a configuration allows a user to secure the strap over the patient from one side of the bed.

Bolsters and paddles may include one or more pads or cushions attached thereto. Pads are formed of a deformable material, such as resilient foam, etc. In some configurations, pads have a sterilizable surface and may be cleaned and reused. In other configurations the pads may be disposable. In other configurations the pads may be configured to receive a disposable pad cover. Pads may be attached, for example, via hook and loop fastener, to the bolsters and/or paddles. Any of the bolsters and/or paddles discussed herein may be designed to achieve an overhang of each respective pad relative to whatever surface supports the pad. Such an overhang reduces contact between a patient and any non-padded surfaces of the patient positioning system 10. The overhang may be anywhere from about 0.5 cm to about 5 cm, from about 1 cm to about 4 cm, or from about 1.5 cm to about 3 cm.

Figure 25:
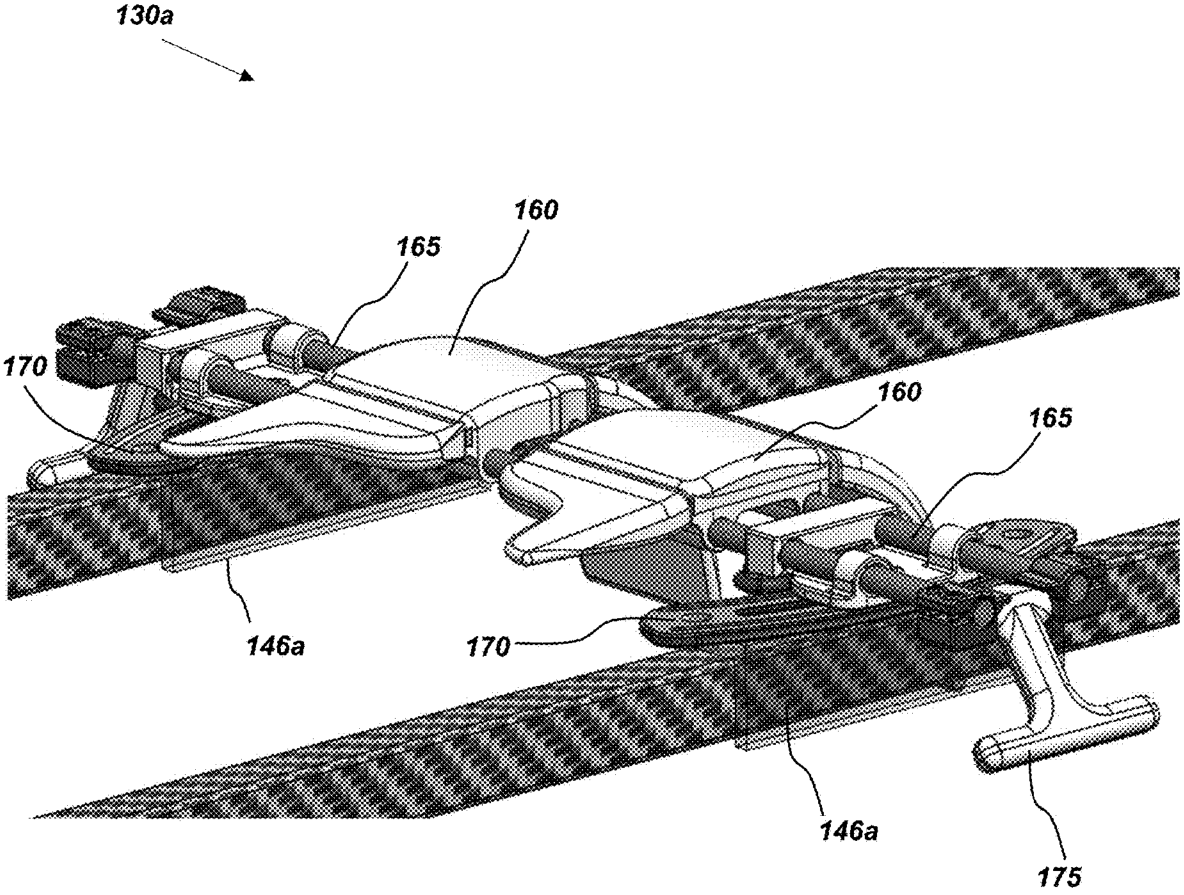
FIG. 25 shows a perspective view of an alternative embodiment of a pelvic bolster assembly.

FIG. 25. Illustrates another embodiment of a pelvic bolster assembly 130*a* according the present disclosure. Pelvic bolster assembly 130*a* may be used in conjunction with thoracic bolster assembly 30. Pelvic bolster assembly includes a patient support surface 160 secured to a crossmember 165, each end of which is in sliding engagement with respective base structures 170 that are configured to be removably secured to parallel rails of a surgical table (such as via a rail coupler 146*a*). Each end of crossmember 165 further includes a handle 175 configured to both provide leverage for rotating crossmember 165 relative to base structures 170 and, when in a locked position, to prevent crossmember 165 from rotating relative to base structures 170. In this illustrated embodiment, the locked position is achieved when handle 175 is pressed downward or toward the ground. When so positioned, the base of handle 175 acts as a cam pressing against a portion of base structure 170.

Figure 26:
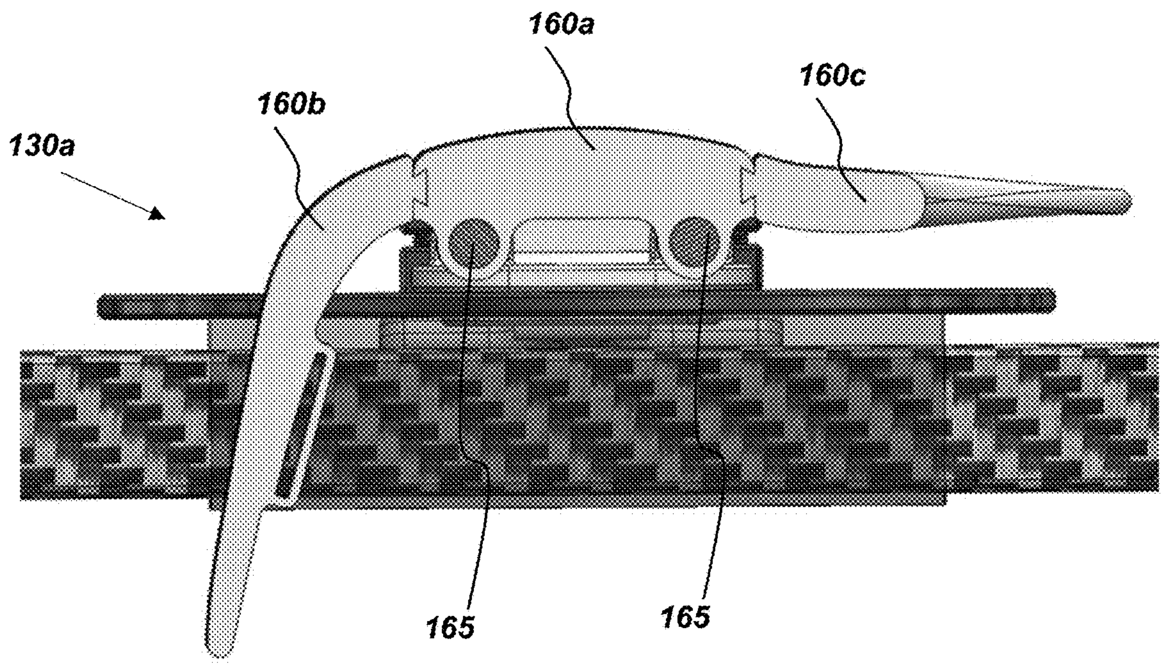
FIG. 26 shows a cross-sectional, side view of the pelvic bolster assembly of FIG. 25.

Patient support surface 160 is comprised of modular components that can be swapped out with other components depending on the size of the patient, the medical needs of the patient, etc. FIG. 26 illustrates that patient support surface 160 includes a central component 160*a*, a cephalad component 160*b*, and a caudal component 160*c* with a dovetail interface between each of the cephalad 160*b* and caudal 160*c* components and the central component 160*a*, though any number of suitable connection mechanisms may be used.

Figure 27:
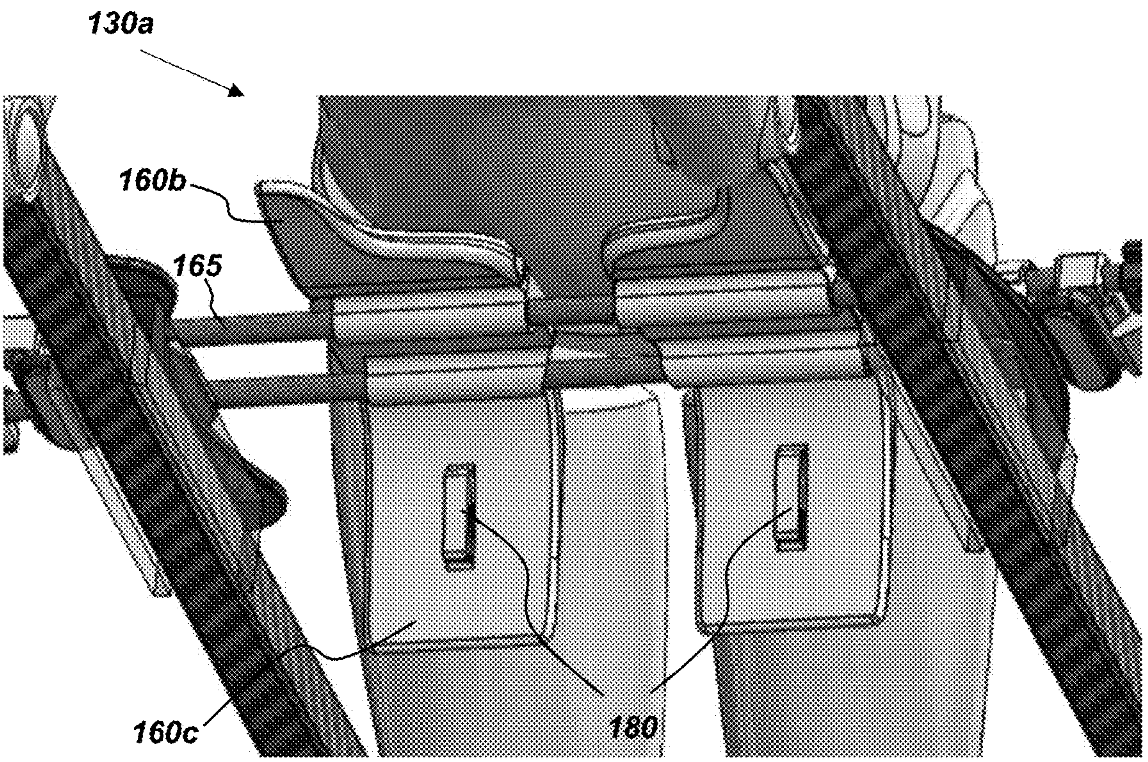
FIG. 27 shows a perspective of the underside of the pelvic bolster assembly of FIG. 25.

FIG. 27 shows the underside of patient support surface 160 with a patient in a supine position on patient support surface 160. In this illustrated embodiment, cephalad component 160*b* is shaped to allow the patient's stomach to freely hang below the patient positioning system. Caudal component 160*c* is curved downward to allow the patient's legs to pass through the parallel rails of the surgical table. To help secure the legs when in this position, caudal component may 160*c* include a pair of strap braces 180 or loops, though only a single strap brace 180 would suffice to allow the patient's legs to be secured in place for the duration of the surgical procedure.

Methods for Patient Loading

Before the patient is loaded onto the bolster assemblies 30, 130, the surgeon may first adjust the position of the bolster assemblies 30, 130 longitudinally along the rails 15, 20, according to the size of the patient. The surgeon may further adjust the top plate 56 of the thoracic bolster assembly and/or the head support portion 52, according to the size of the patient. In addition to adjusting the placement of the bolster assemblies, the surgeon can also select the desired shape and size for one or more of the thoracic chest pads, pelvic base pads, and/or pelvic lateral pads. For example, to achieve a desired counter pressure, a surgeon may select a larger thoracic chest pad to be placed on the side of the patient that is opposite of the patient's rib hump. Once all adjustments and customizations are made for the size of the patient, the patient can be loaded onto the bolster assemblies 30, 130.

For example, the patient could be in a supine position on a stretcher or gurney, with the stretcher or gurney placed immediately adjacent to the patient positioning system 10. The patient could be transferred to the patient positioning system 10 in the prone position. With the patient in the prone position, one or more lateral bolsters can be secured. After lateral bolsters have been secured to the thoracic and pelvic bolsters, straps can then be secured to the bolsters and/or paddles to keep the patient in place.

The surgeon can then adjust the upper portion of the bolster assemblies as desired (i.e., to achieve a desired kyphosis and/or a desired adjustment in a coronal plane). Additionally, one or more lateral paddles on the bolster assemblies can be adjusted to achieve the desired patient positioning. The arm of the thoracic bolster assembly 30 can also be attached and adjusted to achieve a desired pressure on a rib hump.

According to another aspect, one or more components of the patient positioning system may be formed of a radiolucent material, such as carbon fiber and polymer materials that are not only radiolucent but may also reduce the weight of the patient positioning system, thereby making the system easier to install, remove, and/or manipulate. Using radiolucent components may allow x-rays to be taken intraoperatively without components of the patient positioning system blocking the patient's anatomy in the x-ray image.

In some embodiments, radiolucent materials are combined with radiopaque materials where the improved strength of the radiopaque material is desired. For example, in some embodiments, a worm wheel includes a metal insert to provide teeth that are sufficiently strong. In some embodiments, the location of the radiopaque materials is selected to minimize the impact such materials have on x-ray images.

According to another aspect, the component parts of a patient positioning system may be replaceable. For example, stress on certain components may cause uneven wear over time or even failure of one or more of the components. In some embodiments, one or more of the worm shaft or worm gear may be replaced without the need to replace the entire patient positioning system 10. Similarly, in some embodiments, covers may be provided for one or more of the pads on the anterior and posterior supports. Such covers may be disposable, one-time use covers, or washable, re-useable covers. In some embodiments, one or more of the pads are replaceable and may be releasably secured to the patient positioning system by an attachment means, such as hook and loop fastening material, etc. Pads may be replaceable and/or disposable.

According to another aspect, the patient positioning system may be adjusted while the patient is on the support structure or when the support structure is supporting the weight of the patient. That is, the patient positioning system may be adjusted intraoperatively. The positioning system may also be adjusted without a patient on the positioning system.

Other methods of adjustment may also be used. Adjustment may be with one or both of the pelvic and thoracic assemblies 130, 30. After a patient is secured, a surgical frame may be rotated about a longitudinal axis. This may further improve access to the spine of the patient for surgical procedures. According to another aspect, the patient positioning system may also provide options for translational movement of the patient. The translational movement may be distinct and independent of the rotational movement of the patient in the coronal plane.

Another Embodiment of a Patient Positioning System

Figure 28:
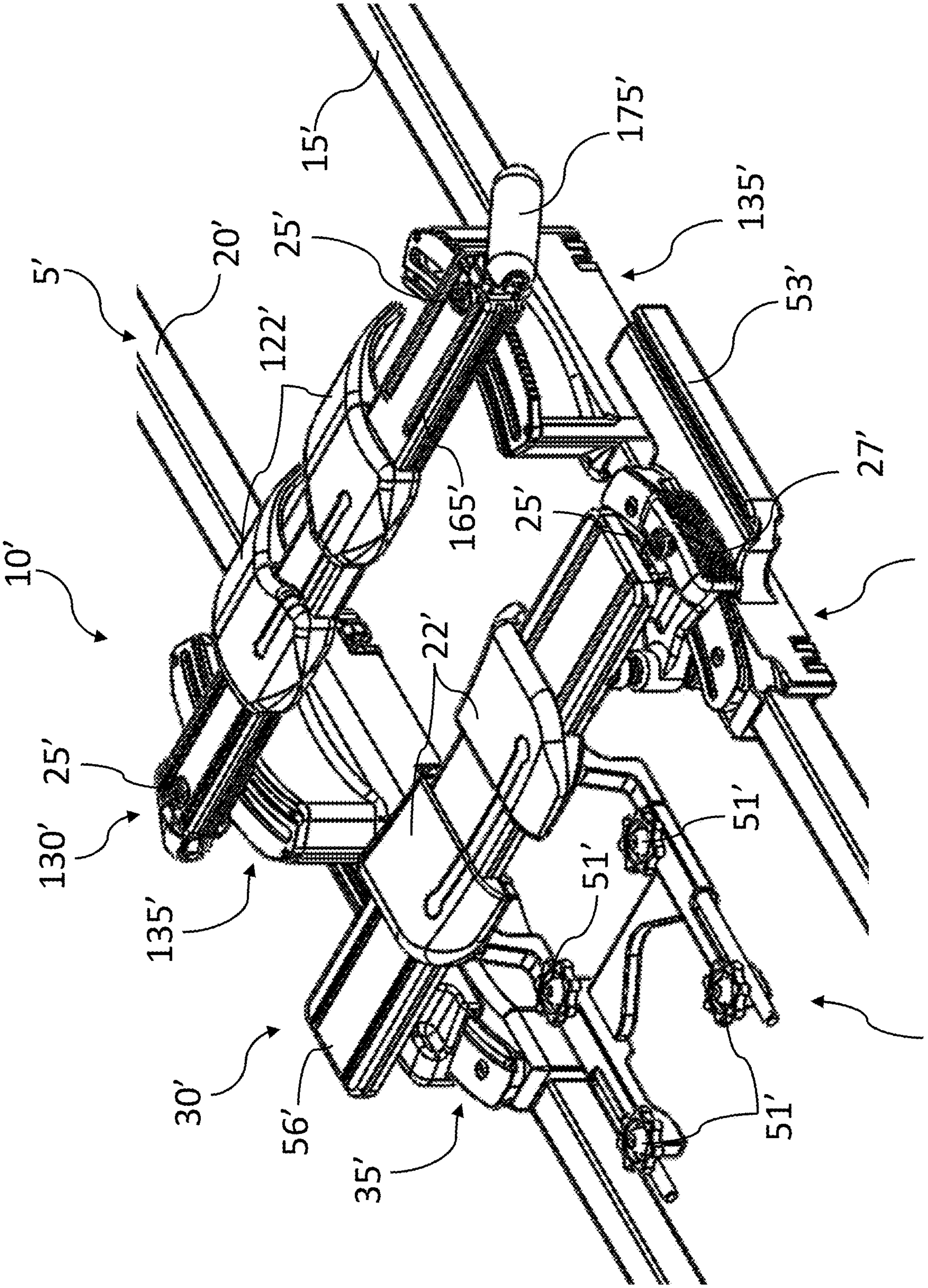
FIG. 28 shows a perspective view of another embodiment of a patient positioning system having a thoracic bolster assembly and a pelvic bolster assembly.
Figure 29A:
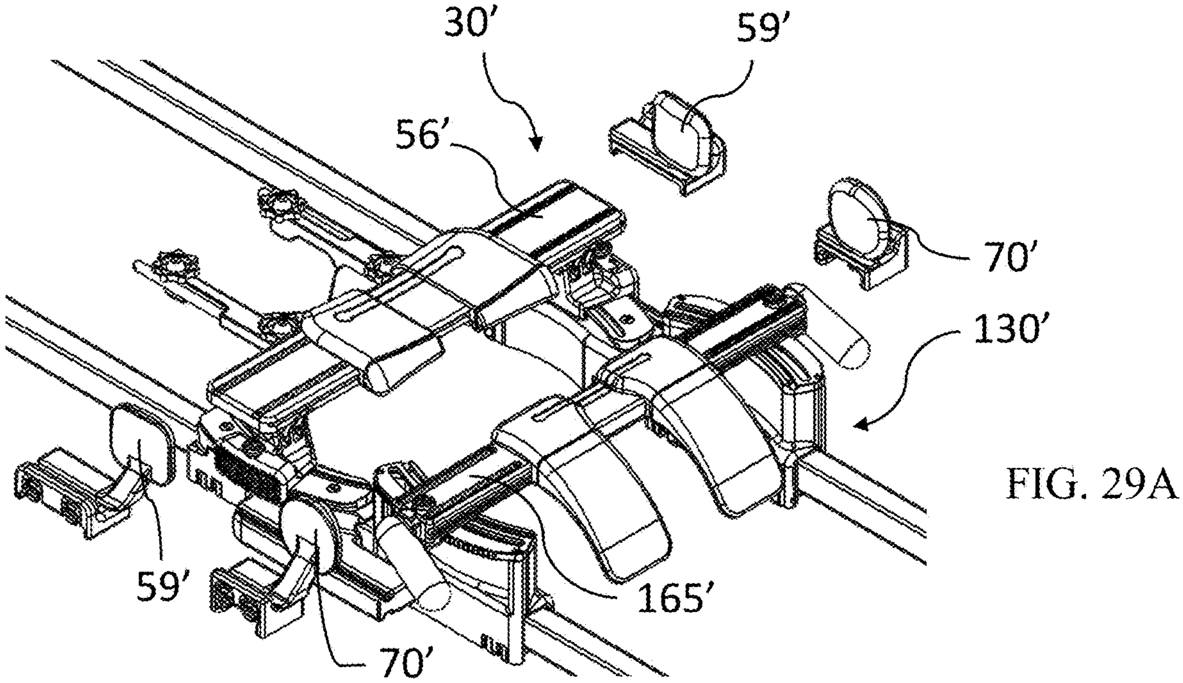
FIGS. 29A through 29C schematically illustrate attachment of thoracic and pelvic lateral paddles onto the patient positioning system of FIG. 28.
Figure 29B:
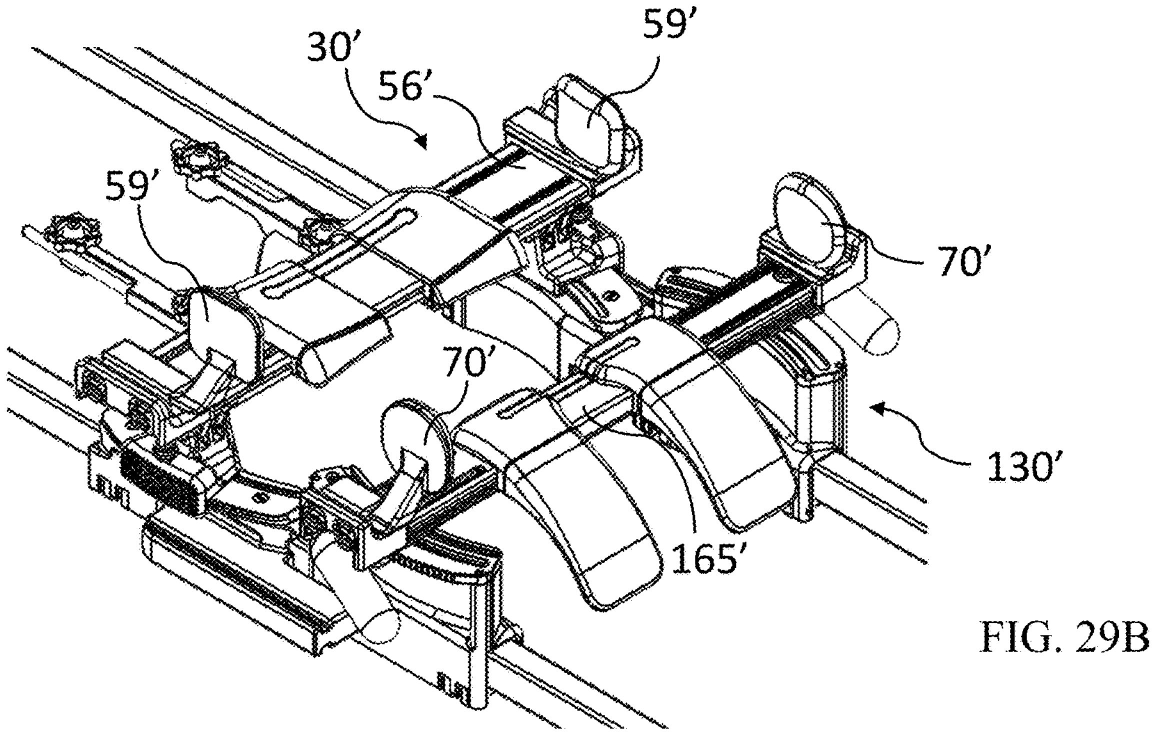
Figure 29C:
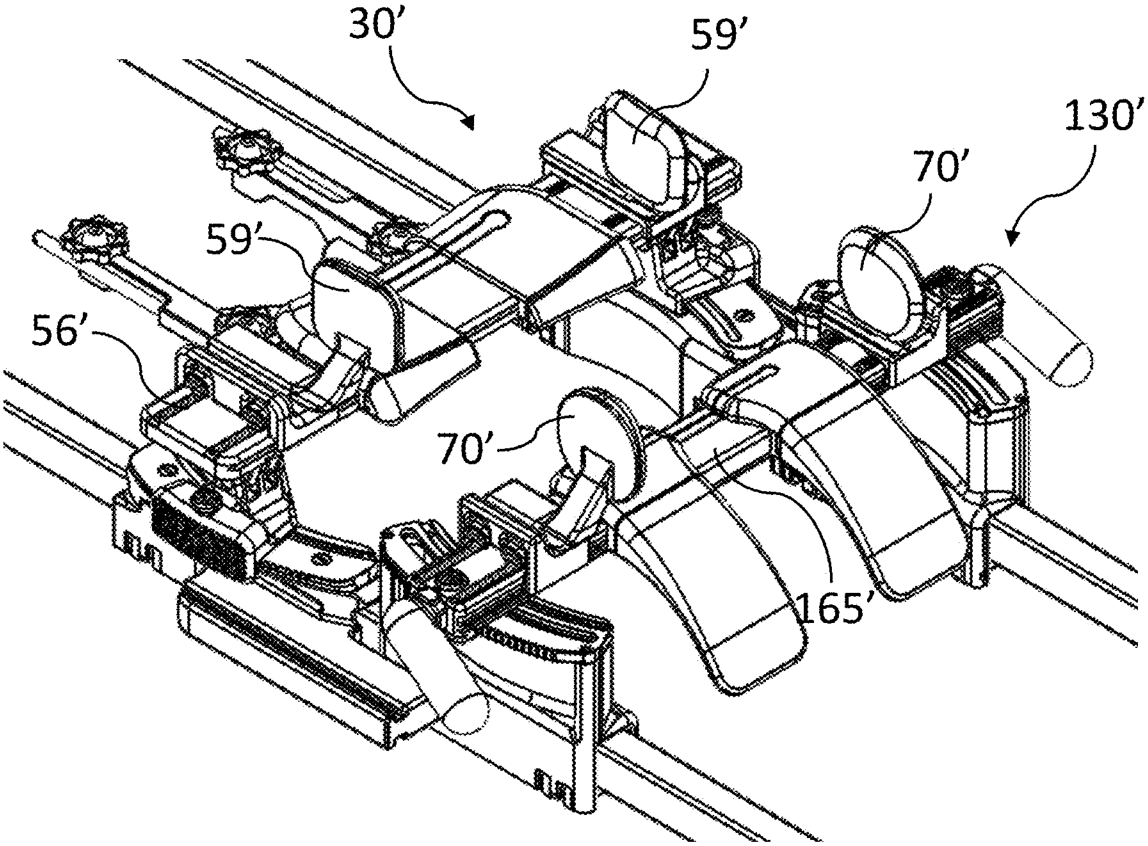

FIG. 28 shows a perspective view of another embodiment of a patient positioning system 10' having a thoracic bolster assembly 30' and a pelvic bolster assembly 130'. Each of the thoracic bolster assembly 30' and pelvic bolster assembly 130' may be more simply referred to as "bolster assembly 30'" and "bolster assembly 130'" or as "bolster assemblies 30' and 130'." The pelvic bolster assembly 130' may support a portion of a pelvis of a patient, while the thoracic bolster assembly 30' may support a portion of a chest or thoracic region of a patient.

Bolster assemblies 30' and 130' are removably secured to rails 15' and 20' of surgical bed frame. Rails 15', 20' may extend from the superior or cranial end of surgical bed frame 5' to the inferior or caudal end of surgical bed frame 5'. Rail couplers, as described in more detail below, are slidably mountable on opposing rails of a surgical bed frame 5' allowing the bolster assemblies 30', 130' to be adjusted longitudinally along the opposing rails of the surgical bed frame 5'. Bolster assemblies 30' and 130' may be positioned at any point along the distance from the superior/cranial end to the inferior/caudal end, though preferably in those positions that will provide the best support for a patient while allowing desirable surgical access to the patient's spine.

Figure 31:
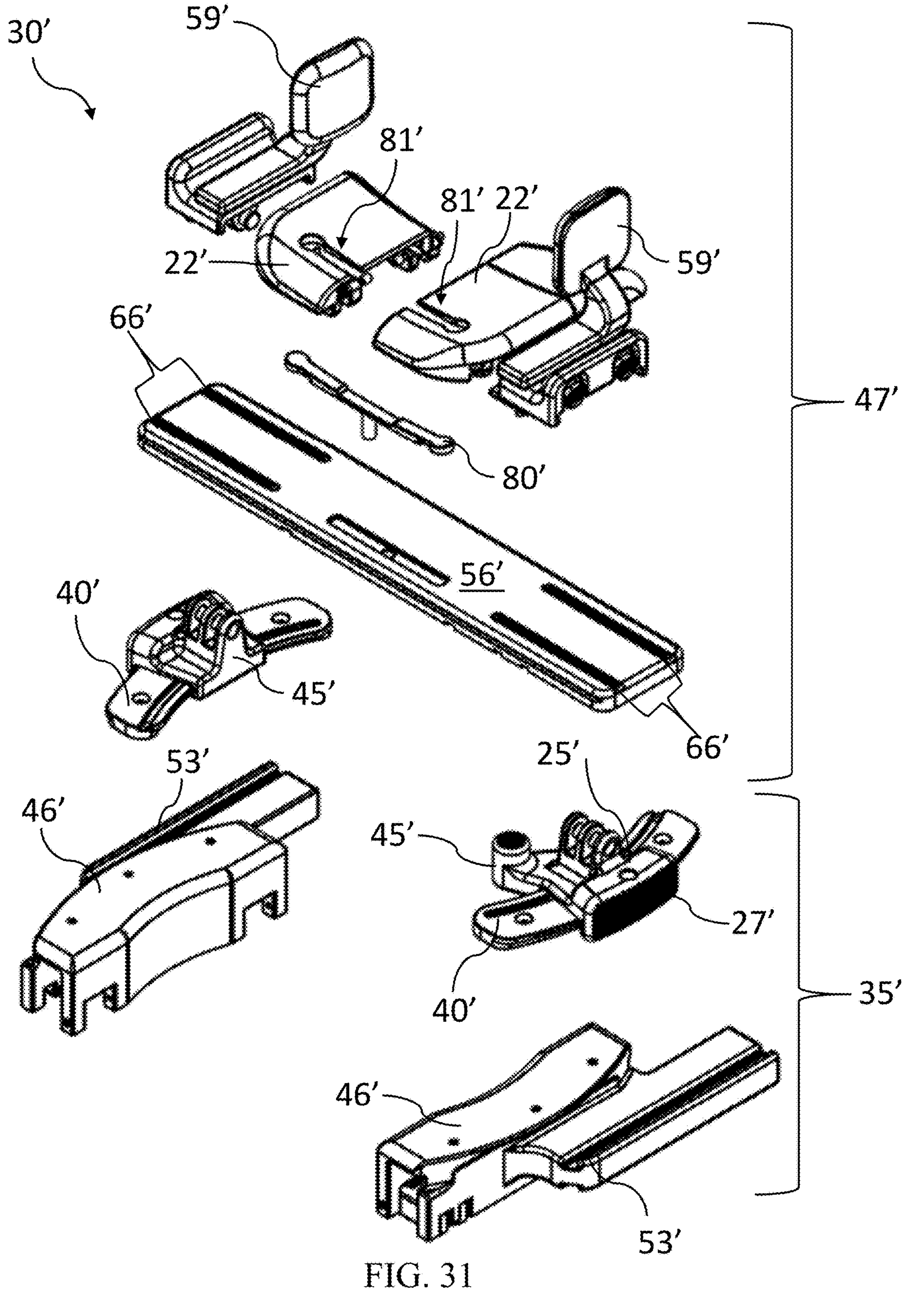
FIG. 31 shows an exploded view of the thoracic bolster assembly of FIG. 28.
Figure 32:
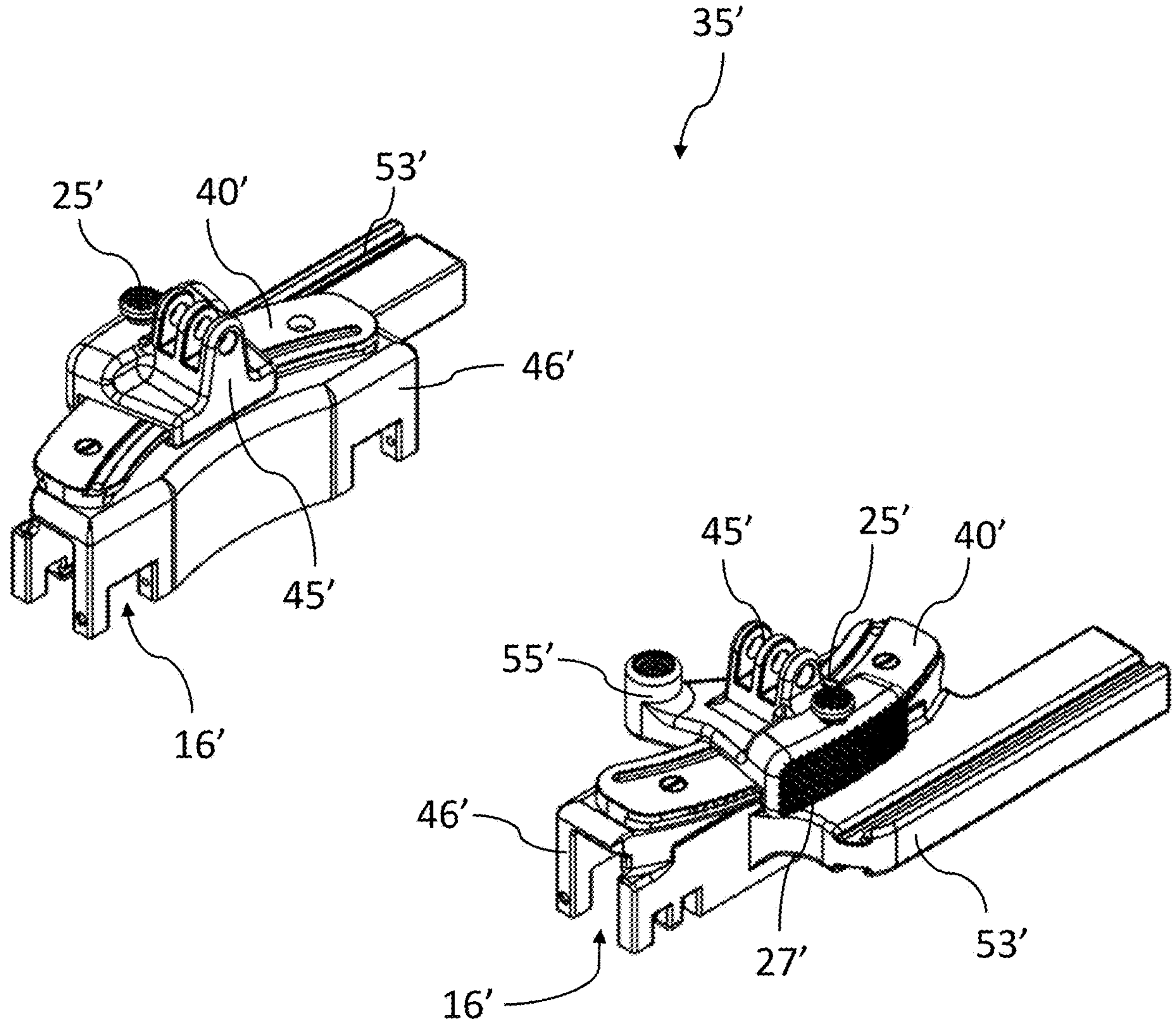
FIG. 32 shows a perspective view of the base of the thoracic bolster assembly.
Figure 46:
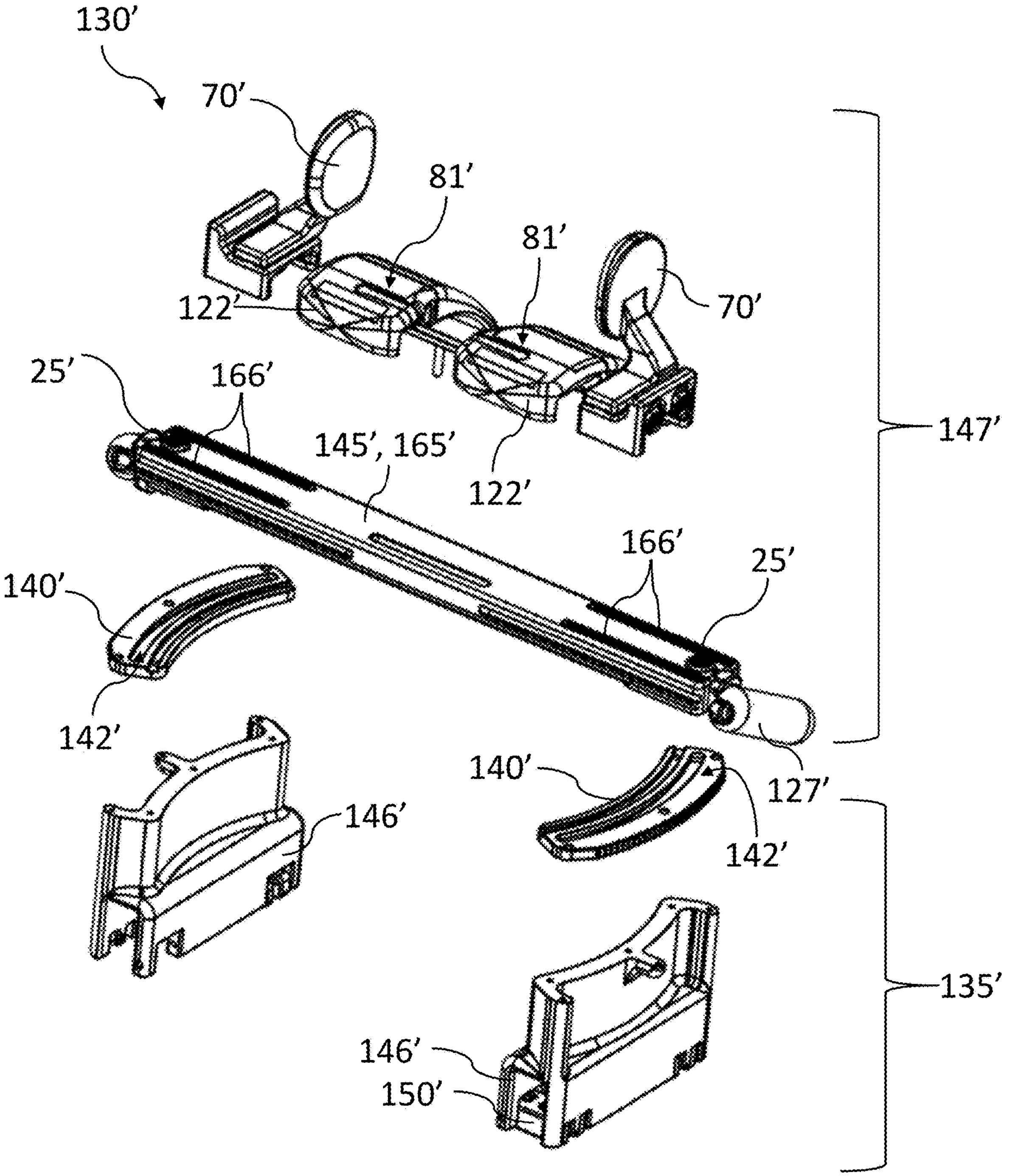
FIG. 46 shows an exploded view of the pelvic bolster assembly from the patient positioning system of FIG. 28.

Bolster assemblies 30', 130' include a base 35', 135' which is comprised of a lower base portion 40', 140' and an upper base portion 45', 145' (see FIGS. 31 and 46). For example, lower base portion 40' may include a lower base plate and upper base portion 45' may include an upper base plate. Each lower base portion 40', 140' may be mountable onto rail couplers 46', 146', which are slidable along the parallel rails 15' and 20' of the surgical frame bed 5'. In some configurations, the upper portions 45', 145' of the base 35', 135' are movable relative to the lower portion 40', 140' in one, two, or more directions. Alternatively, the upper portion 45', 145' may be fixed relative to the lower portion 40', 140' in one or two directions.

In some configurations, the base 35', 135' of the bolster assemblies 30', 130' includes means for attaching the bolster assemblies 30', 130' to rails 15', 20' of a surgical frame bed. For example, the lower base portion 40' can include or be mountable to rail couplers 46', 146' that are sized and shaped for receiving the parallel rails 15' and 20', respectively, of surgical frame bed 5', and may be provided on opposing sides of the base 35', 135'. The rail couplers 46', 146' can have an open channel 16', 116' to receive surgical bed rails 15', 20'. In some configurations, the rail couplers 46', 146' may be slidably connected to or mounted onto each of the rails 15', 20', to allow bolster assemblies 30', 130' to be longitudinally adjustable along the rails of the surgical bed frame and to allow for further unique adjustments based on the size of the patient and the access needs of the surgeon for the particular procedure.

Figure 33:
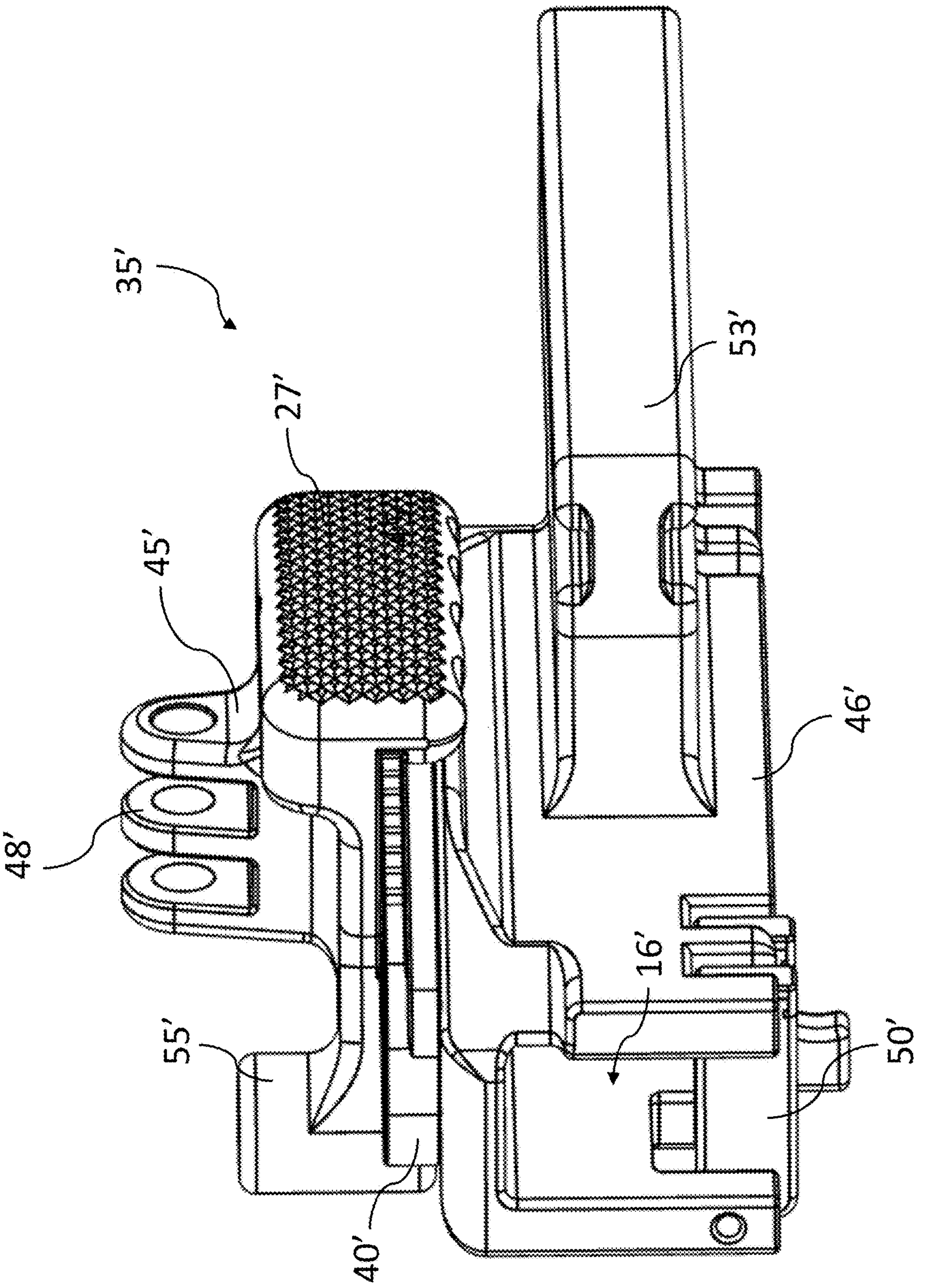
FIG. 33 shows a left-hand portion of the base of FIG. 32.
Figure 34:
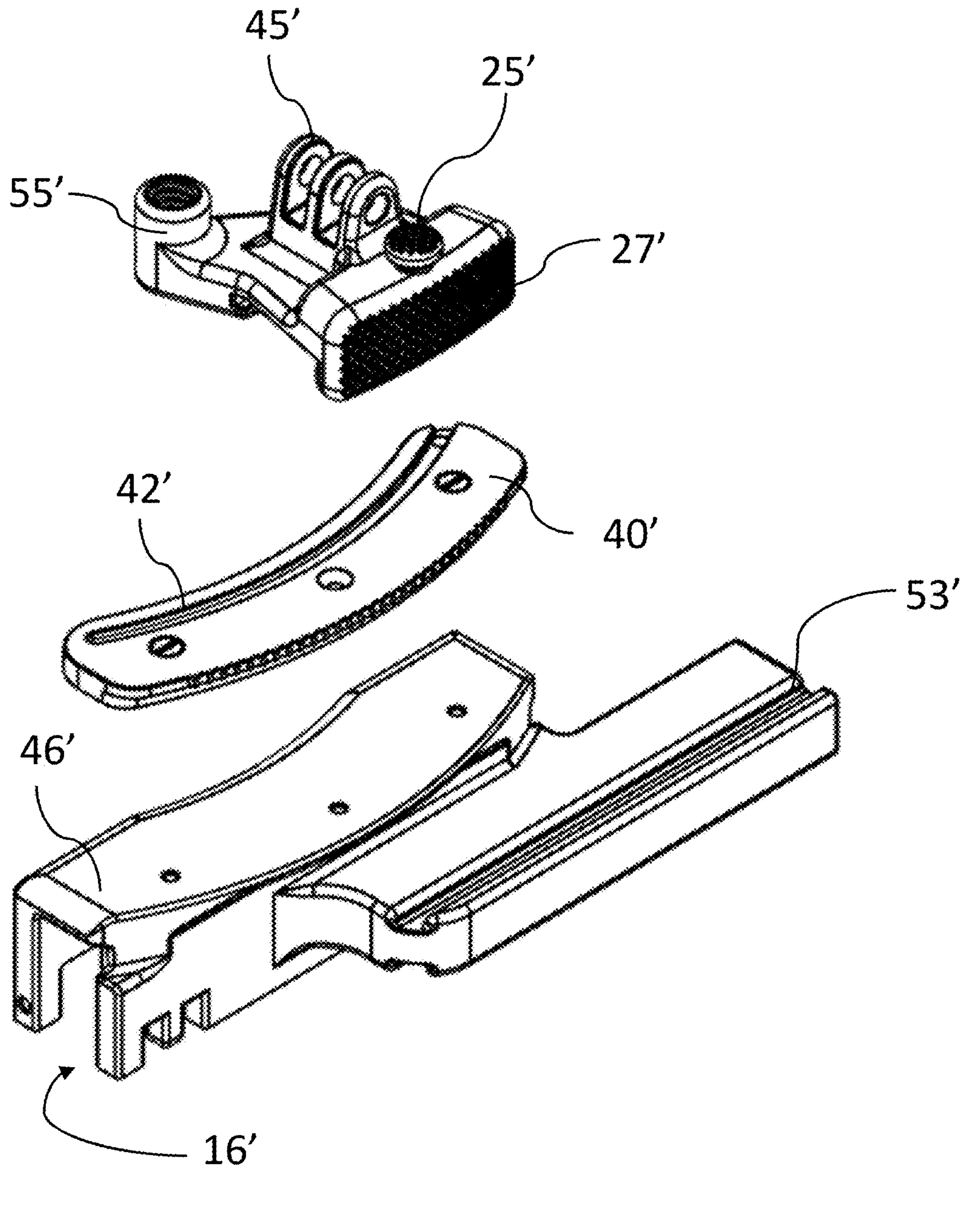
FIG. 34 shows an exploded view of FIG. 33.
Figure 35:
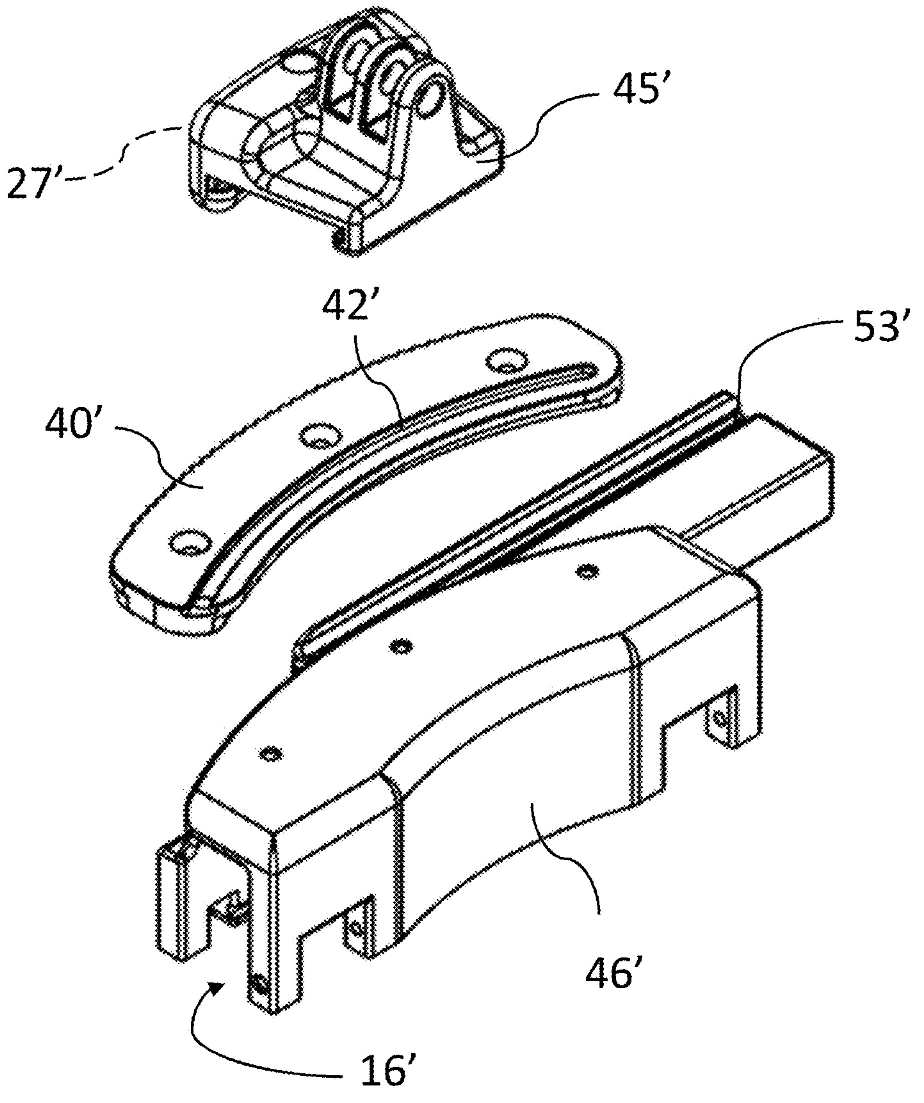
FIG. 35 shows an exploded view of a right-hand portion of the base of FIG. 32.
Figure 36:
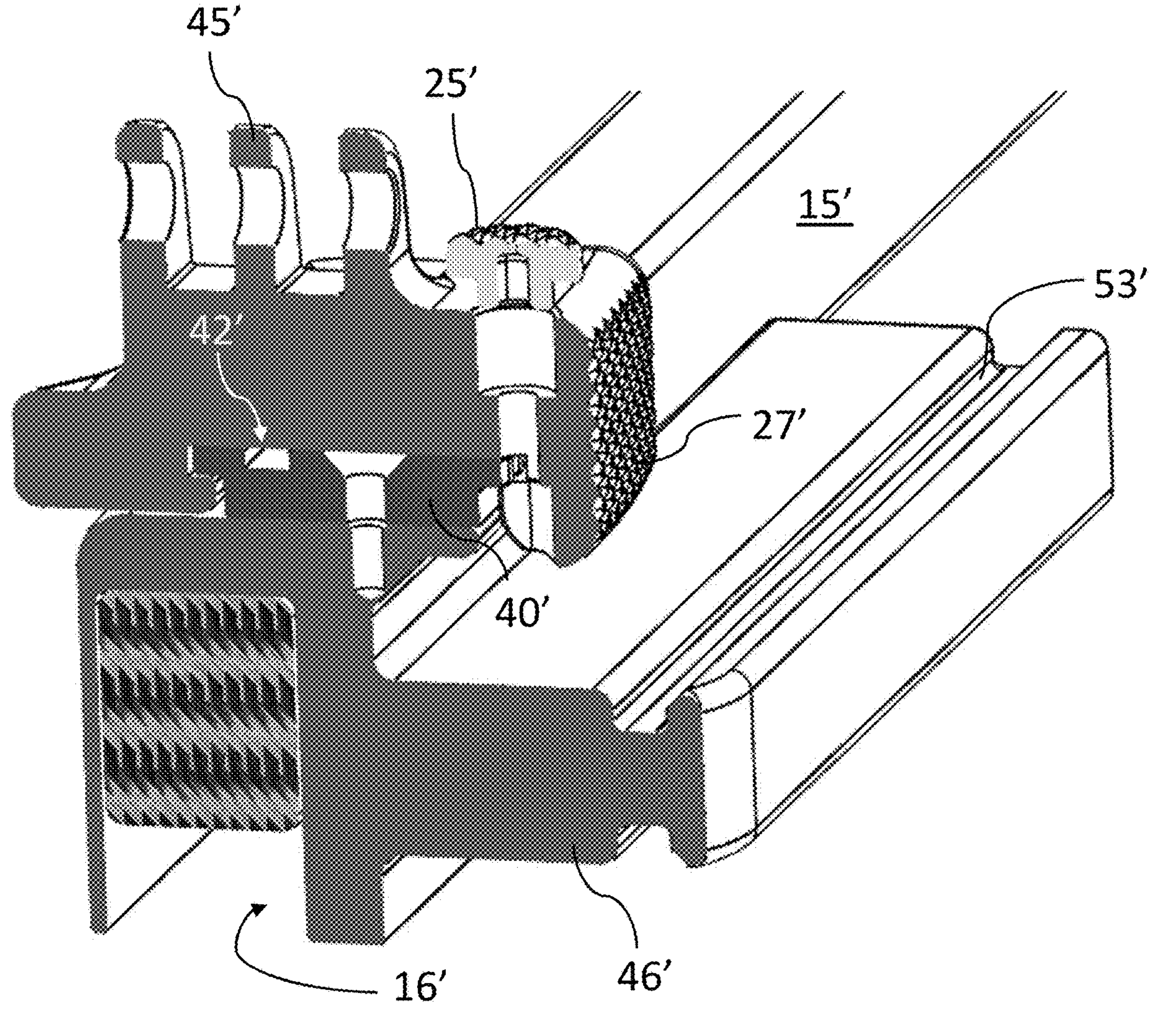
FIG. 36 shows a cross-sectional view of FIG. 33.

In some embodiments, one or more fasteners or locking mechanisms may be provided on one or both of the opposing lateral sides to lock the rail couplers 46', 146' of lower base portion 40', 140' to the rails 15', 20' of the surgical frame 5'. For example, a locking mechanism may be provided that consists of a latch 50', 150' (see FIGS. 33 and 46) that has a closed position wherein the latch 50', 150' extends across the open channel 16', 116' of the rail coupler 46', 146' of lower base portion 40', 140' and connects to the inner side of the rail coupler 46', 146'.

The latch 50', 150' can include an outwardly extending lip which mates with a groove provided on the exterior side of the inner portion of the rail coupler 46', 146'. A release can be provided on the inner side of the latch 50', 150', allowing a clinician to reach under the base 35', 135' and pull downwardly on the release to release the latch 50', 150' manually. The latch 50', 150' can also include one or more gussets formed of resilient material, such as rubber or any other suitable material. When the latch 50', 150' is closed, it may compress a gusset against the rail 15', 20' of the surgical frame 5', reducing slippage of the rail coupler 46', 146' relative to the rails of the surgical frame when the latch 50' is closed.

Each of the thoracic bolster assembly 30' and pelvic bolster assembly 130' may be in connection with one or more support pads, such as thoracic chest pads 22' and pelvic base pads 122'. The support pads 22', 122', may be removably connected to the bolster assemblies 30', 130', (for example, via hook-and-loop fasteners) such that the pads 22', 122' can be customized for patients depending on the size of the patient and the particular surgical needs. Larger pads, smaller pads, pads with different contours, shapes, etc., may be used. For example, pads can be used both to support the patient and to achieve the desired pressure/counter pressure for spinal fixation, as discussed in more detail below.

Referring to FIGS. 31 and 42A through 42D, the thoracic support pads 22' may be slidably disposed along a deck 56', such that the thoracic support pads 22' may be adjusted to accommodate larger or smaller patients. For example, each thoracic support pad 22' may define a channel 81' for receiving a sizer, or removable spacer, 80'. The sizer 80' may be chosen according to a size of the patient. Sizers 80' can be provided in several different lengths to accommodate differently sized patients.

The support pads 22' may be positioned along the deck 56' and the sizer 80' may be positioned within the channels 81' to hold the support pads 22' in the desired position along the deck 56'. For a larger patient, the sizer 80' may be longer and the support pads 22' may be positioned further from each other (or a more outward position on the deck 56'). For a smaller patient, the sizer 80' may be shorter and the support pads 22' may be positioned closer to each other (or a more inward position on the deck 56'). The sizer 80' may be shaped like a dog-bone or any other appropriate shape to hold the position of the support pads 22' along the deck 56'. The channels 81' may be shaped corresponding to the shape and size of the sizer 80'. The pelvic support pads 122' are similarly positioned and arranged along a deck 165' of the pelvic bolster assembly 130' (see FIGS. 42A through 42D).

Adaptors 53', 153' may be mounted to or incorporated in the rail couplers 46', 146' of the thoracic assembly 30' and/or pelvic assembly 130' to allow a user to attach various instruments such as one or more A-arms, arm boards, etc., to the surgical frame. In the non-limiting example shown in FIGS. 31 and 46, adaptors 53', 153' are incorporated to the lateral sides of each of the rail couplers 46', 146'. Adaptors 53', 153' may provide a convenient method for a clinician to attach table-mounted surgical accessories, such as retractors, A-arms, robotic equipment, etc. Instead of being included on both rail couplers 46', 146', an adaptor 53', 153' may be included on only one rail coupler. Alternatively, the adaptors 53', 153' could be included on another portion of the base 35', 135' of the bolster assembly 30', 130'. As another alternative, adaptors 53', 153' may be provided in a plurality of different locations and configurations of one or more of the bolster assemblies 30', 130'. Or adaptors(s) 53', 153' may not be provided. Instead of adaptor(s), one or more Clark sockets may be provided attached to one or more of the lateral sides of the base 35', 135' of one or more of the bolster assemblies 30', 130'. Clark sockets may be attached either directly to the lateral sides or may be attached to the adaptors 53', 153'.

Figure 40:
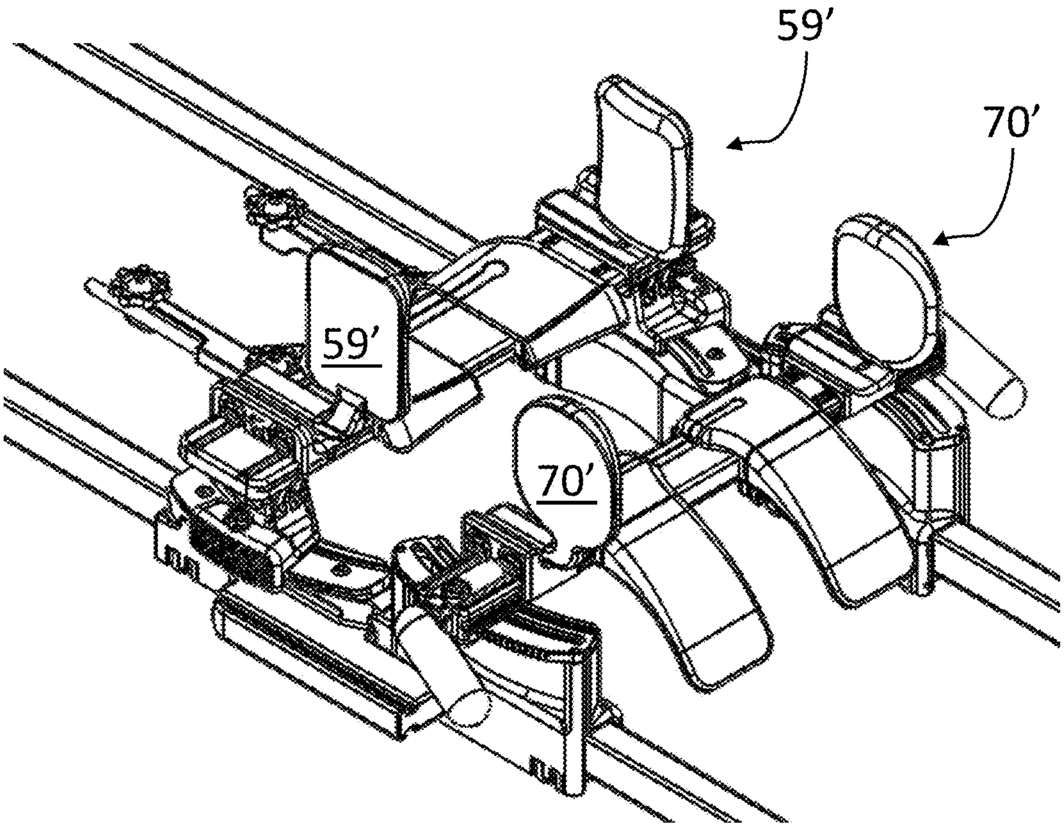
FIG. 40 shows additional embodiments of thoracic and pelvic lateral paddles attachable to the patient positioning system of FIG. 28.
Figure 41A:
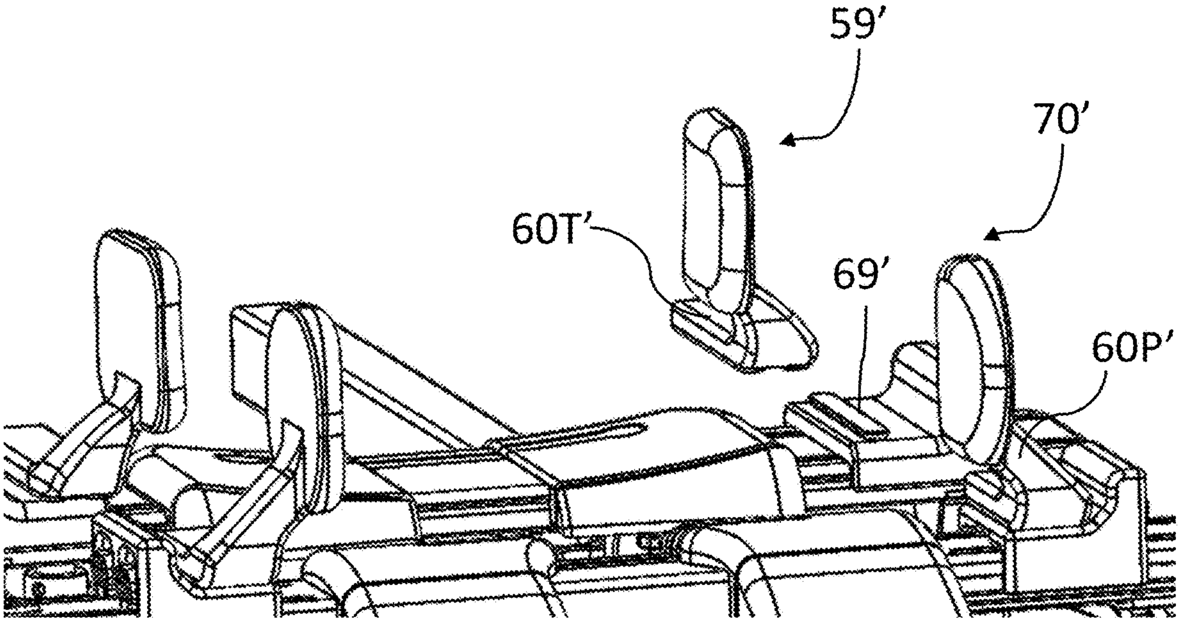
FIGS. 41A through 41C show attachment of the thoracic lateral paddles to the thoracic bolster assembly.
Figure 41B:
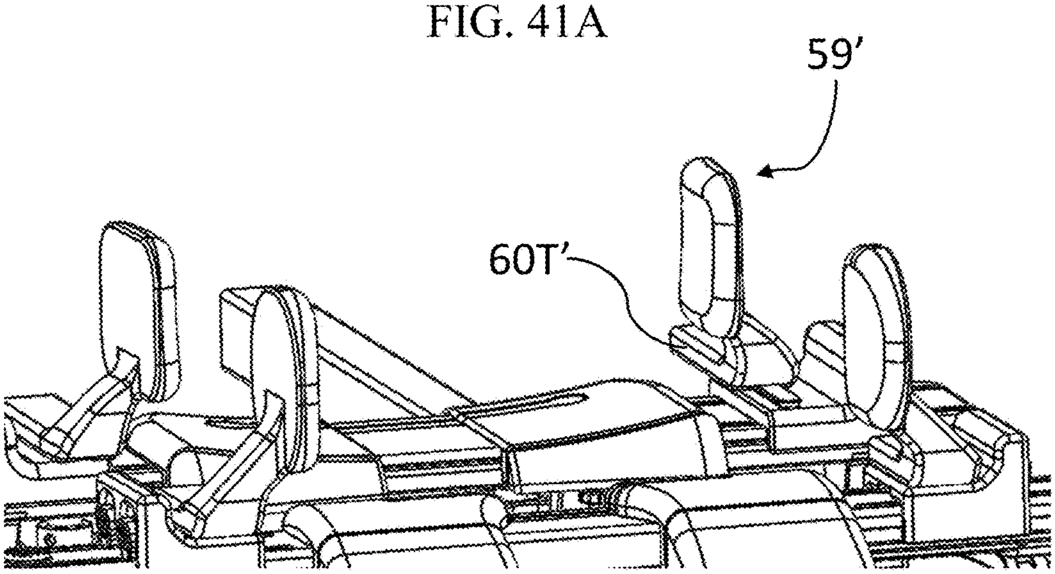
Figure 41C:
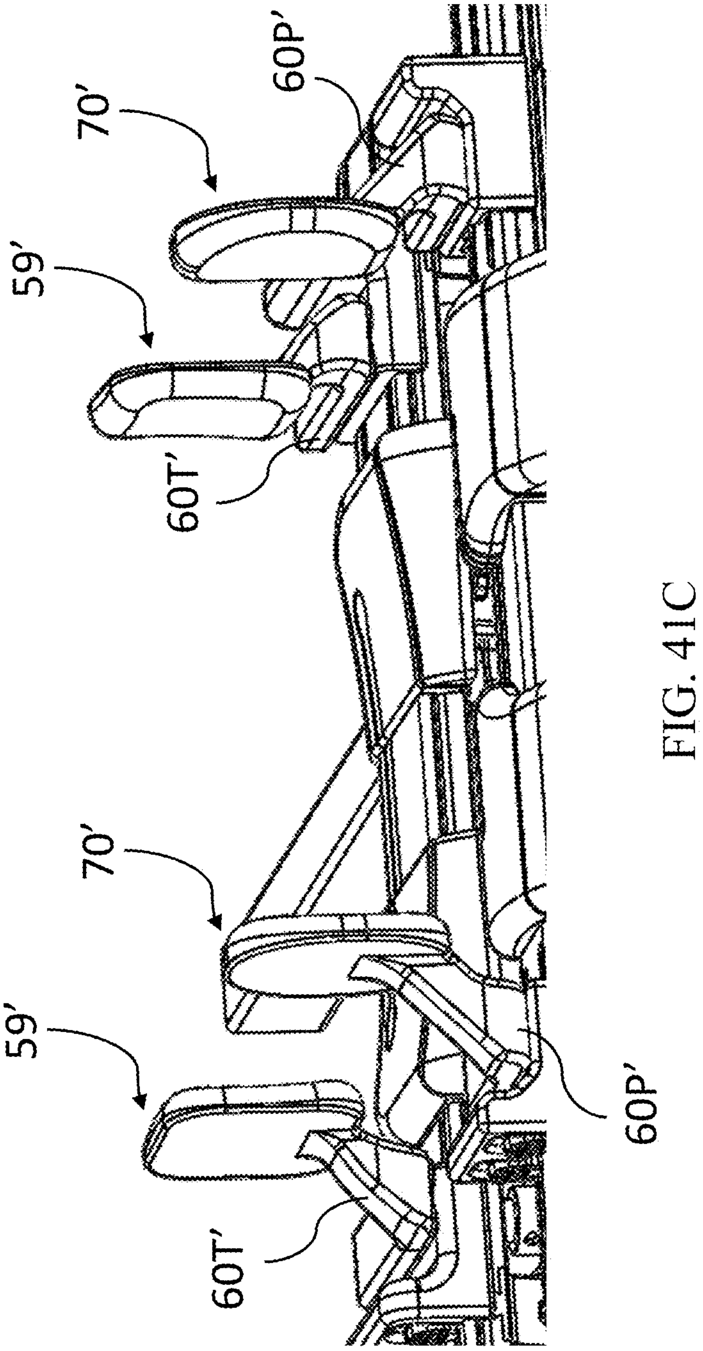
Figure 42A:
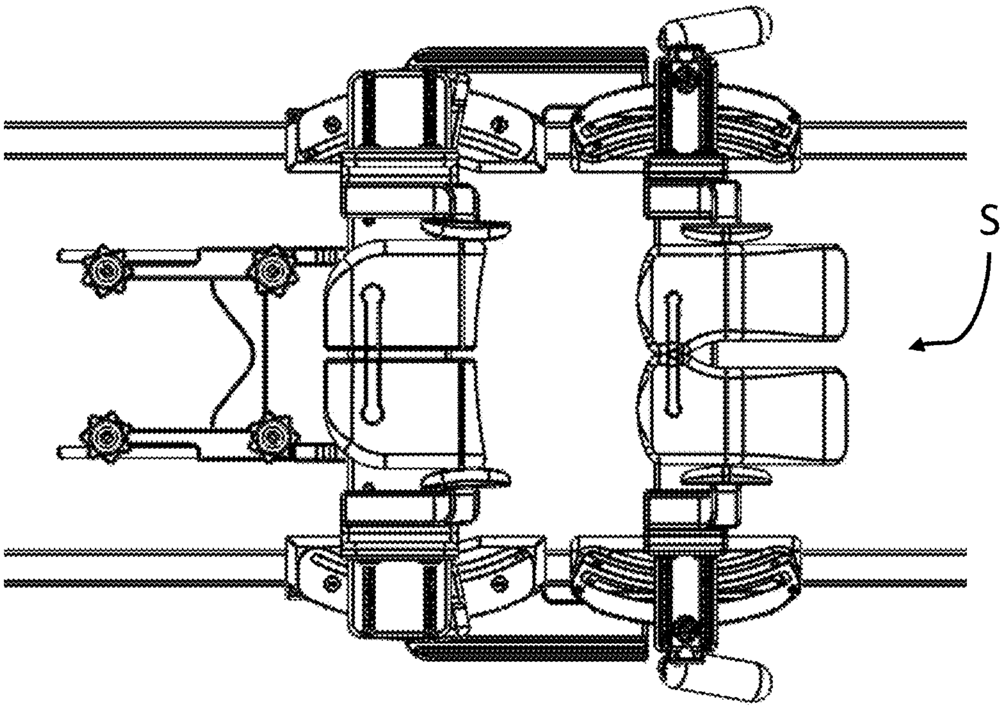
FIGS. 42A through 42D show lateral extension or expansion of the thoracic bolster assembly.
Figure 42B:
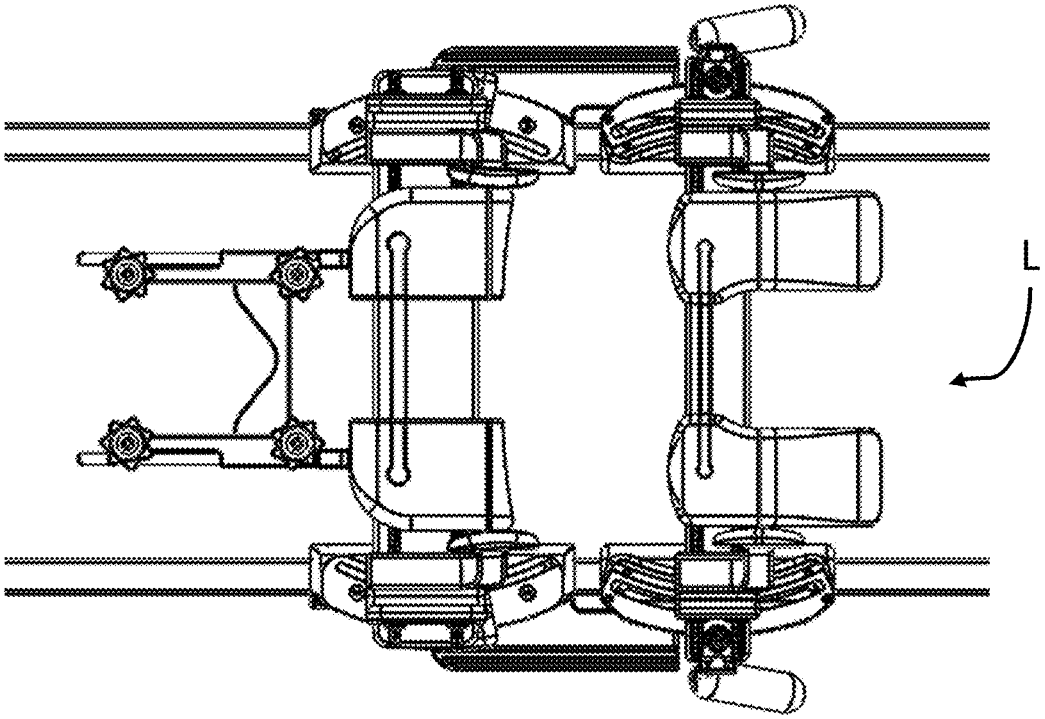
Figure 42C:
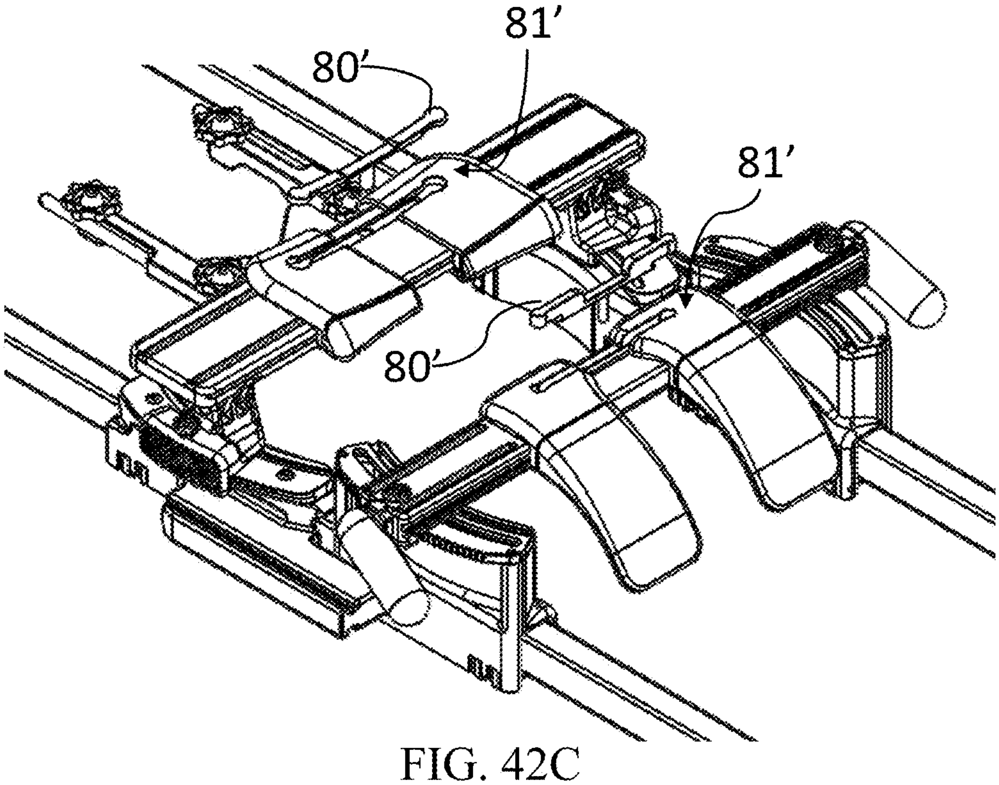
Figure 42D:
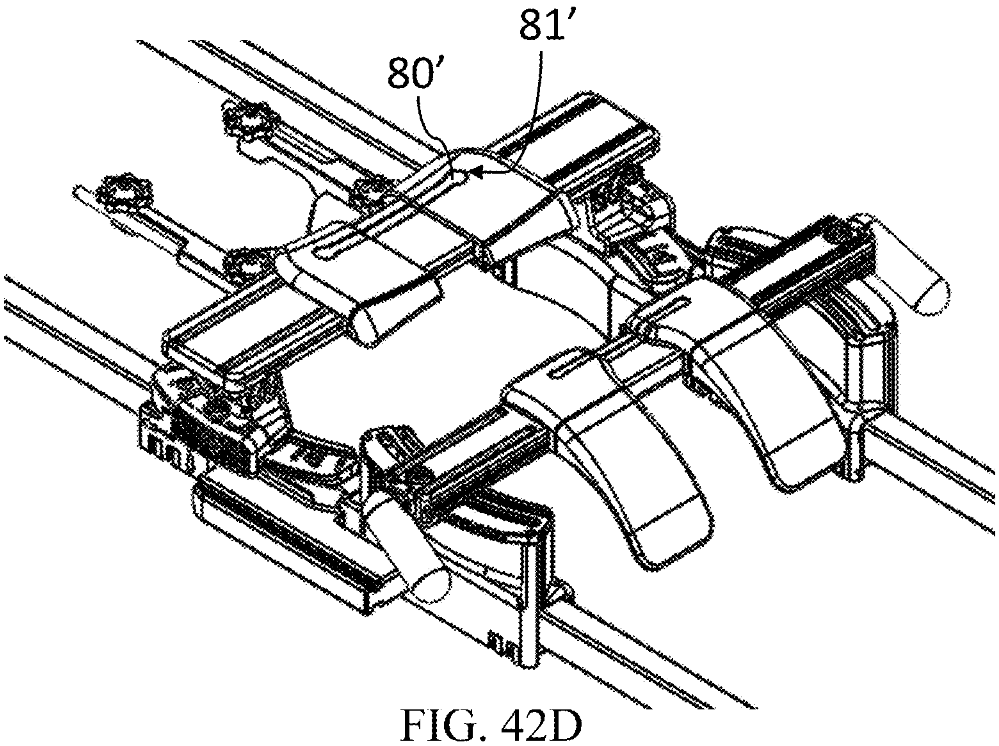

FIGS. 29A through 30B schematically illustrate attachment of thoracic and pelvic lateral paddles 59', 70' onto the patient positioning system 10' of FIG. 28. Each of the thoracic and pelvic lateral paddles 59', 70' may be slidably connected to the thoracic bolster assembly 30' and the pelvic bolster assembly 130', respectively. For example, the thoracic lateral paddles 59' may be slidable along the deck 56' of the thoracic bolster assembly 30'. The pelvic lateral paddles 70' may be slidable along the deck 165' of the pelvic bolster assembly 130'. As described elsewhere, the deck 165' of the pelvic bolster assembly 130' may also be the upper base portion 145' that moves relative to the lower base portion 140' (see, for example, FIGS. 46 through 48). The thoracic and pelvic paddles 59', 70' illustrated in FIG. 29C may be easily interchanged with any other types of paddles (different shapes, sizes, etc.) as desired. In one embodiment, the thoracic and pelvic paddles 59', 70' illustrated in FIG. 29C may be changed out with larger paddles 59', 70', such as those illustrated in FIG. 40, according to the size of the patient.

Figure 30A:
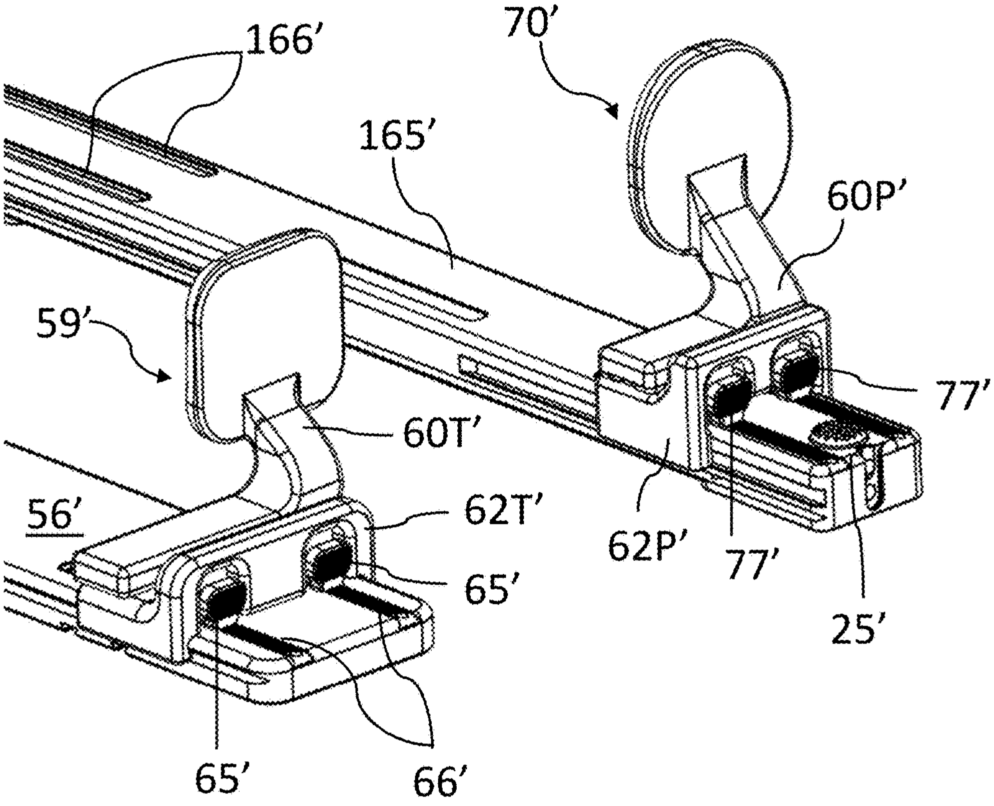
FIGS. 30A and 30B show additional, close-up views of attachment of the thoracic and pelvic lateral paddles.
Figure 30B:
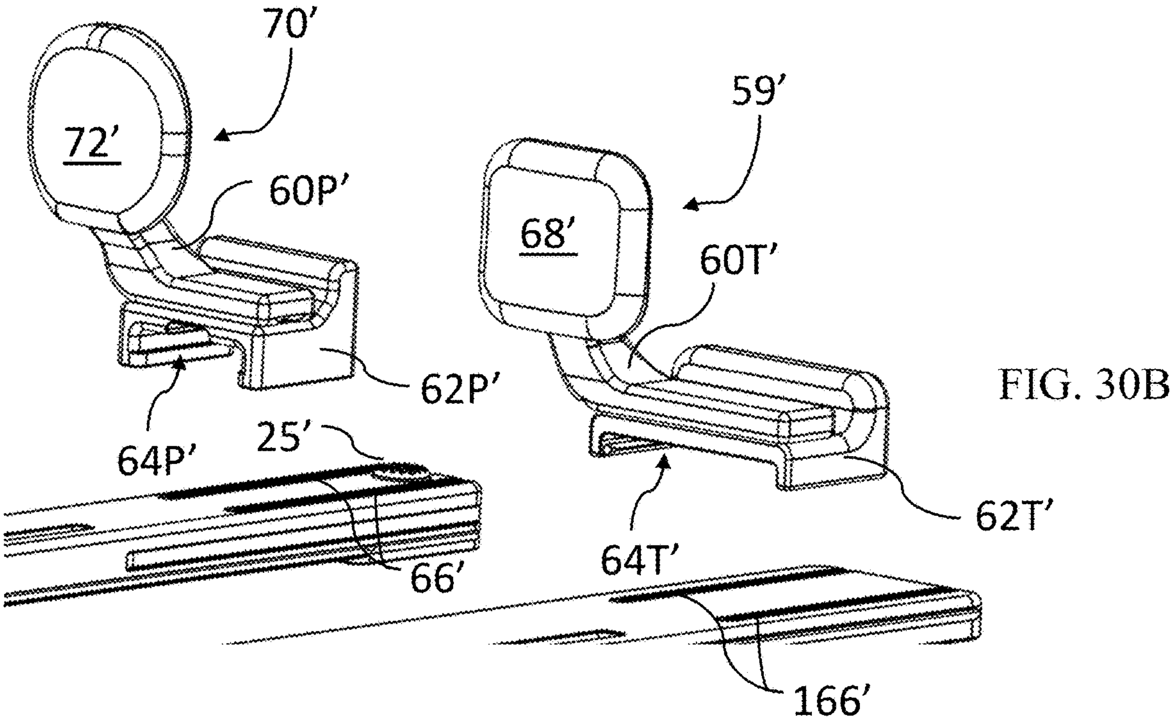

Referring to FIGS. 30A and 30B, each of the thoracic and pelvic lateral paddles 59', 70' include a body 62T', 62P' that slides along the decks 56', 165'. The bodies 62T', 62P' each define a channel 64T', 64P' for accommodating the decks 56', 165' with lateral edges of channels 64T', 64P' engaging lateral channels found on the sides of the bolster assemblies. Decks 56', 165' further include engaging tracks 66', 166' that may be engaged by one or more resilient projections mechanically connected to tabs 65', 77' contained within each body 62T', 62P'. In some embodiments, the tracks 66', 166' are provided with grooves to provide tactile feedback of adjustment.

The thoracic and pelvic lateral paddles 59', 70' additionally include a link 60T', 60P' that connects to the bodies 62T', 62P', and pads 68', 72' to provide cushioning to the paddles 59', 70'. The thoracic and pelvic lateral paddles 59', 70' may also include tabs 65', 77' that facilitate adjustment of the thoracic and pelvic lateral paddles 59', 70' along the tracks 66', 166' of the decks 56', 165'.

Referring to FIGS. 41A through 41C and 51A through 51D, the links 60T', 60P' define a mortice 60M' for engaging a tenon 69' of the bodies 62T', 62P'. The mortices 60M' of the links 60T', 60P' forms a dovetail connection with the tenon 69' when the links 60T', 60P' are engaged with the bodies 62T', 62P'. In this way, the thoracic and pelvic lateral paddles 59', 70' may be securely engaged with the patient positioning system 10'. It will be appreciated that the connection may also be reversed in some embodiments (i.e., the links 60T', 60P' may have a tenon to engage a mortice defined in the bodies 62T', 62P').

FIGS. 31 through 36 show the thoracic bolster assembly 30' of FIG. 28. The thoracic bolster assembly 30' generally includes a base 35' and a top patient support portion 47' (see FIG. 31). The base 35' includes a lower portion 40' that is fixed to the rail couplers 46' and a base upper portion 45' that is rotatable or movable relative to the lower portion 40'. The top patient support portion 47' is connected to the base 35'. The top patient support portion 47' can be comprised of a top plate or deck 56', support pads 22', and lateral paddles 59'. The deck 56' may be pivotally connected to the upper portion 45' through hinges 48' (see FIG. 33).

In some configurations, the thoracic bolster assembly 30' can be adjusted in a coronal plane relative to the surgical frame. The thoracic bolster assembly 30' may be provided with an upper portion 45' of the base 35' that may be rotatably connected to the lower portion 40', such that the upper portion 45' may rotate relative to the lower portion 40' in a coronal plane. The upper portion 45' may be connected to the lower portion 40' in a manner allowing the upper portion 45' to be rotated with respect to the lower portion 40'.

Figure 45A:
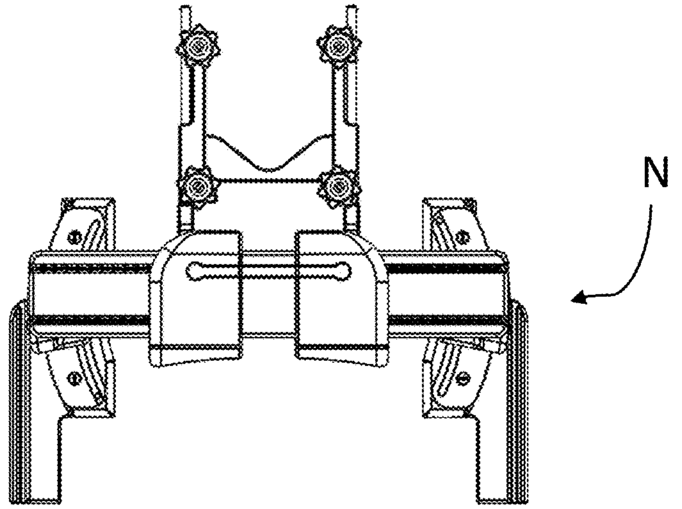
FIGS. 45A through 45C show coronal rotations of the thoracic bolster assembly.
Figure 45B:
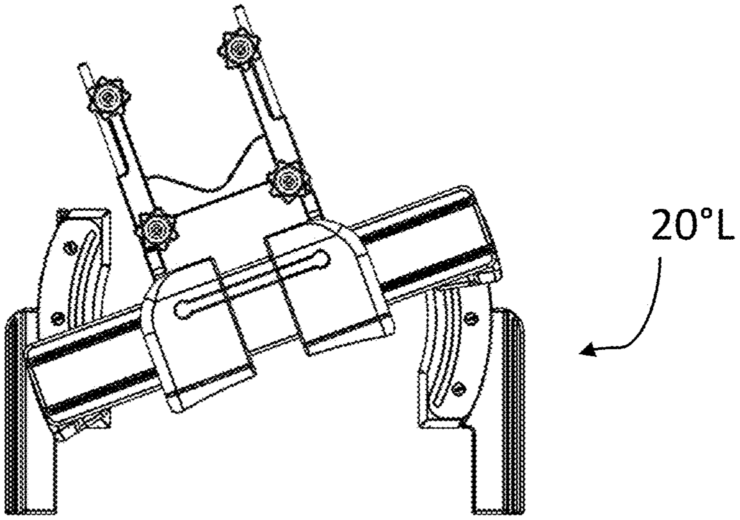
Figure 45C:
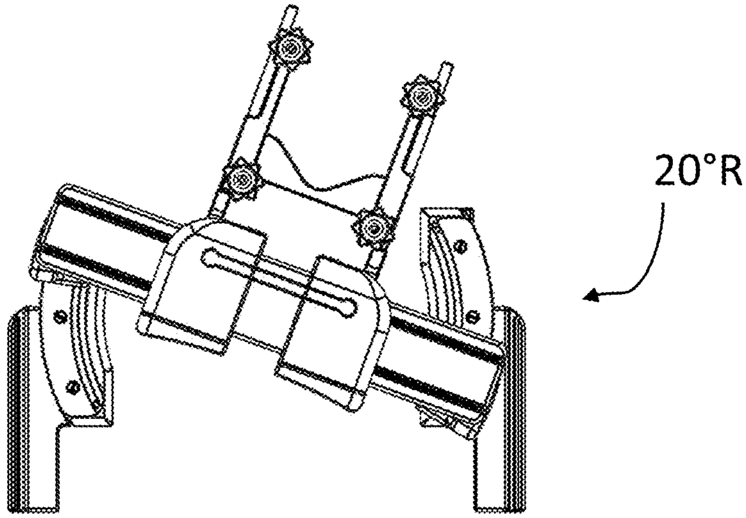

The rotational motion can be actuated by the surgeon rotating the upper portion 45' with respect to the lower portion 40', or in other embodiments, the motion may be actuated by a drive mechanism. The upper portion 45' may include handles 27' or a hand-gripping portion that a surgeon or practitioner may grip in order to rotate the upper portion 45' in a coronal plane. FIG. 45A illustrates the thoracic bolster assembly 30' and the upper portion 45' in a neutral N position. FIG. 45B illustrates the thoracic bolster assembly 30' and the upper portion 45' in coronal rotation 20° to the left. FIG. 45C illustrates the thoracic bolster assembly 30' and the upper portion 45' in coronal rotation 20° to the right.

Referring to FIGS. 32 through 36, the lower portions 40' may each be fastened and/or fixed to the rail couplers 46'. In some configurations, the lower portion 40' may include one or more recessed tracks 42' (best seen in the exploded views of FIGS. 34 and 35), with the upper portion 45' having one or more roller bearings 44' which travel in the recessed tracks 42' of the lower portion 40'. In other configurations, the upper portion 45' may have the recessed track and the lower portion 40' may include the roller bearings. The recessed track and roller bearings may improve the supported rotation of the upper portion 45' relative to the lower portion 40', as well as make it easier to rotate the upper portion 45' to achieve coronal adjustment (see FIGS. 45A through 45C).

The thoracic bolster assembly 30' may be provided with a locking release mechanism 25', such as a push button, to allow the surgeon to make the coronal adjustment in the sterile field. Without the locking release mechanism 25' actuated, the upper portion 45' of the base 35' remains locked with respect to the lower portion 40' of the base 35'. If the surgeon wants to make a coronal adjustment to the thoracic bolster assembly 30', the surgeon grabs both sides of a bolster assembly, simultaneously depressing the locking release mechanism 25', which allows the bolster assembly to freely rotate in the coronal plane. Releasing the locking release mechanism 25' at any point during rotation locks the bolster assembly at that angular position.

In the unlocked position, the upper portion 45' can be rotated relative to the lower portion 40', allowing coronal adjustment of the thoracic bolster assembly 30'. As outlined, the surgeon is provided with one or more handles 27' to grip and rotate. For example, handle 27' can be provided on one lateral side of the thoracic bolster assembly 30', and a second handle 27' can be provided on the opposing lateral side of the thoracic bolster assembly 30'. Both the locking release mechanism 25' and the handles 27' can be within the sterile field to allow the surgeon to make coronal adjustments within the sterile field. For example, if draping is provided over the handles, the surgeon may still actuate the locking release mechanism 25' and grip the handles 27' through the draping and within the sterile field to make the coronal adjustments within the sterile field.

Figure 37A:
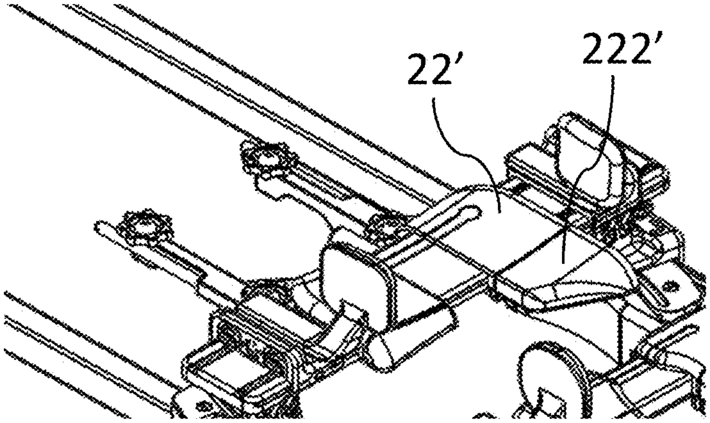
FIGS. 37A through 37C show embodiments of rib extensions attachable to the thoracic bolster assembly of FIGS. 28 and 31.
Figure 37B:
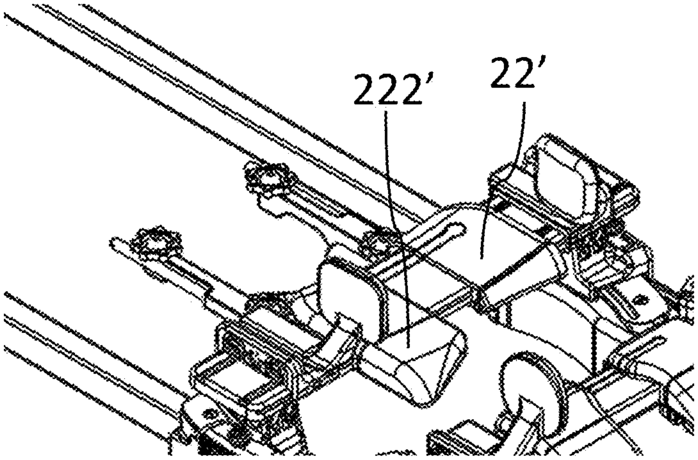
Figure 37C:
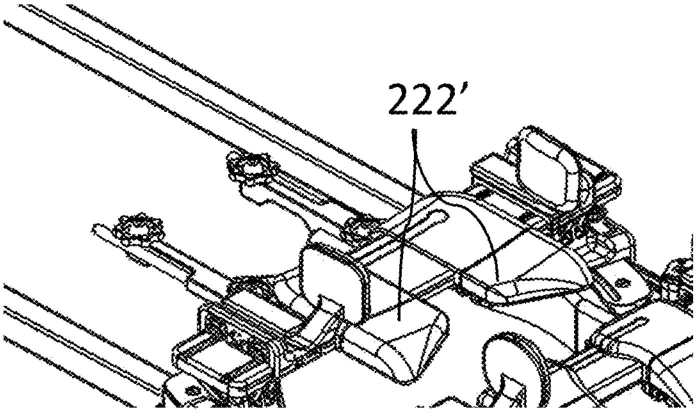
Figure 38A:
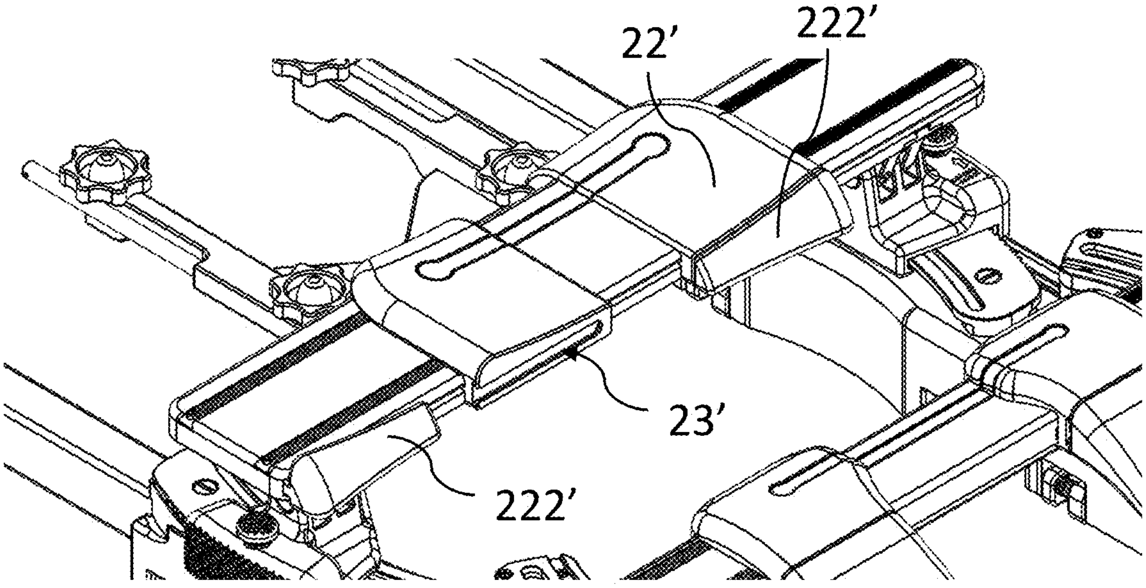
FIGS. 38A and 38B show attachment of the rib extensions onto the thoracic bolster assembly.
Figure 38B:
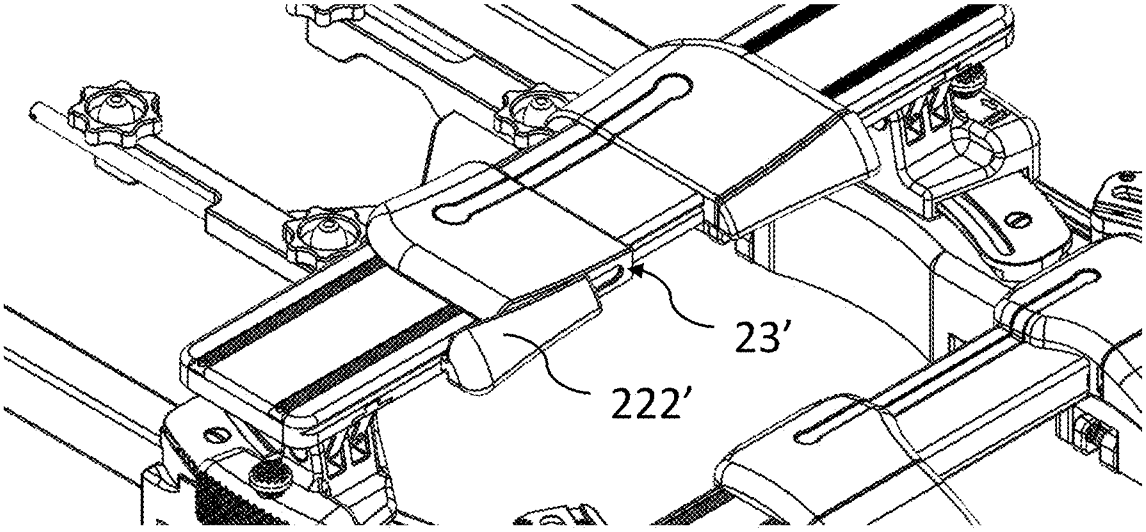
Figure 39A:
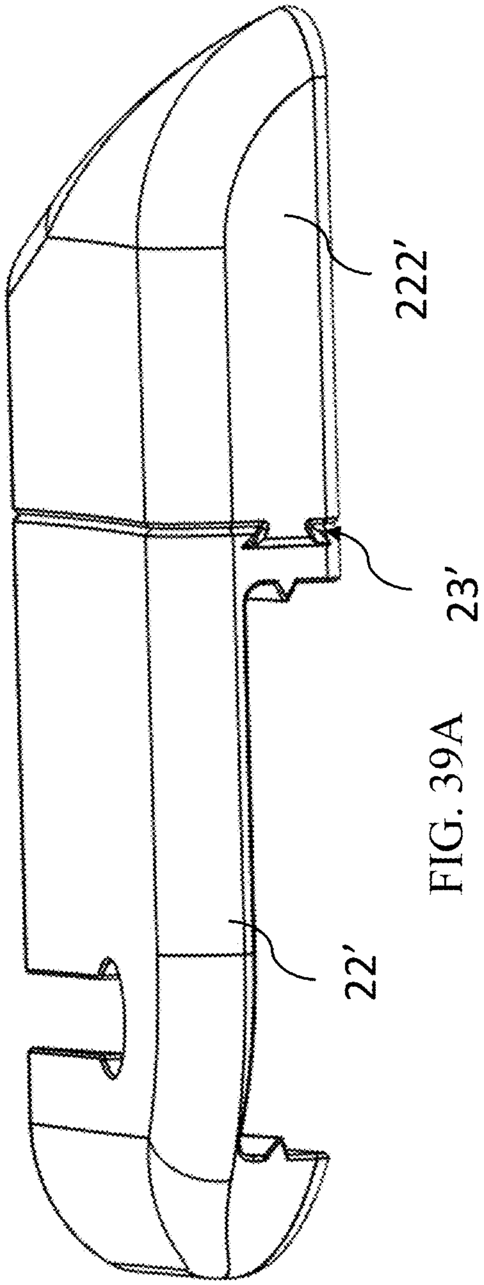
FIGS. 39A and 39B show the connection between the rib extensions and the thoracic bolster assembly.
Figure 39B:
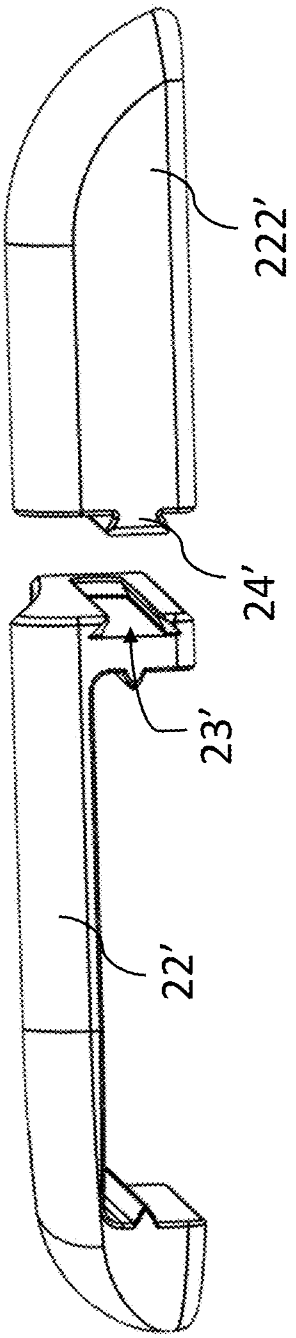

FIGS. 37A through 39B show embodiments of rib extensions 222' and attachment of the rib extensions 222' to the thoracic bolster assembly 30' of FIGS. 28 and 31. As seen in FIGS. 37A through 37C, a right rib extension (FIG. 37A), a left rib extension (FIG. 27B), or a left and right (rib extension (FIG. 37C) may be attached to the thoracic support pads 22'. As seen in FIGS. 38A and 38B, the rib extensions 222' may be slidably attachable to the thoracic support pads 22'. For example, each thoracic support pad 22' may define a channel or mortice 23' for receiving an extension or tenon 24' of the rib extensions 222'. As best illustrated in FIGS. 39A and 39B, the tenon 24' of the rib extensions 222' may form a dovetail joint or connection with the mortice 23' when the rib extensions 222' are received and engaged by the support pads 22'. It will be appreciated that this connection can also be reversed (i.e., the tenon may be provided on the thoracic support pad 22' with the mortice 23' on the rib extension 222'), or any other suitable connection method may be used.

Figure 43A:
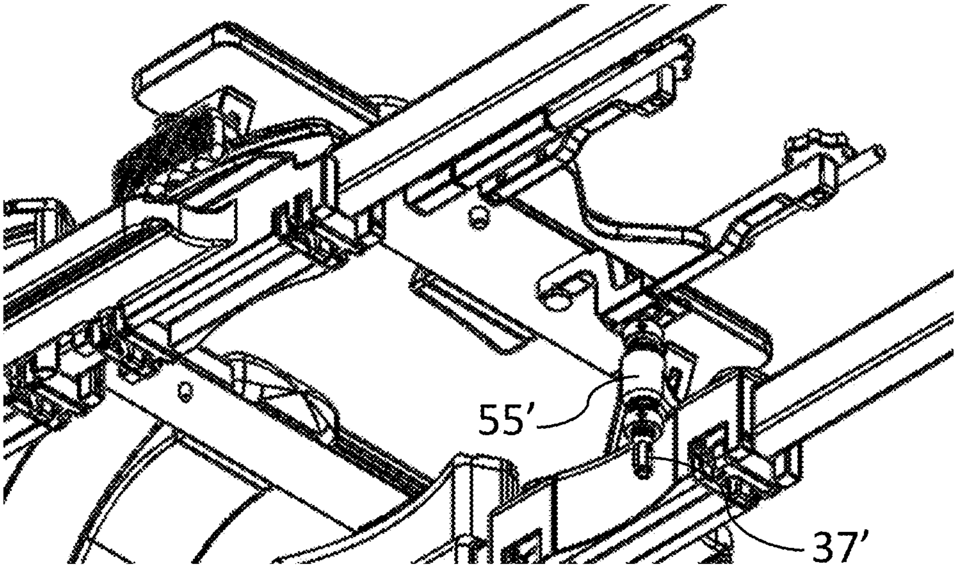
FIGS. 43A through 43C show attachment of a handle or driver to the bottom of the thoracic bolster assembly.
Figure 43B:
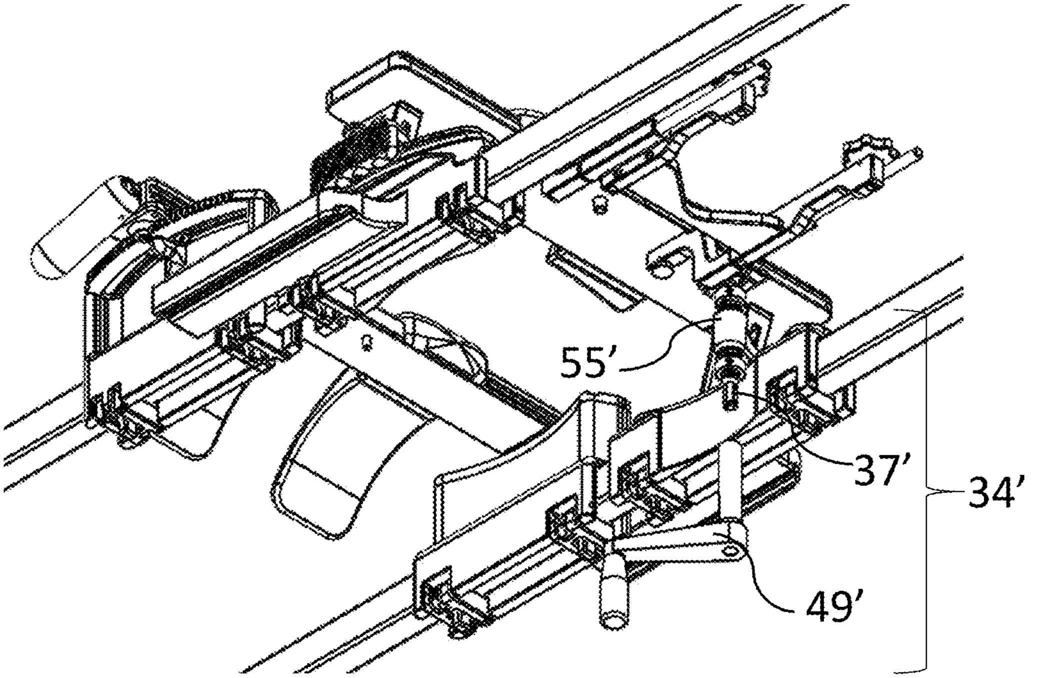
Figure 43C:
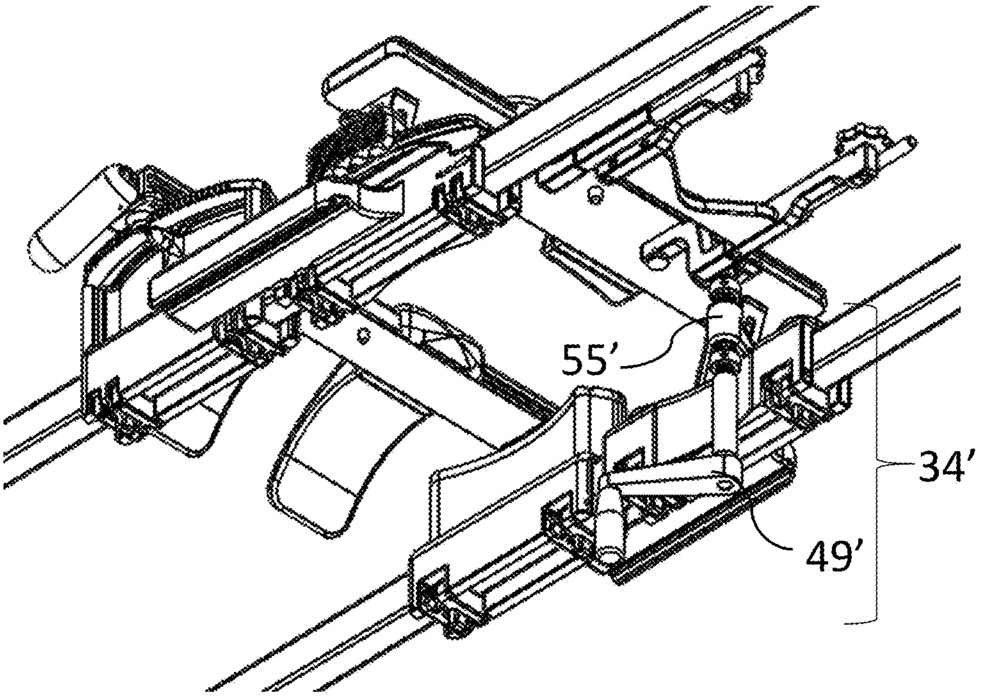
Figure 44A:
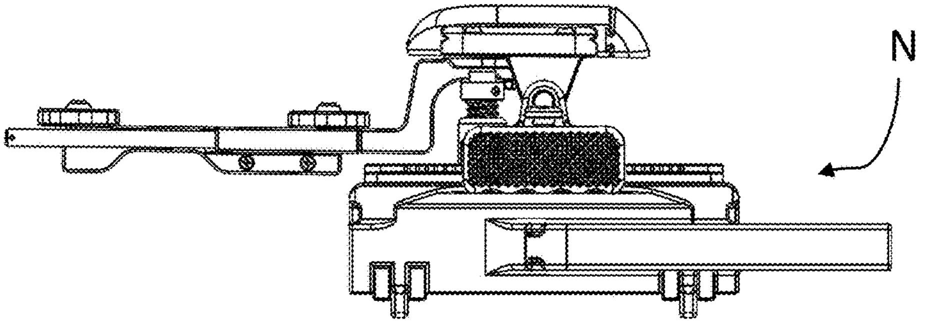
FIGS. 44A through 44C show angular tilts of the thoracic bolster assembly achievable through use of the handle or driver of FIGS. 43A through 43C.
Figure 44B:
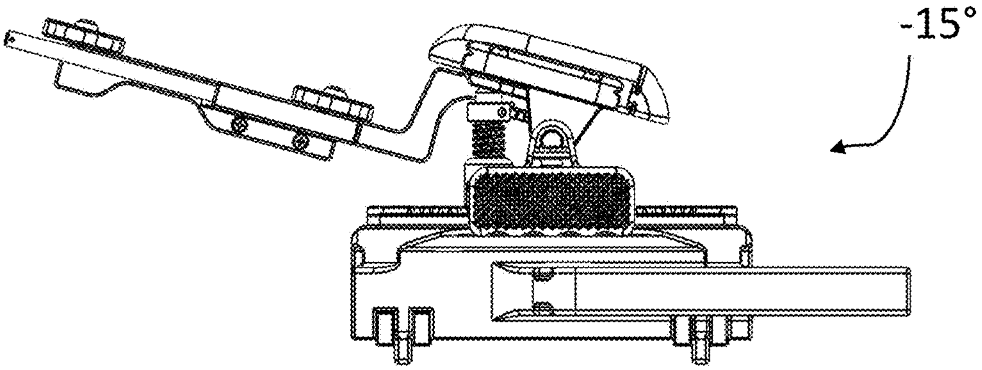
Figure 44C:
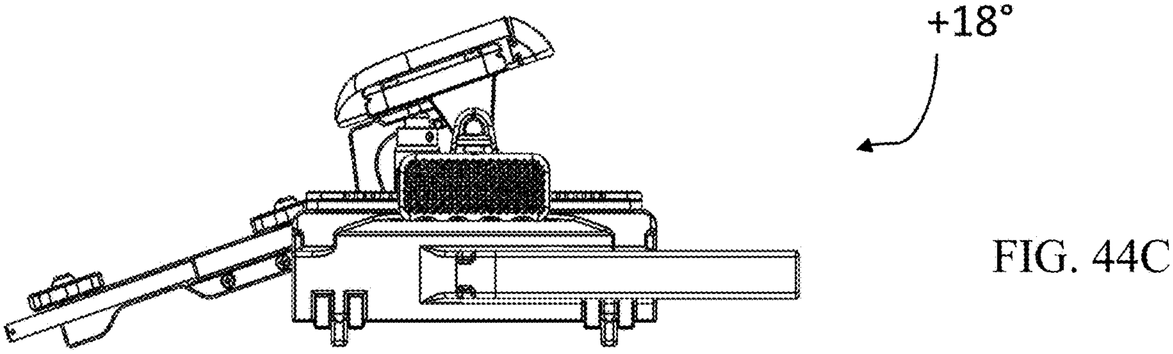

FIGS. 43A through 43C show attachment of a handle or driver 49' to the bottom of the thoracic bolster assembly 30' and FIGS. 44A through 44C show angular tilts of the thoracic bolster assembly 30' achievable through use of the handle or driver 49'. Specifically, the bottom of the thoracic bolster assembly 30' may include a vertical or angular adjustment mechanism 34'. The vertical adjustment mechanism 34' includes the driver 49', a drive screw 37', and a slot or socket 55' to receive the drive screw 37'. The driver 49' may be connected to the drive screw 37' and may be actuated in both a clockwise and counterclockwise direction to achieve vertical adjustment of the thoracic bolster assembly 30'.

For example, FIG. 44A illustrates the thoracic bolster assembly 30' in a neutral N position. FIG. 44B illustrates the thoracic bolster assembly 30' adjusted by −15° in the sagittal plane, achieved through actuation of the driver 49' in a first direction. FIG. 44C illustrates the thoracic bolster assembly 30' adjusted by +18° in the sagittal plane, achieved through actuation of the driver 49' in a second direction, with the second direction being opposite from the first direction.

Figure 47:
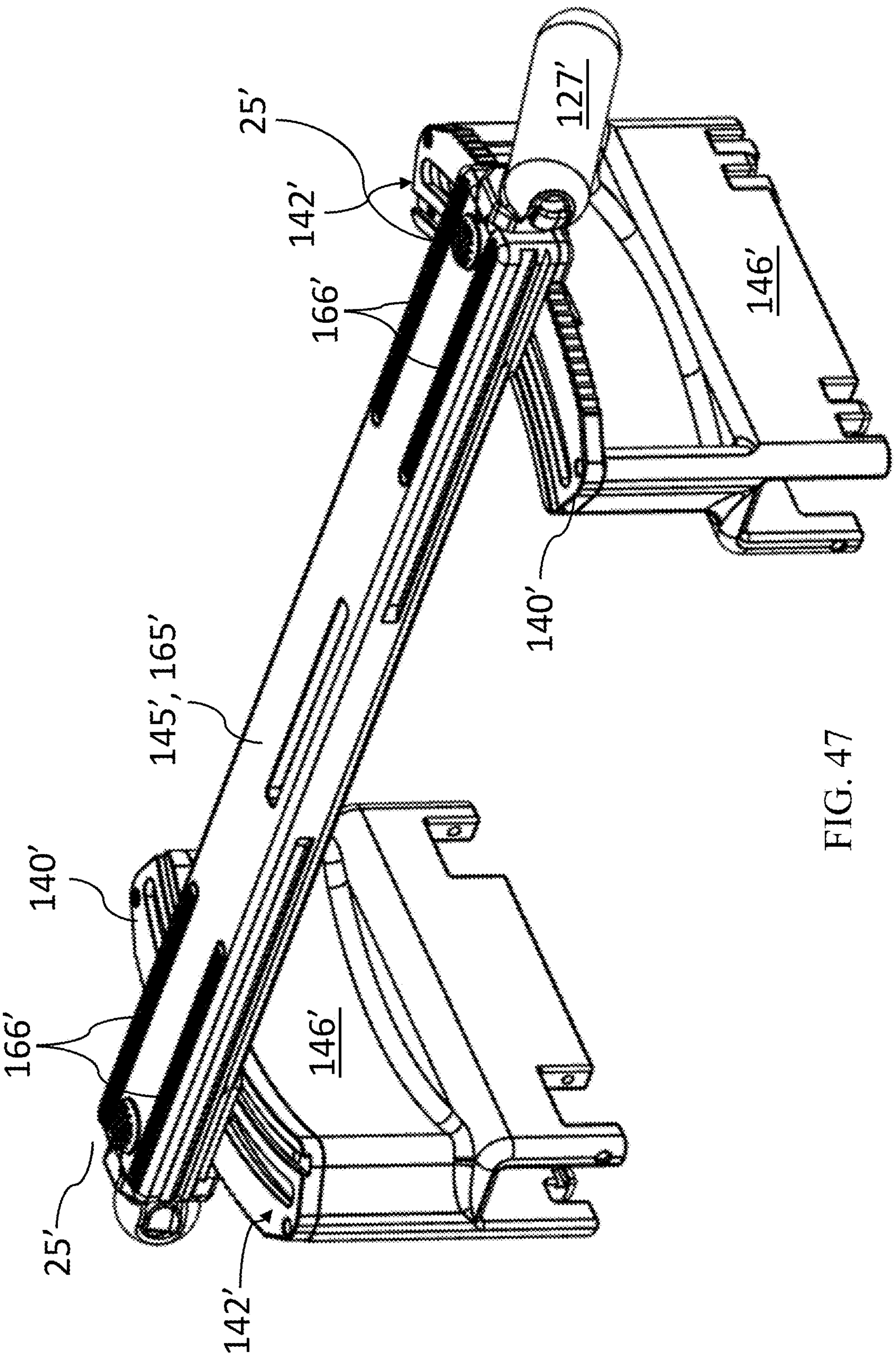
FIG. 47 shows a perspective view of the base of the pelvic bolster assembly.
Figure 48:
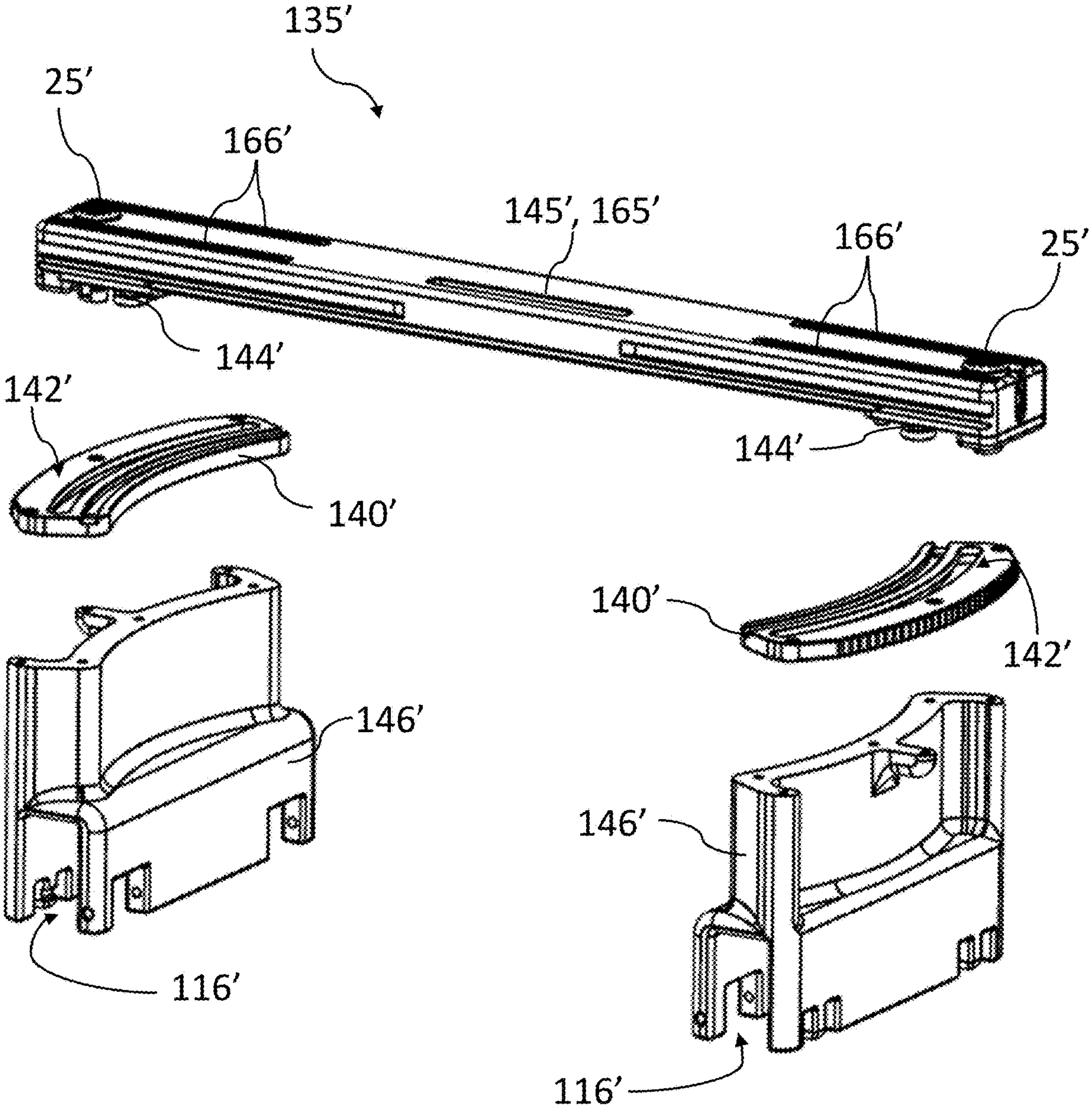
FIG. 48 shows an exploded view of the base of FIG. 47.
Figure 49:
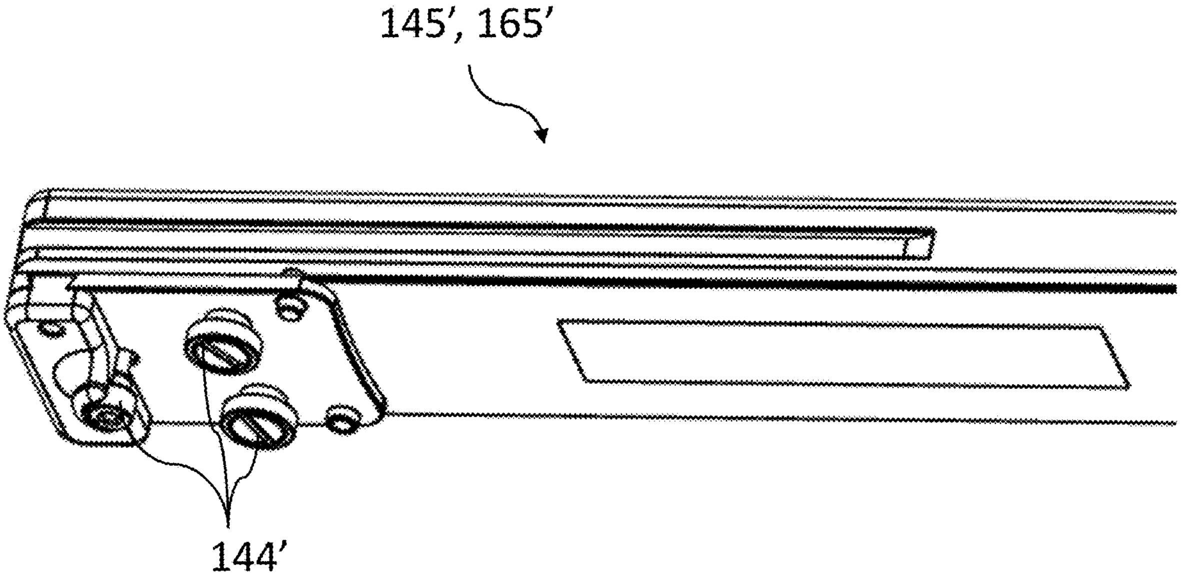
FIG. 49 shows a bottom view of the upper base portion or deck of the base of the pelvic bolster assembly.

FIGS. 47 through 49 show the base 135' of the pelvic bolster assembly 130'. As mentioned, the deck 165' of the base 135' may also be the upper base portion 145'. The deck 165' may be referred to as "the upper base portion 145'," and the upper base portion 145' may be referred to as "the deck 165'." That is, the deck 165' of the pelvic bolster assembly 130' both receives the pelvic lateral paddles 70' and is moveable relative to the lower portion 140'. Similar to the lower portion 40' of the base 35' of the thoracic bolster assembly 30', the lower portion 140' is fastened and/or fixed to the rail couplers 146'. Additionally, the lower portion 140' includes one or more recessed tracks 142' for receiving rollers or roller bearings 144' of the deck or upper base portion 145', 165'. Referring to FIG. 49, the deck or upper base portion 145', 165' includes one or more (e.g., a plurality) of bearings 144' that are received by and moveable within the recessed tracks 142'.

Figure 54A:
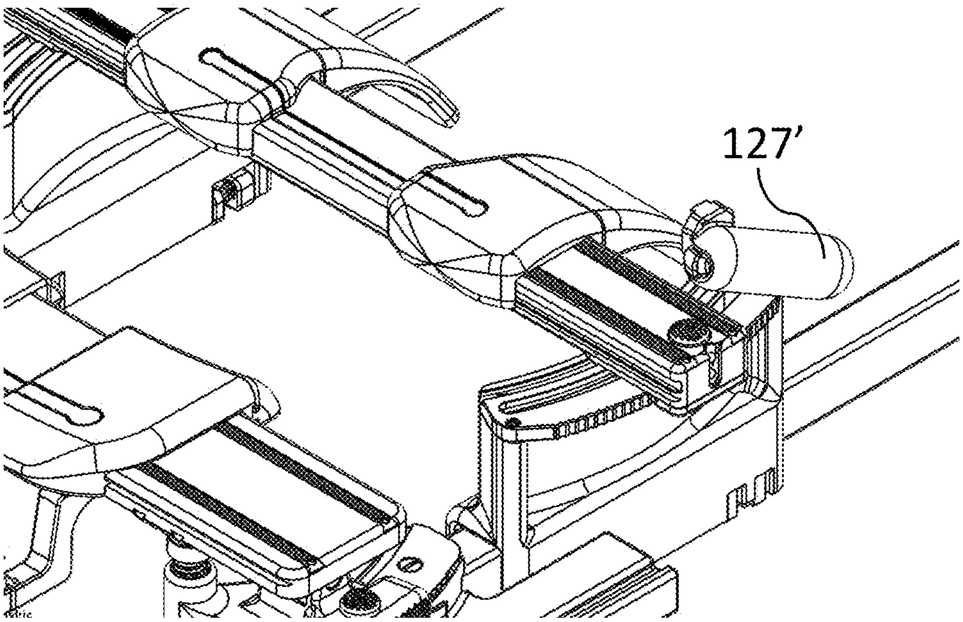
FIGS. 54A and 54B show attachment of a handle to the pelvic bolster assembly.
Figure 54B:
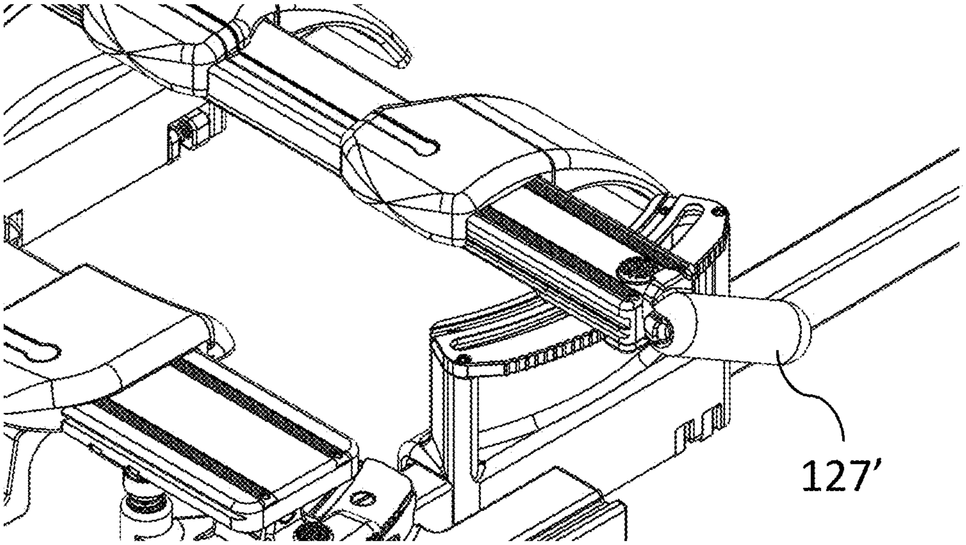

The deck or upper base portion 145', 165' also includes handles 127' that a surgeon or practitioner may grasp to rotate the deck or upper base portion 145', 165' in the coronal plane. FIGS. 54A and 54B show attachment of the handle 127' to the pelvic bolster assembly 130'. The handles 127' may be attached to opposing lateral sides of the deck 165' of the pelvic bolster assembly 130'. The lateral sides of the deck 165' may slidably receive the handles 127'.

Figure 55A:
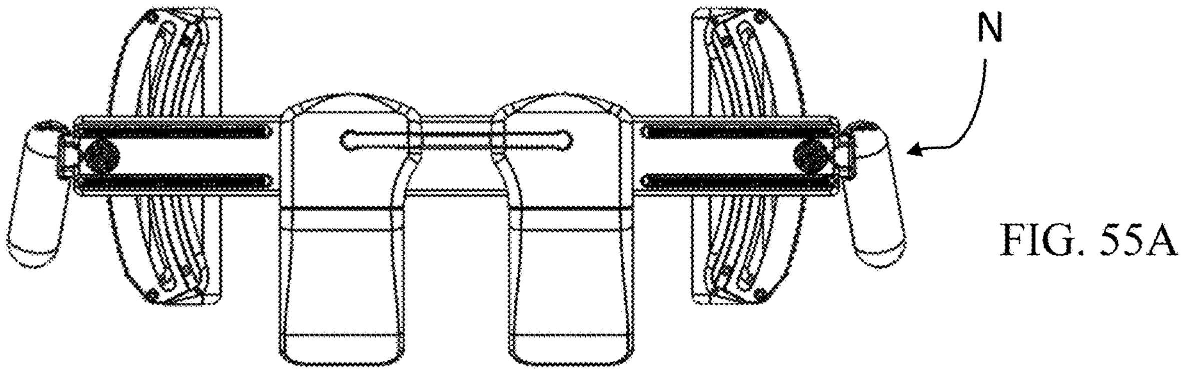
FIGS. 55A through 55C show coronal rotations of the pelvic bolster assembly.
Figure 55B:
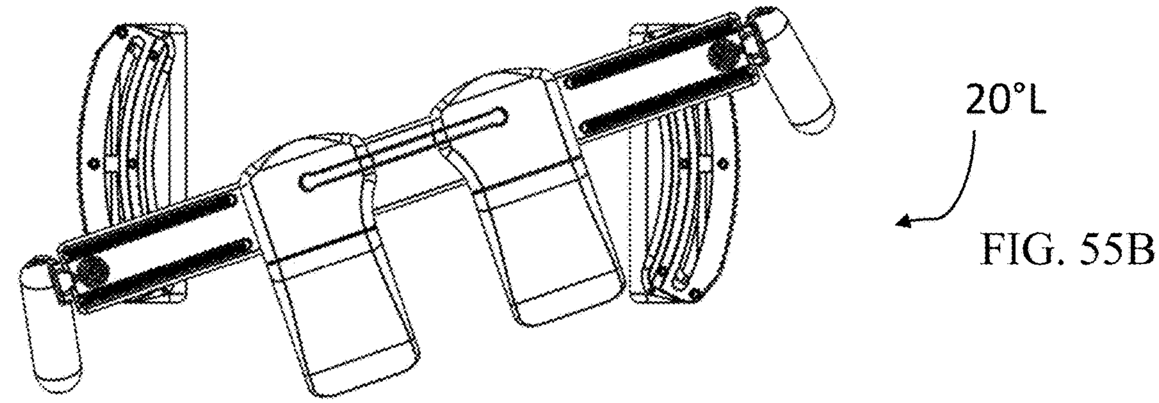
Figure 55C:
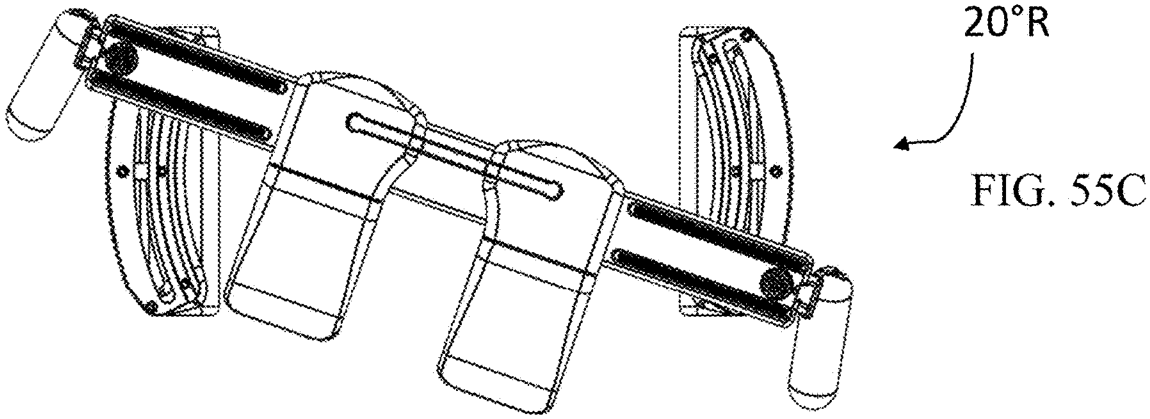

FIGS. 55A through 55C show the coronal rotations of the pelvic bolster assembly 130'. Specifically, FIG. 55A shows the pelvic bolster assembly 130' in a neutral position N. FIG. 55B shows the pelvic bolster assembly 130' rotated 20° to the left and FIG. 55C shows the pelvic bolster assembly 130' rotated 20° to the right in the coronal plane.

Figure 50A:
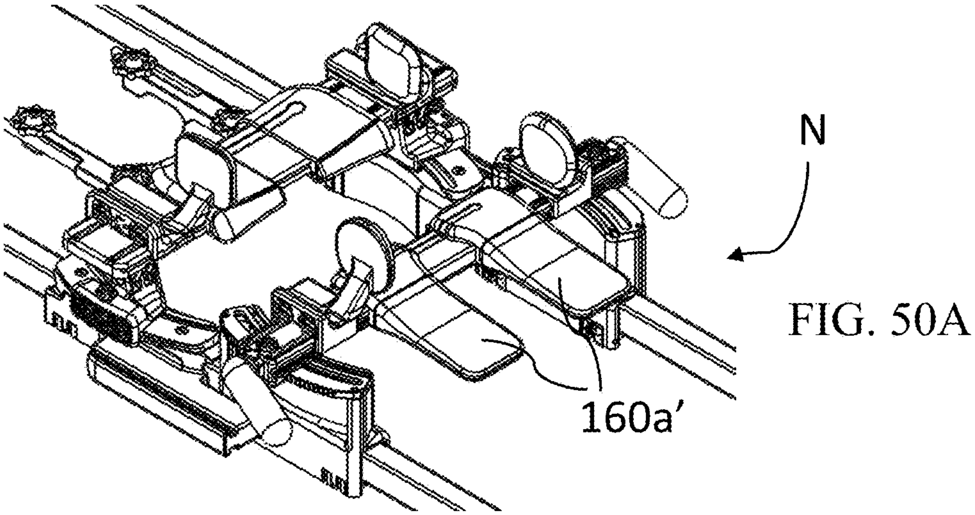
FIGS. 50A through 50C show positions of leg extensions attachable to the pelvic bolster assembly.
Figure 50B:
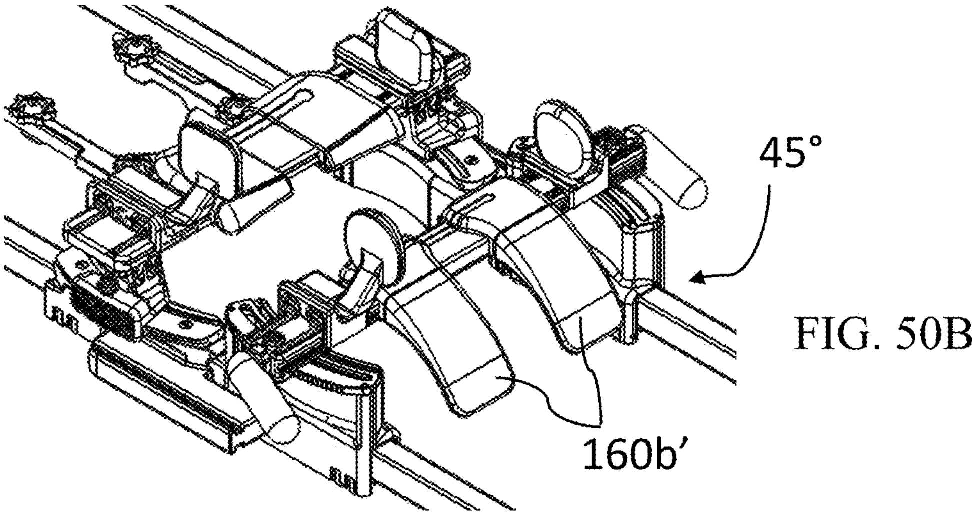
Figure 50C:
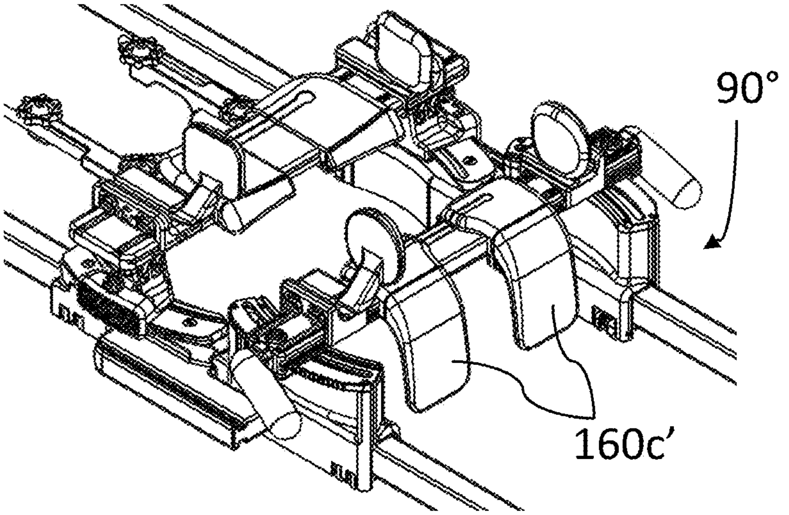
Figure 51A:
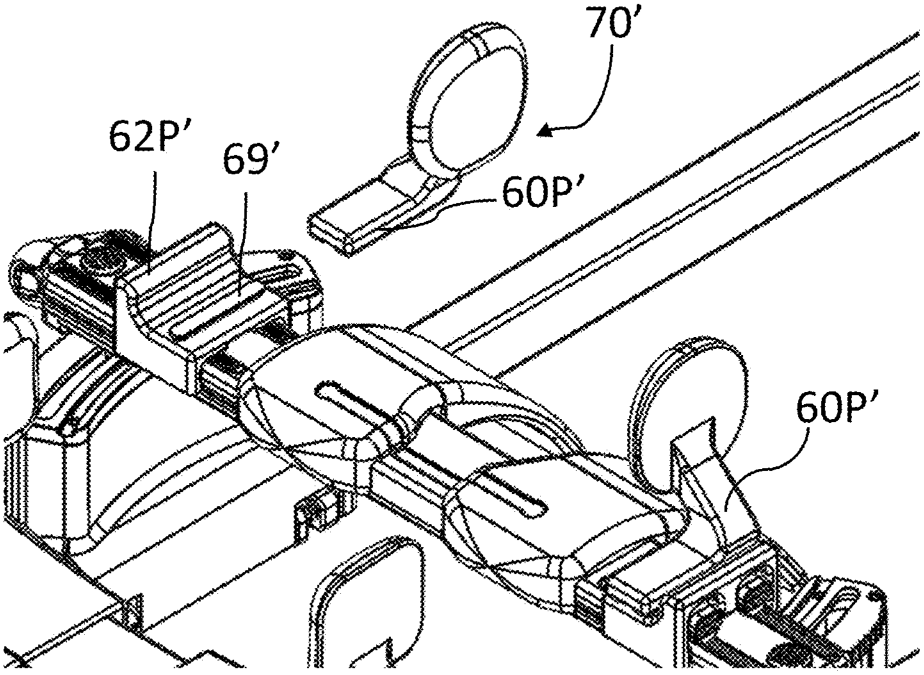
FIGS. 51A through 51D show attachment of the pelvic lateral paddles to the pelvic bolster assembly.
Figure 51B:
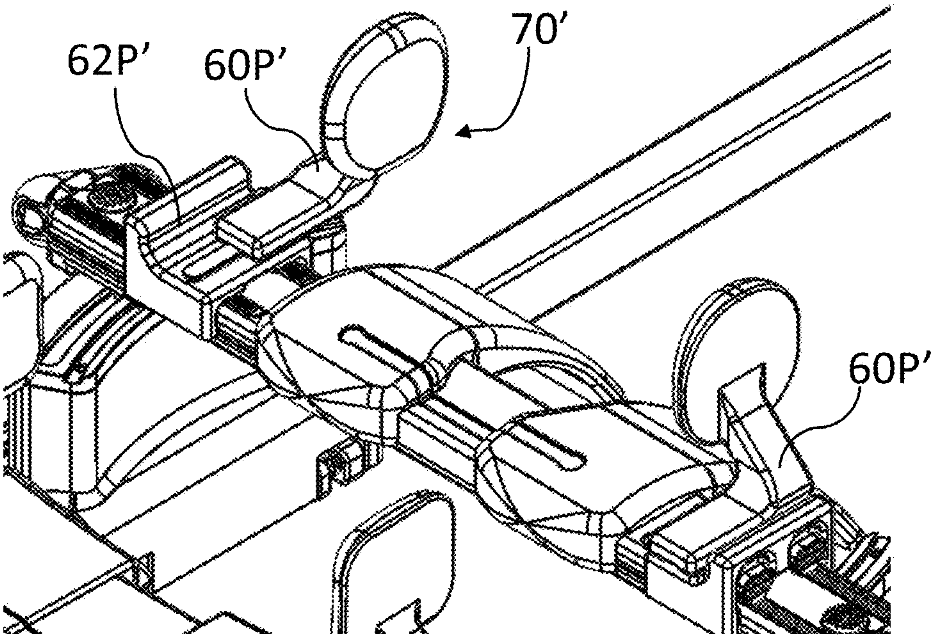
Figure 51C:
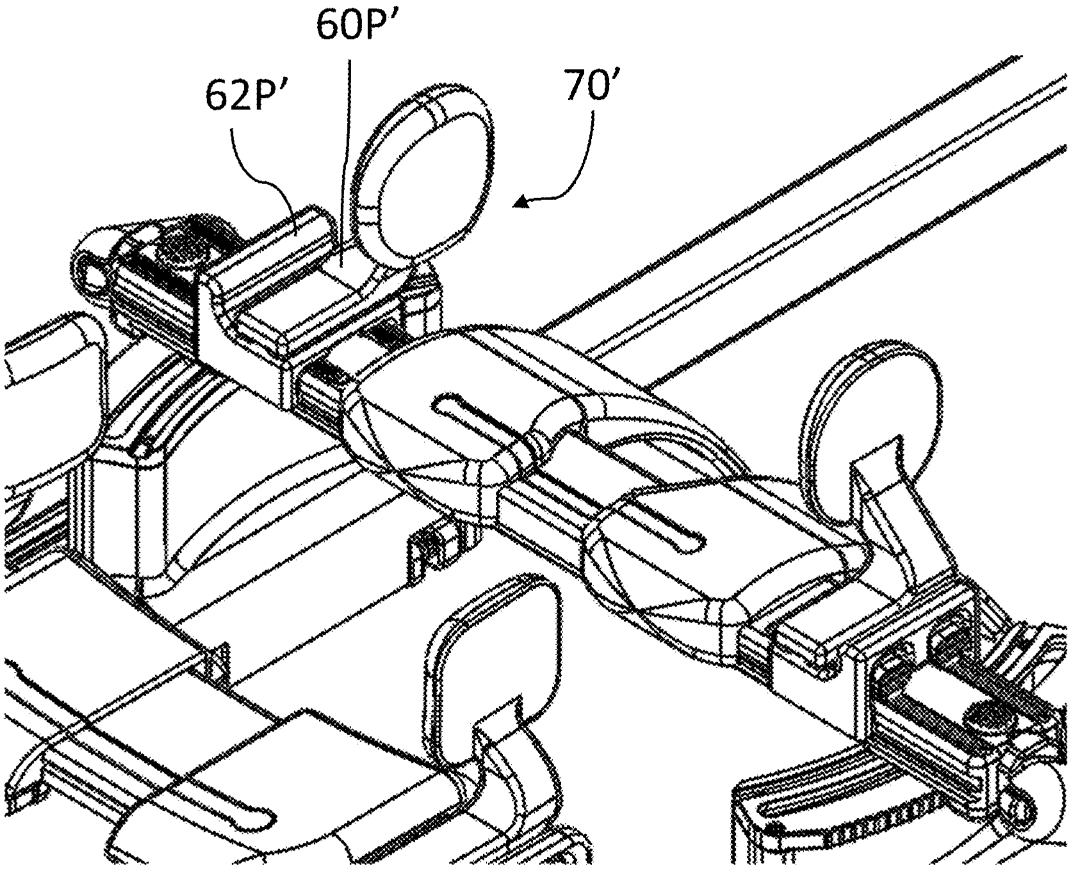
Figure 51D:
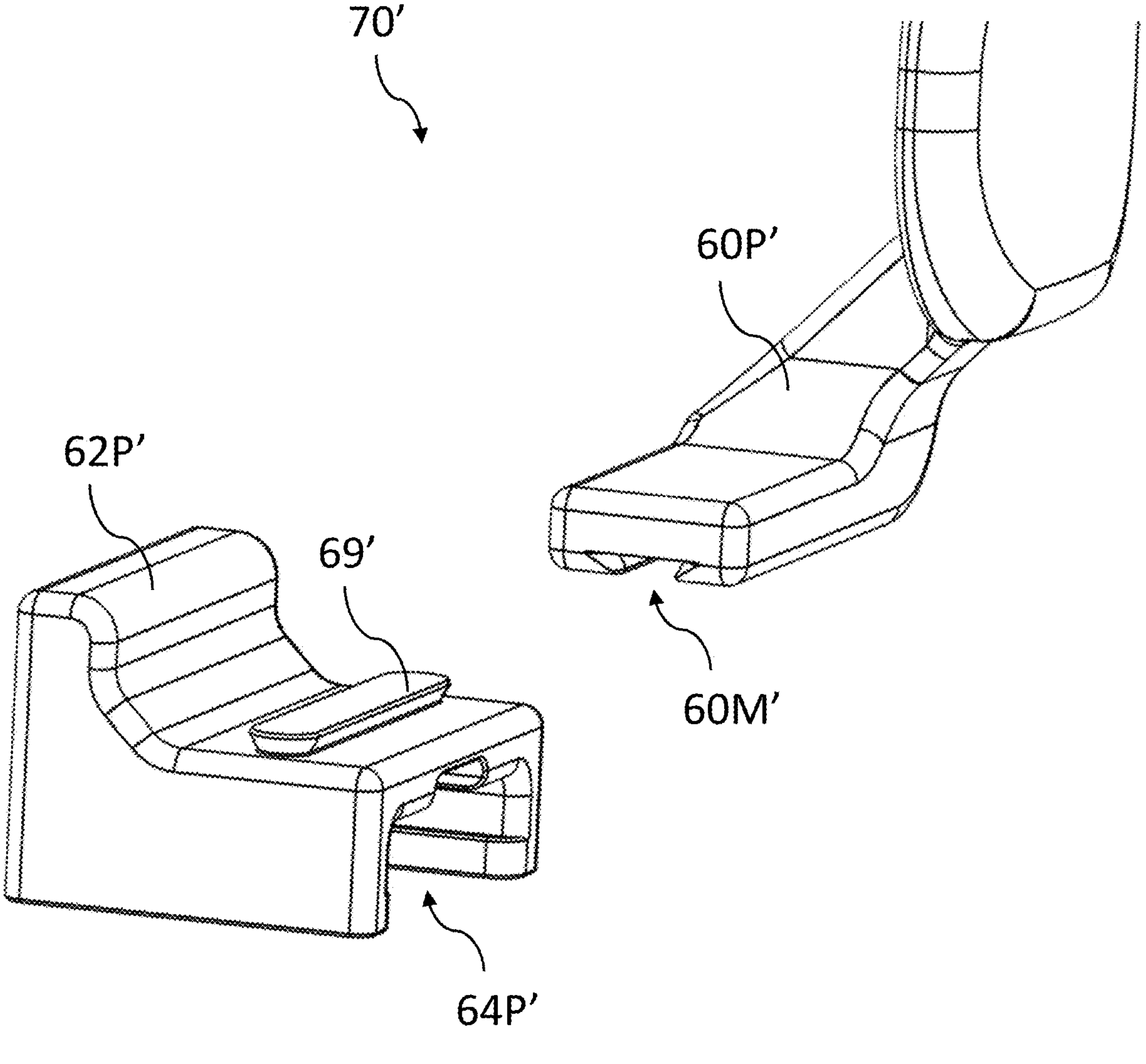

Similar to the rib extensions 222' of the thoracic bolster assembly 30', interchangeable leg extensions 160' may be attachable to the pelvic bolster assembly 130'. FIGS. 50A through 50C show different interchangeable leg extensions 160' (160*a*'-c') after they have been attached to the pelvic bolster assembly 130'. FIGS. 52A through 53B show attachment of the leg extensions 160' to the pelvic bolster assembly 130'.

Figure 52A:
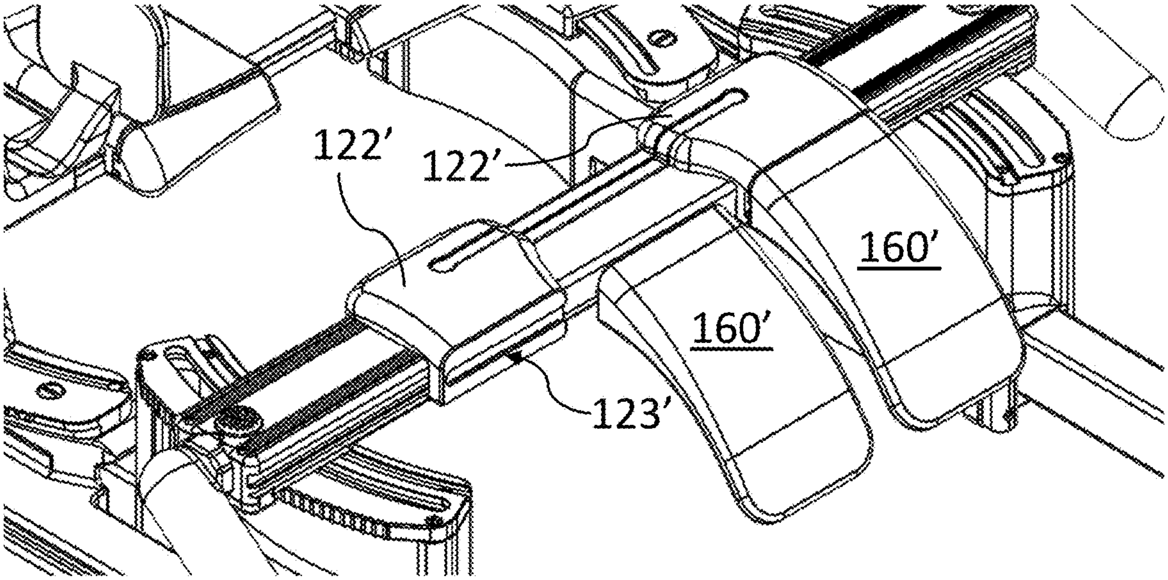
FIGS. 52A through 52C show attachment of the leg extensions to the pelvic bolster assembly.
Figure 52B:
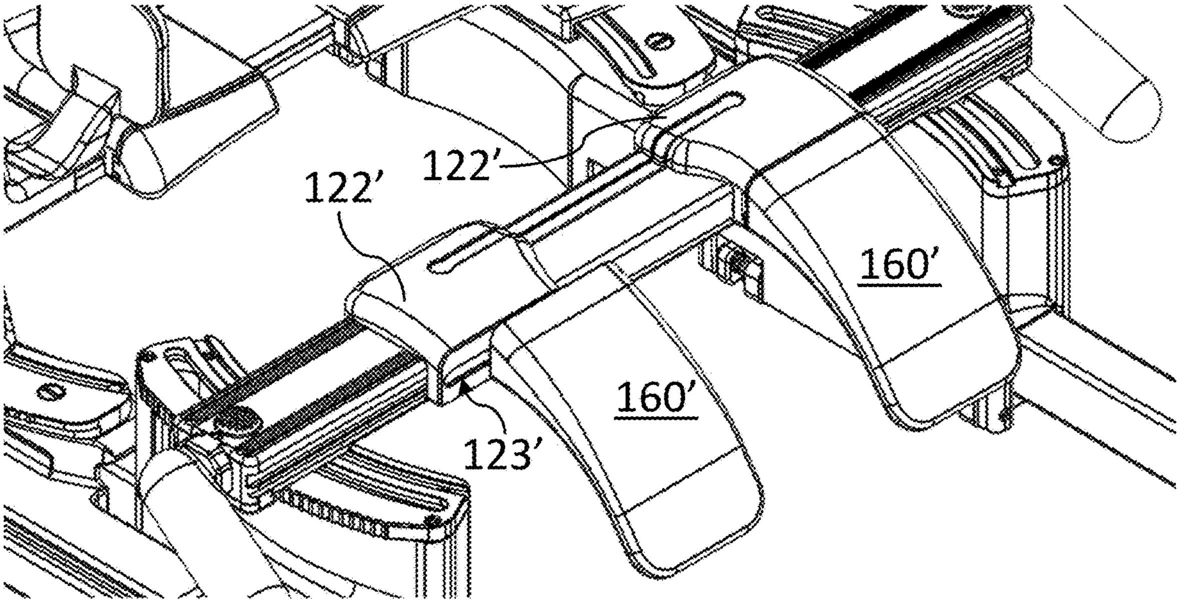
Figure 52C:
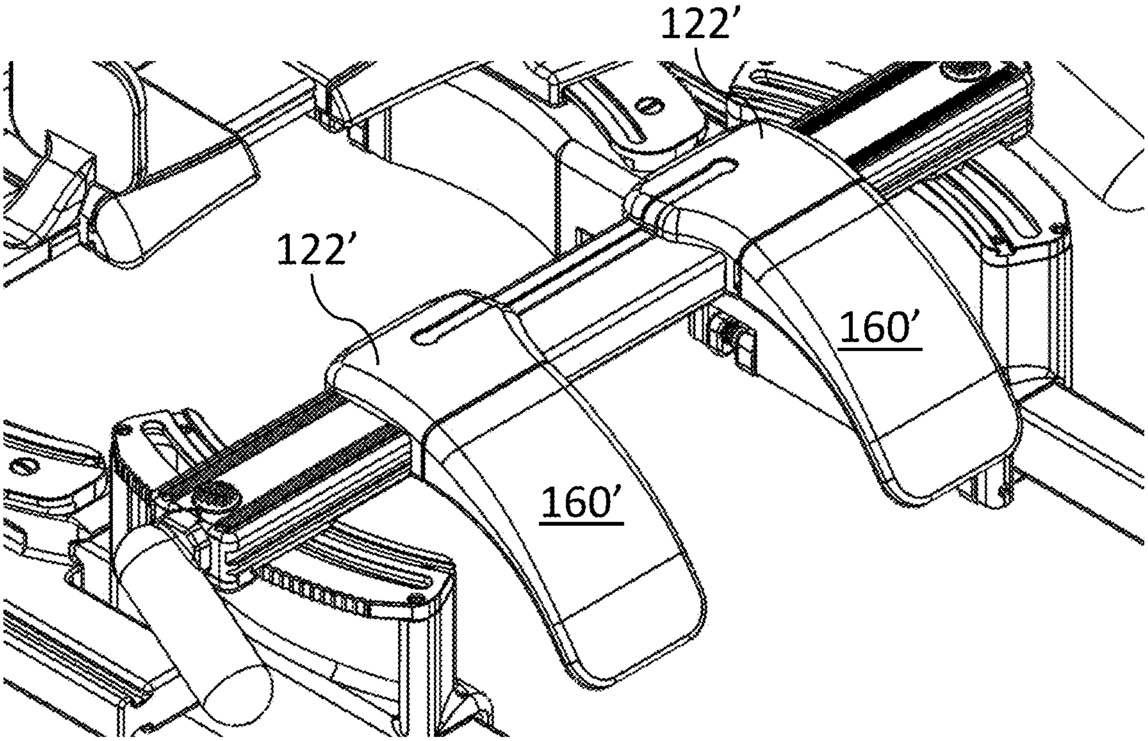
Figure 53A:
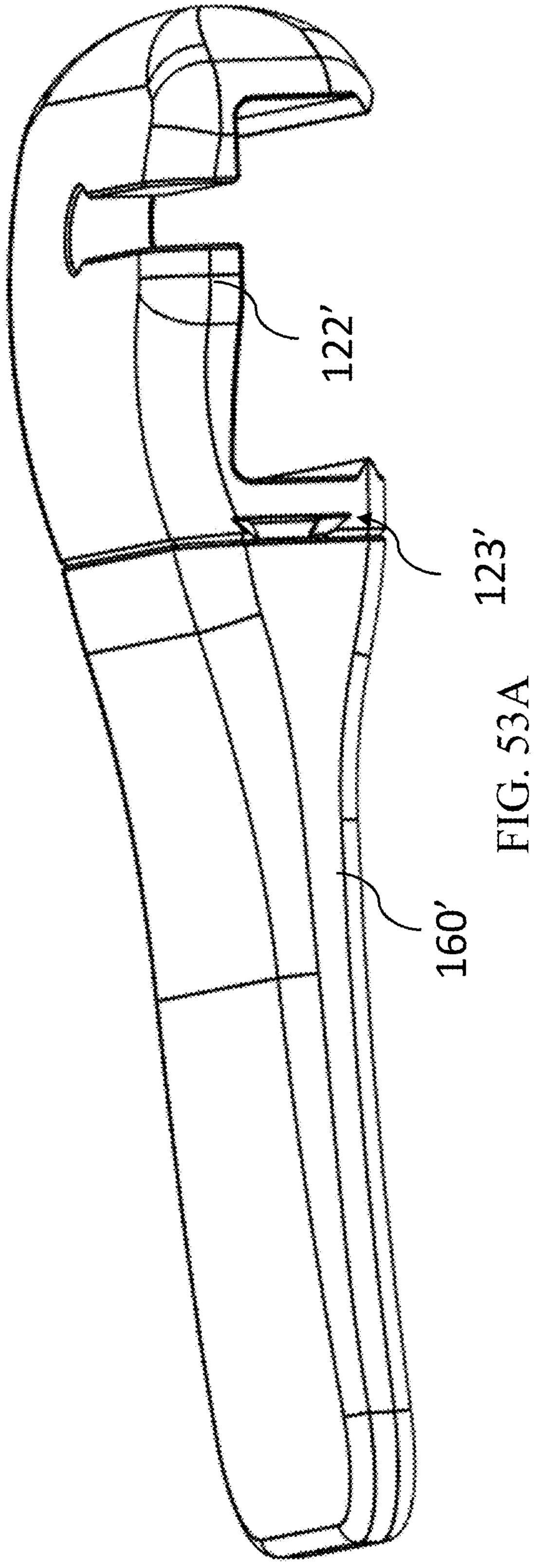
FIGS. 53A and 53B show the connection between the leg extensions and the pelvic bolster assembly.
Figure 53B:
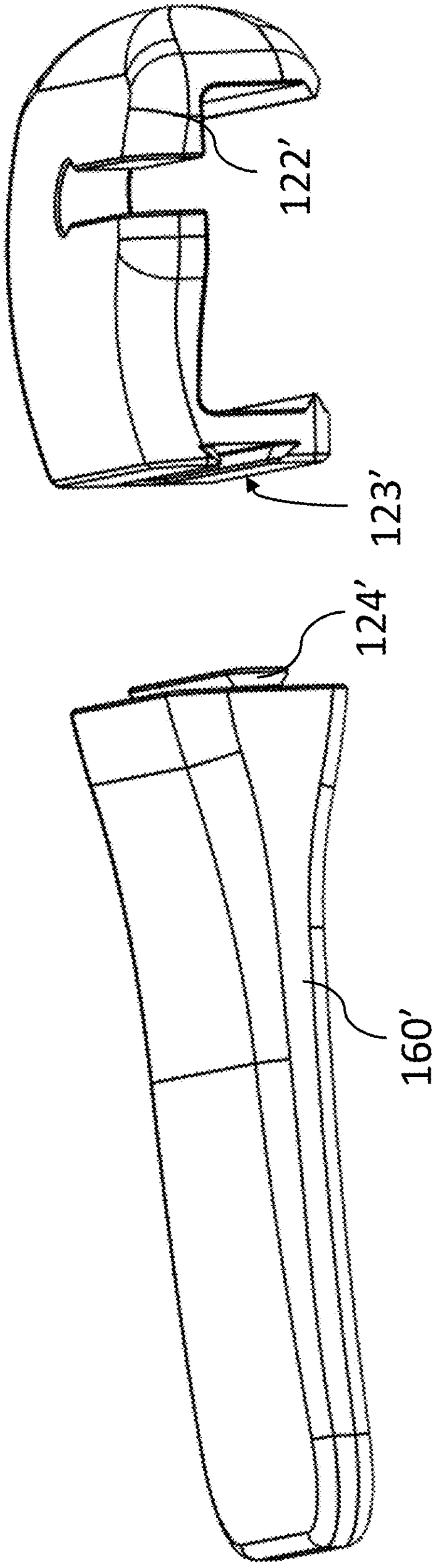

Specifically, as shown in FIGS. 50A through 50C, the interchangeable leg extensions 160' may be provided to allow neutral positioning N (FIG. 50A), positioning at a 45° angle (FIG. 50B), or at a 90° angle (FIG. 50C). As shown in FIGS. 52A through 52C, the leg extensions 160' may be slid onto the pelvic support pads 122' in a similar fashion to the attachment of the rib extensions 222' to the thoracic support pads 22'. That is, the pelvic support pads 122' may each define a channel or mortice 123' for receiving an extension or tenon 124' of the leg extensions 160'. As seen in FIGS. 53A and 53B, a dovetail joint may be formed between the tenon 124' of the leg extensions 160' and the mortice 123' of the support pads 122' when the leg extensions 160' are received and engaged by the support pads 122'. It will be appreciated that this connection can also be reversed (i.e., the tenon may be provided on the pelvic support pad 122' with the mortice 123' on the leg extension 160'), or any other suitable connection method may be used.

Figure 56A:
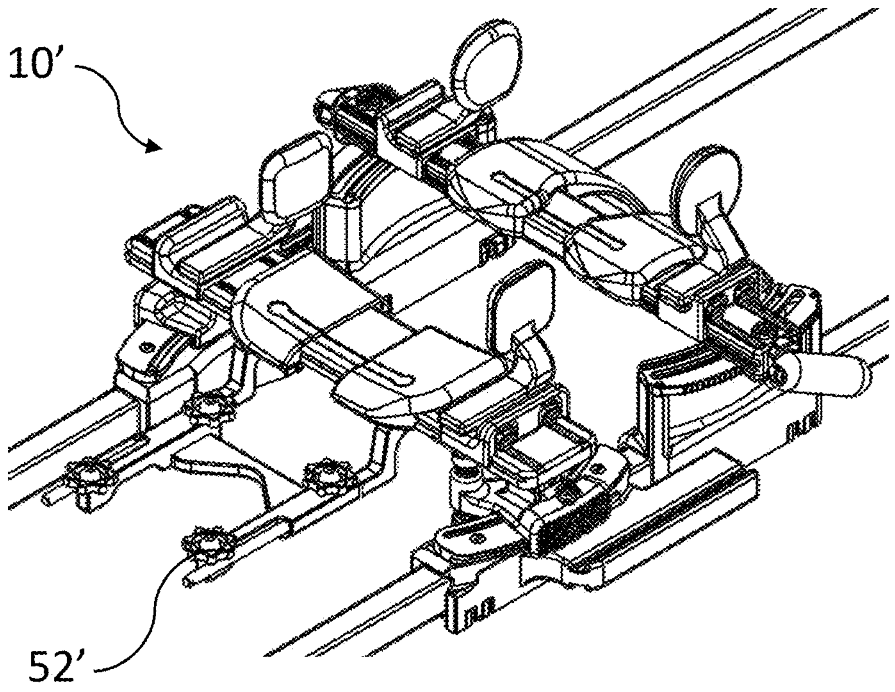
FIGS. 56A through 56D show embodiments of a head rest or head support portion attachable to the patient positioning system of FIG. 28.
Figure 56B:
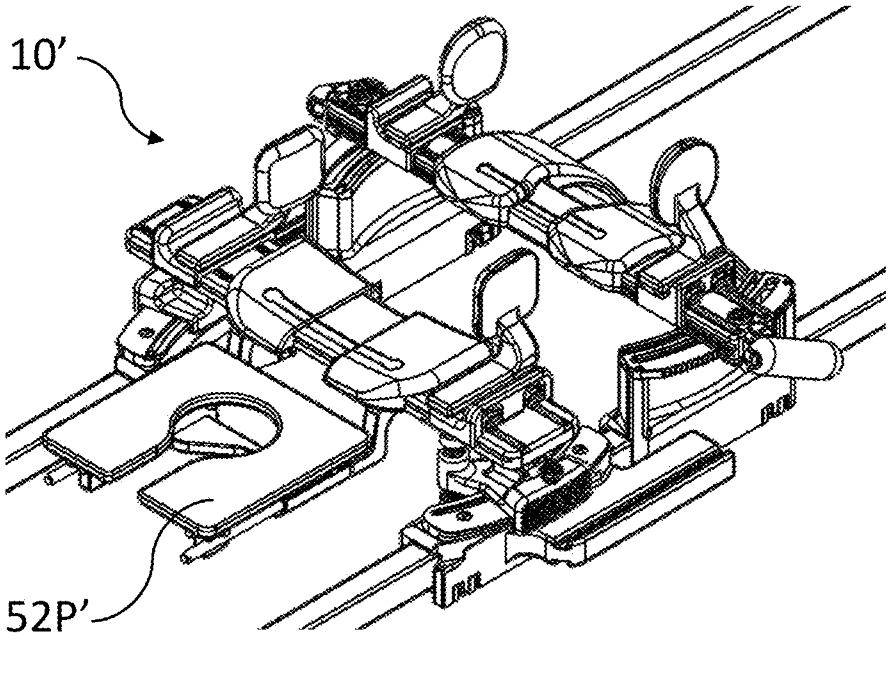
Figure 56C:
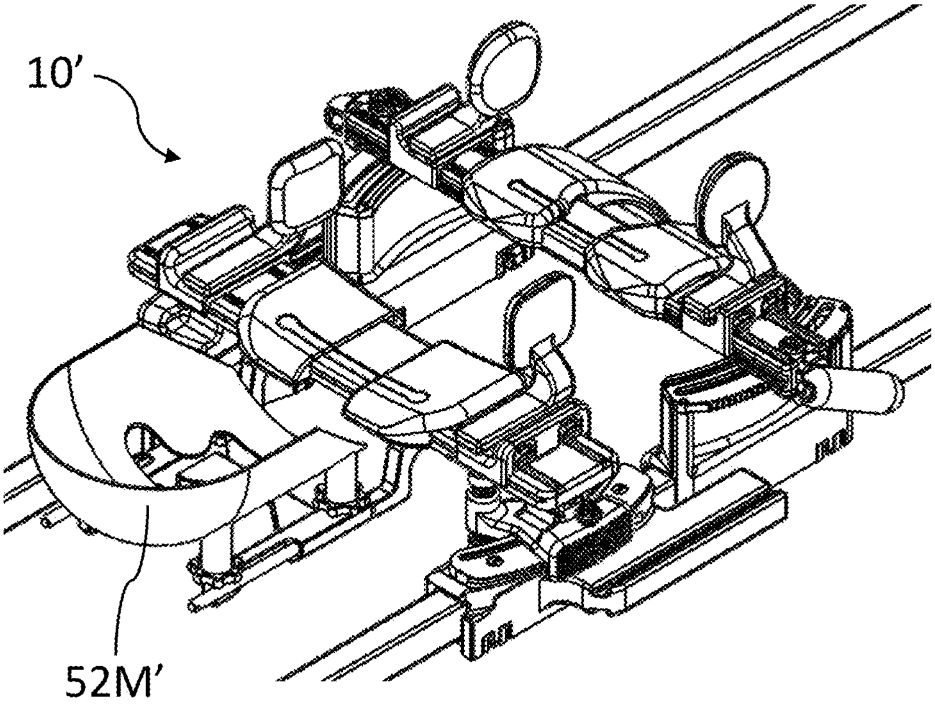
Figure 56D:
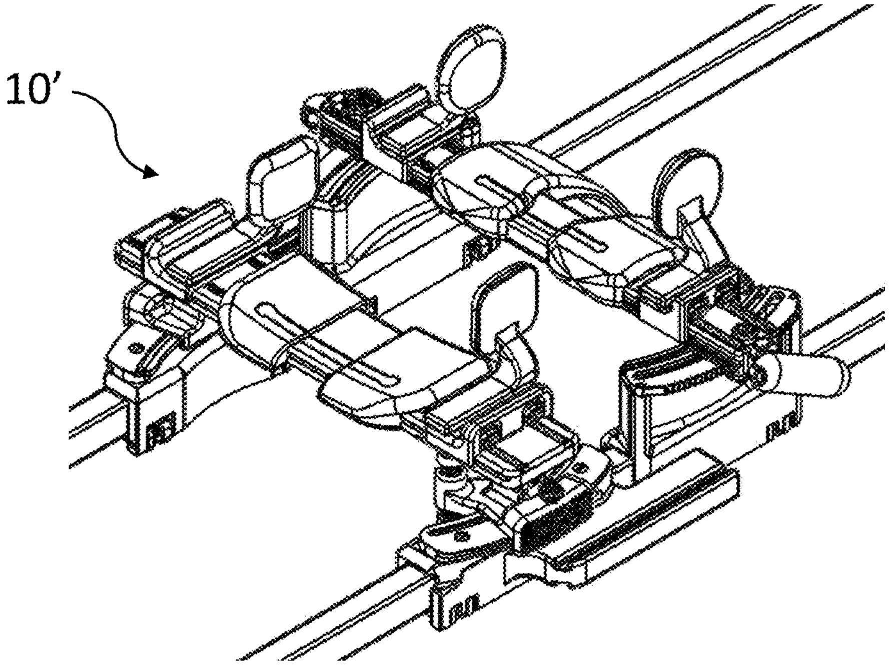

FIGS. 56A through 56D show embodiments of a head rest or head support portion 52' attachable to the patient positioning system 10' of FIG. 28. The head support portion 52' may be attachable to the thoracic bolster assembly 30', such as attachable to the deck 56' of the thoracic bolster assembly 30'. The head support portion 52' may interchangeably receive a pad 52P' (FIG. 56B), a mask 52M' (FIG. 56C), or any other suitable type of pad, etc. Or, in other embodiments, the head support portion 52' may not be included in the patient positioning system (FIG. 56D).

Regardless of the form, the head support portion 52' may include a frame 52F' (FIG. 57A), attachment mechanisms 52C', and adjustment knobs 51'. The frame 52F' may support and receive the pad 52P' or the mask 52M' or any other suitable interchangeable support. The adjustment knobs 51' may be actuated to angularly adjust the frame 52F', such as to lift or lower portions of the frame 52F'. The frame 52F' may be connectable to the thoracic bolster assembly 30' through the attachment mechanisms 52C'.

Figure 57A:
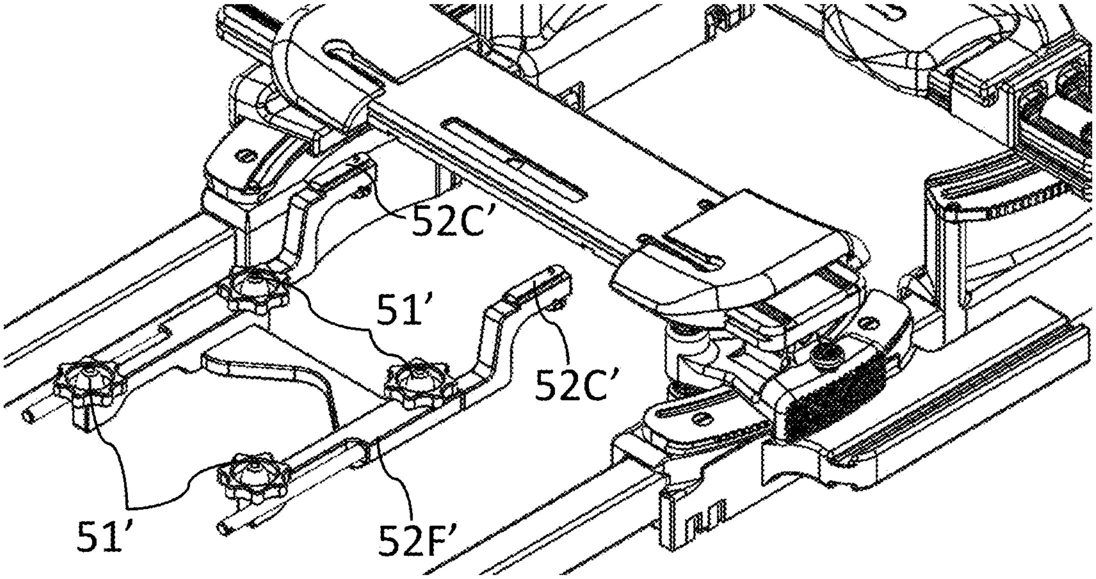
FIGS. 57A through 57C show attachment of the head support portion to the thoracic bolster assembly.
Figure 57B:
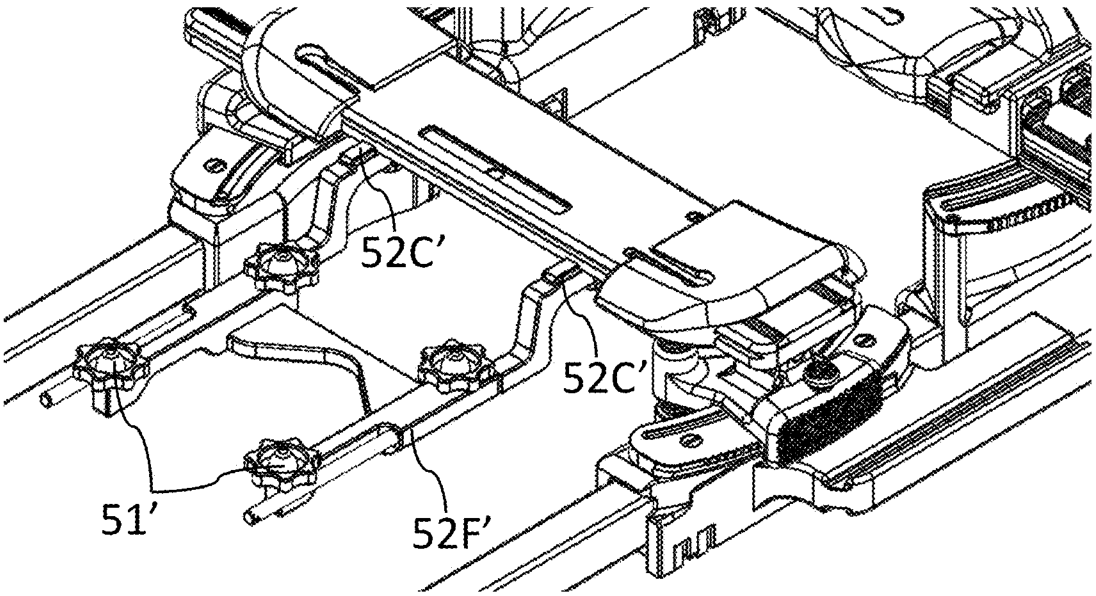
Figure 57C:
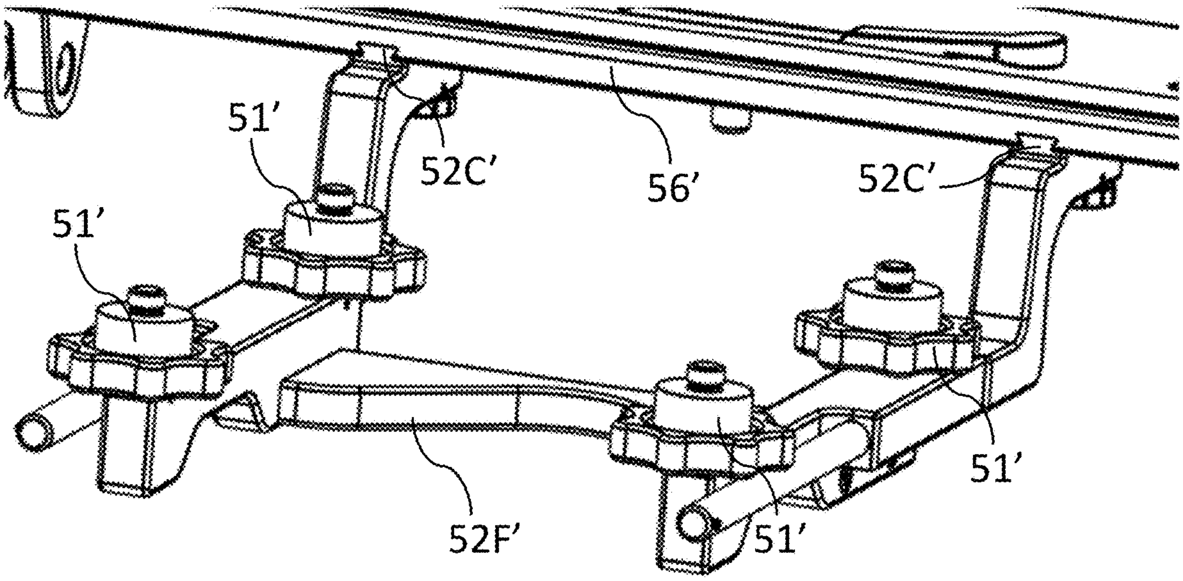
Figure 58A:
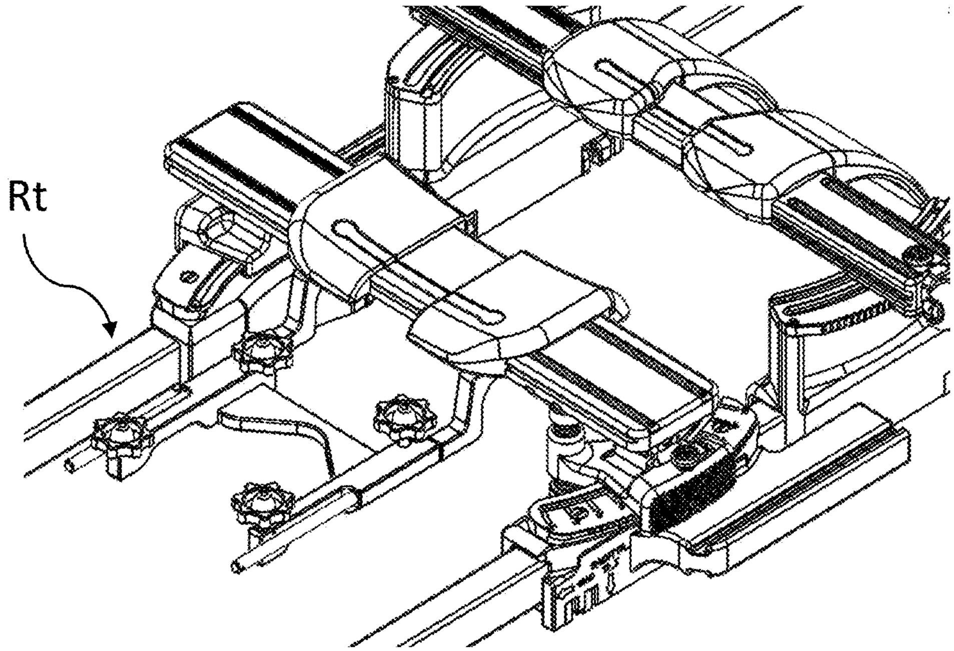
FIGS. 58A and 58B show extension (FIG. 58B) and retraction (FIG. 58A) of the head support portion.
Figure 58B:
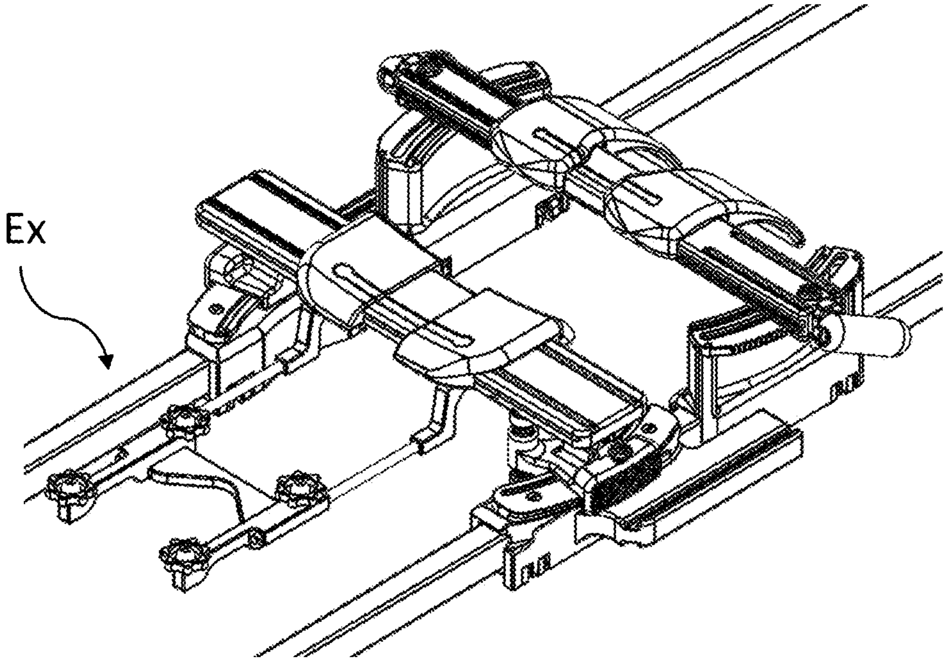

For example, referring to FIGS. 57A through 57C, the attachment mechanism 52C' may be a tenon that slides into a mortice defined in a bottom of the deck 56' of the thoracic bolster assembly 30'. As with other joints or connections, the attachment mechanism 52C' may form a dovetail joint with the deck 56'. This may allow for quick and easy attachment of the head support portion 52' when it is desirous to have a head support portion 52'. As shown in FIGS. 58A and 58B, the head support portion 52' may be extendable relative to the thoracic bolster assembly 30'. The head support portion 52' may be extendable from a retracted Rt position (FIG. 58A) to an extended Ex position (FIG. 58B), in order to accommodate larger and/or taller patients.

Figure 59:
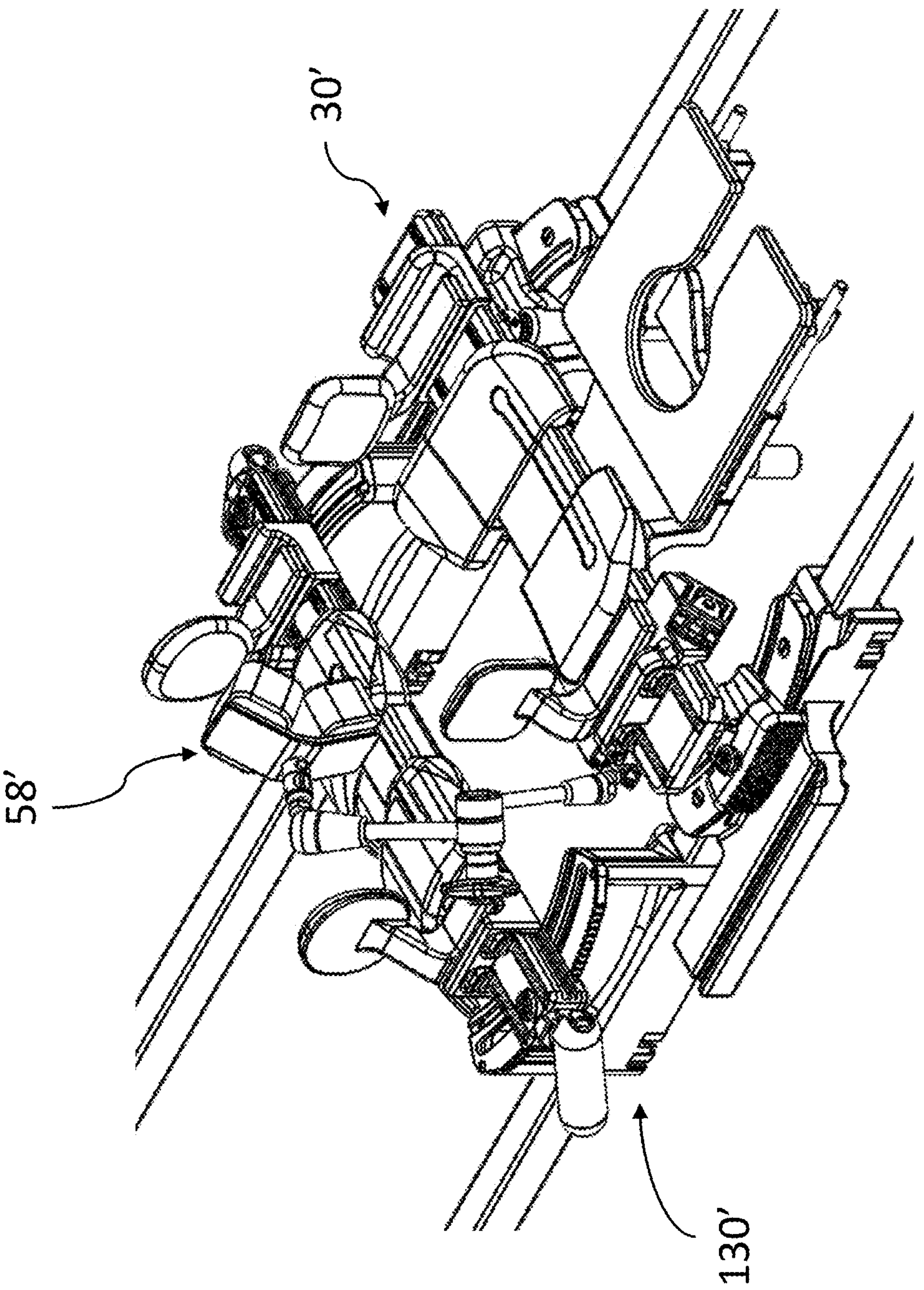
FIG. 59 is a perspective view of the patient positioning system of FIG. 28 with a support arm attached on one side.

FIG. 59 illustrates the use of an auxiliary support arm similar to what has been discussed above with respect to other embodiments. In this illustrated embodiment, arm 58', which may be an articulating arm, may be secured to thoracic bolster assembly 30' with the point of attachment being at the base of one of the lateral paddles 59'. The engagement between the proximal end of the arm 58' and the base of the lateral paddle 59' is releasable meaning that the arm 58' may be attached to the lateral paddle 59' only if needed and may be secured after the patient has been placed in the patient positioner. Furthermore, the arm 58' may be removed from the patient positioner if it is determined to not be necessary during the surgical procedure.

In some embodiments, the arm 58' may be releasably secured to the thoracic bolster itself, i.e., to a portion of the top patient support separate from the lateral paddle 59'. In some embodiments, the arm 58' may be releasably or non-releasably secured to a carriage configured to slide into place on the thoracic bolster assembly 30' in a manner similar to the lateral paddle 59'. Such a slidable carriage may be used instead of or in addition to the lateral paddle 59'. The slidable carriage may alternatively be positioned on the pelvic bolster assembly 130'.

Embodiments

The following embodiments are provided as examples only of specific configurations, materials, arrangements, etc. contemplated by the authors of this disclosure:

Embodiment 1: A patient positioning system, comprising:

a thoracic bolster assembly comprising:

- a base comprised of a lower portion and an upper portion, the upper portion in rotatable connection with the lower portion to adjust the upper portion in a coronal plane,
- a top patient support portion pivotably connected to the base,
- a vertical adjustment mechanism in connection with the base and the top patient support portion configured to adjust an angular orientation of the top patient support portion relative to the base, and
- a removably attachable arm in connection with the top patient support portion, the removably attachable arm being adjustable; and a pelvic bolster assembly comprising:

- a base comprised of a lower portion and an upper portion, the upper portion in rotatable connection with the lower portion to adjust the upper portion in a coronal plane.

Embodiment 2: The patient positioning system of Embodiment 1, wherein the top patient support portion is comprised of a base plate and a top plate that are in sliding engagement with each other.

Embodiment 3: The patient positioning system of Embodiment 1 or 2, wherein the thoracic bolster assembly further comprises a thoracic lateral paddle.

Embodiment 4: The patient positioning system of any one of Embodiments 1-3, wherein the pelvic bolster assembly further comprises a first lateral pelvic paddle and a second lateral pelvic paddle.

Embodiment 5: The patient positioning system of Embodiment 3 or 4, wherein at least one of the thoracic lateral paddle, first lateral pelvic paddle, and second lateral pelvic paddle is removable.

Embodiment 6: The patient positioning system of any one of Embodiments 1-5, wherein at least one of the first lateral pelvic paddle and second lateral pelvic paddle comprise a shaped paddle that forms an opening for pelvic access.

Embodiment 7: The patient positioning system of any one of Embodiments 1-6, wherein the thoracic bolster assembly further comprises a head support coupled to the top patient support portion.

Embodiment 8: The patient positioning system of Embodiment 7, further comprising one or more handles attached to the head support.

Embodiment 9: The patient positioning system of Embodiment 7 or 8, wherein a length of the head support is adjustable relative to the thoracic bolster assembly.

Embodiment 10: The patient positioning system of Embodiment 5, wherein at least one of the thoracic lateral paddle, first lateral pelvic paddle, and second lateral pelvic paddle further comprises a deformable pad removably attached thereto.

Embodiment 11: The patient positioning system of any one of Embodiments 1-10, wherein the removably attachable arm in connection with the top patient support portion is adjustable at at least two points.

Embodiment 12: The patient positioning system Embodiment 5, wherein the first lateral pelvic paddle and the second lateral pelvic paddle are adjustable in the coronal plane and a sagittal plane.

Embodiment 13: The patient positioning system of any one of Embodiments 1-12, further comprising a quick-release handle secured to the top patient support portion that, when depressed, allows the top patient support portion to freely rotate relative to the base of the thoracic bolster assembly.

Embodiment 14: The patient positioning system of any one of Embodiments 1-13, wherein the base of each of the pelvic bolster assembly and of the thoracic bolster assembly is configured to be removably attached to a pair of parallel, rigid rails of a surgical frame.

Embodiment 15: A method of positioning a patient prior to surgery, the method comprising:

- placing on a surgical frame a patient positioning system comprising:
  - a thoracic bolster assembly comprising:
    - a base configured to be removably attached to the surgical frame, the base comprised of a lower portion and an upper portion, the upper portion in rotatable connection with the lower portion to adjust the upper portion in a coronal plane,
    - a top patient support portion pivotably connected to the base, the top patient support portion including a head support extending in a cephalad direction from the top patient support and being adjustable in a cephalad/caudal direction relative to the top patient support portion,
    - a vertical adjustment mechanism in connection with the base and the top patient support portion configured to adjust an angular orientation of the top patient support portion relative to the base, and
  - a pelvic bolster assembly comprising:
    - a base configured to be removably attached to the surgical frame, the base comprised of a lower portion and an upper portion, the upper portion in rotatable connection with the lower portion to adjust the upper portion in a coronal plane.
- adjusting a distance between the thoracic bolster assembly and the pelvic bolster assembly, the distance being based on the size and/or height of the patient;
- adjusting a cephalad/caudal position of the head support relative to the top patient support portion, the cephalad/caudal position being based on the size and/or height of the patient;
- placing the patient in a supine position on the patient positioning system;
- securing a removably attachable arm to a first side of the top patient support portion;
- securing a thoracic paddle to a second side of the top patient support portion;
- securing a pair of pelvic paddles to opposite sides of the upper portion of the pelvic bolster assembly;
- adjusting each of the arm, thoracic paddle, and pelvic paddles to properly secure the patient in the patient positioning system;
- rotating one or both of the thoracic and pelvic bolster assemblies in the coronal plane of the patient; and
- pivoting the top patient support portion relative to the base of the thoracic bolster assembly.

Embodiment 16: The method of Embodiment 15, wherein rotating the thoracic pelvic bolster comprises activating a quick-release mechanism that is accessible through a surgical drape.

Embodiment 17: The method of Embodiment 16, wherein the quick-release mechanism is a lever that can be depressed through a surgical drape.

Embodiment 18: The method of Embodiment 15, wherein rotating the thoracic pelvic bolster comprises activating a quick-release mechanism that is within the sterile field.

Embodiment 19: A patient positioning system, comprising:

- a thoracic bolster assembly comprising:
  - a base comprised of a lower portion and an upper portion, the lower portion configured to be removably secured to a pair of rails of a bed frame, the upper portion in rotatable connection with the lower portion to adjust the upper portion in a coronal plane,
  - a top patient support portion pivotably connected to the base,
  - an angular adjustment mechanism in connection with the base and the top patient support portion configured to adjust an angular orientation of the top patient support portion relative to the base, and
  - a first plurality of patient supports each slidably positionable on the top patient support portion; and
- a pelvic bolster assembly comprising:
  - a base comprised of a lower portion and an upper portion, the lower portion configured to be removably secured to the pair of rails of the bed frame, the upper portion in rotatable connection with the lower portion to adjust the upper portion in a coronal plane, and
  - a second plurality of patient supports each slidably positionable on the upper portion.

Embodiment 20: The patient positioning system of Embodiment 19, wherein the first plurality of patient supports comprises a chest support and first and second thoracic paddles.

Embodiment 21: The patient positioning system of Embodiment 20, wherein the chest support comprises a pair of chest pads separated by a first predetermined distance from each other on the top patient support portion of the thoracic bolster assembly.

Embodiment 22: The patient positioning system of Embodiment 21, wherein the first predetermined distance is based on a first physiological aspect of the patient.

Embodiment 23: The patient positioning system of either one of Embodiment 21 or 22, wherein the first predetermined distance is achieved using a first removable spacer configured to be removably secured to the pair of chest pads.

Embodiment 24: The patient positioning system of any one of Embodiments 20-23, wherein the chest support further comprises a pair of removable rib extensions, each rib extension in sliding engagement with a respective chest pad.

Embodiment 25: The patient positioning system of Embodiment 24, wherein the sliding engagement comprises a dovetail design.

Embodiment 26: The patient positioning system of any one of Embodiments 19-25, wherein the second plurality of patient supports comprises a pelvic support and first and second pelvic paddles.

Embodiment 27: The patient positioning system of Embodiment 26, wherein the pelvic support comprises a pair of pelvic pads separated by a second predetermined distance from each other on the upper portion of the pelvic bolster assembly.

Embodiment 28: The patient positioning system of Embodiment 27, wherein the second predetermined distance is based on a second physiological aspect of the patient.

Embodiment 29: The patient positioning system of either one of Embodiment 27 or 28, wherein the second predetermined distance is achieved using a second removable spacer configured to be removably secured to the pair of pelvic pads.

Embodiment 30: The patient positioning system of any one of Embodiments 26-29, wherein the pelvic support further comprises a pair of removable leg extensions, each leg extension in sliding engagement with a respective pelvic pad.

Embodiment 31: The patient positioning system of Embodiment 30, wherein the removable leg extensions are curved downward away from the patient.

Embodiment 32: The patient positioning system of either one of Embodiment 30 or 31, wherein the sliding engagement comprises a dovetail design.

Embodiment 33: The patient positioning system of any one of Embodiments 26-32, wherein at least one of the pelvic paddles includes a doughnut-shaped pad configured to engage the patient's hip.

Embodiment 34: The patient positioning system of any one of Embodiments 19-33, further comprising a head support secured to the thoracic bolster assembly, the head support comprising a base portion and a support portion in sliding relation to the base portion to accommodate patients of different sizes.

Embodiment 35: The patient positioning system of any one of Embodiments 19-34, wherein each of the thoracic and pelvic bolster assemblies includes at least one locking release mechanism positioned laterally relatively to the patient positioning system, the at least one locking release mechanism configured to lock the angular orientation of the respective thoracic and pelvic bolster assemblies.

Embodiment 36: The patient positioning system of Embodiment 35, wherein the at least one locking release mechanism comprises a locking release mechanism positioned on each lateral side of both the thoracic and pelvic bolster assemblies.

Embodiment 37: The patient positioning system of any one of Embodiments 19-36, wherein the lower portion of the base of the thoracic bolster comprises a pair of rail adaptors for removable engagement with a pair of parallel rails of a support frame, each of the rail adaptors positioned laterally relative to the patient positioning system.

Embodiment 38: The patient positioning system of Embodiment 37, wherein the upper portion comprises a pair of supports pivotally attached to an elongated surface that extends from a first lateral side to a second lateral side with one support positioned near the first lateral side and the other support positioned near the second lateral side, each support configured to rotationally engage a respective rail adaptor to allow the elongated surface to rotate in the coronal plane.

Embodiment 39: The patient positioning system of any one of Embodiments 19-38, wherein the angular adjustment mechanism is positioned toward a lateral side of the patient.

Embodiment 40: The patient positioning system of any one of Embodiments 19-39, wherein the lower portion of the base of the pelvic bolster comprises a pair of rail adaptors for removable engagement with a pair of rails of a bed frame, each of the rail adaptors positioned laterally relative to the patient positioning system.

Embodiment 41: The patient positioning system of Embodiment 40, wherein the upper portion comprises an elongated surface that extends from a first lateral side to a second lateral side with each lateral side configured to rotationally engage a respective rail adaptor to allow the elongated surface to rotate in the coronal plane.

Embodiment 42: The patient positioning system of any one of Embodiments 19-41, wherein the thoracic and pelvic bolster assemblies comprise one or more radiolucent materials and are configured to minimize radiographic artifacts near a center line of the patient.

Embodiment 43: The patient positioning system of any one of Embodiments 19-42, further comprising at least one side rail secured to at least one lateral side of the base of the thoracic bolster assembly and the base of the pelvic bolster assembly.

Embodiment 44: The patient positioning system of Embodiment 43, wherein the at least one side rail is secured to a lateral side of the base of the thoracic bolster assembly and extends toward the pelvic bolster assembly while providing a clearance between the at least one side rail and a parallel rail of a bed frame to allow for a portion of the pelvic bolster assembly to be positioned within the clearance.

Embodiment 45: The patient positioning system of any one of Embodiments 19-44, further comprising an articulating support comprising an articulating arm and a rib support, the articulating arm having a proximal end and a distal end with the rib support positioned at the distal end.

Embodiment 46: The patient positioning system of any one of Embodiments 19-45, wherein the proximal end of the articulating arm is secured to the patient positioning system via a carriage slidably secured to the thoracic bolster assembly or the pelvic bolster assembly.

Embodiment 47: The patient positioning system of any one of Embodiments 19-45, wherein the proximal end of the articulating arm is secured to the patient positioning system via a receiving aperture on the thoracic bolster assembly or on the pelvic bolster assembly.

The various embodiments described above, including elements of the various embodiments described above, can be combined to provide further embodiments. Various portions and components of apparatus within the scope of this disclosure, including for example, structural components, can be formed by one or more various suitable manufacturing processes known to those in the art. Similarly, various portions and components of apparatuses within the scope of this disclosure can be made from suitable materials known to those in the art.

Exemplary embodiments of the present disclosure will be described in detail with reference to the accompanying drawings. Advantages and features of the present disclosure and methods accomplishing them will become apparent from the following description of exemplary embodiments with reference to the accompanying drawings.

It will be appreciated that various aspects discussed in reference to one drawing may be present and/or used in conjunction with the embodiment shown in another drawing, and each element shown in multiple drawings may be discussed only once.

Reference in the specification to "one configuration," "one embodiment," "a configuration," or "an embodiment" means that a particular feature, structure, or characteristic described in connection with the configuration is included in at least one configuration, but is not a requirement that such feature, structure, or characteristic be present in any particular configuration unless expressly set forth in the embodiments as being present.

Furthermore, the described features, structures, or characteristics of configurations of the disclosed subject matter may be combined in any suitable manner in one or more configurations. Configurations of the disclosed subject matter may be practiced without one or more of the specific details, or with other methods, components, materials, and so forth. In other instances, well-known structures, materials, or operations are not shown or described in detail to avoid obscuring aspects of the invention.

It should also be noted that, as used in this specification and the appended embodiments, singular forms such as "a," "an," and "the" may include the plural unless the context clearly dictates otherwise. Thus, for example, reference to "a base" may include one or more of such bases, and reference to "the bolster" may include reference to one or more of such bolsters.

As used herein, a plurality of items, structural elements, compositional elements, and/or materials may be presented in a common list for convenience. However, these lists should be construed as though each member of the list is individually identified as a separate and unique member. Unless otherwise indicated, all numbers expressing quantities used in the specification and embodiments are to be understood as being modified in all instances by the term "about." Accordingly, unless indicated to the contrary, the numerical parameters set forth in the specification and attached embodiments are approximations that may vary depending upon the desired properties sought to be obtained by the embodiments of the present disclosure. At the very least, and not as an attempt to limit the application of the doctrine of equivalents to the scope of the embodiments, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

As used herein, a "coronal plane" refers to a plane dividing the body into anterior and posterior parts, and any plane parallel to the coronal plane. A "sagittal plane" refers to a plane dividing the body into left and right parts, and any plane parallel to the sagittal plane. A "sagittal axis" refers to a rotational axis lying in the sagittal plane.

The above description has set out various features, functions, methods, and other aspects of the disclosure. Time and further development may change the manner in which the various aspects are implemented. The scope of protection defined by the claims is not intended to be limited to the specific sizes, shapes, features, or other aspects of the disclosed embodiments. The claimed inventions may be implemented or embodied in other forms while still being within the scopes of the concepts disclosed hereby. Also included are equivalents of the elements of the claims that can be made without departing from the scopes of concepts properly protected by the claims that follow.

What is claimed:

1. A patient positioning system, comprising:

a thoracic bolster assembly comprising:

a base comprised of a lower portion and an upper portion, the lower portion configured to be removably secured to a pair of rails of a bed frame, the upper portion in rotatable connection with the lower portion to adjust the upper portion in a coronal plane, a top patient support portion pivotably connected to the base, an angular adjustment mechanism in connection with the base and the top patient support portion configured to adjust an angular orientation of the top patient support portion relative to the base, a first plurality of patient supports each slidably positionable on the top patient support portion, the first plurality of patient supports comprising a chest support comprised of a pair of chest pads slidably adjustable relative to each other based on a first physiological aspect of the patient the pair of chest pads each lockable in relation to the top patient support portion; and a pelvic bolster assembly comprising:

a base comprised of a lower portion and an upper portion, the lower portion configured to be removably secured to the pair of rails of the bed frame, the upper portion in rotatable connection with the lower portion to adjust the upper portion in a coronal plane, and a second plurality of patient supports each slidably positionable on the upper portion.

2. The patient positioning system of claim 1, wherein the first plurality of patient supports further comprises first and second thoracic paddles.

3. The patient positioning system of claim 2, wherein the chest support further comprises a pair of removable rib extensions, each rib extension in sliding engagement with a respective chest pad.

4. The patient positioning system of claim 1, wherein the pair of chest pads is separated by a first predetermined distance from each other on the top patient support portion of the thoracic bolster assembly.

5. The patient positioning system of claim 4, wherein the first predetermined distance is based on the first physiological aspect of the patient.

6. The patient positioning system of claim 4, wherein the first predetermined distance is achieved using a first removable spacer configured to be removably secured to the pair of chest pads.

7. The patient positioning system of claim 1, wherein the second plurality of patient supports comprises a pelvic support and first and second pelvic paddles.

8. The patient positioning system of claim 7, wherein the pelvic support comprises a pair of pelvic pads separated by a second predetermined distance from each other on the upper portion of the pelvic bolster assembly.

9. The patient positioning system of claim 8, wherein the second predetermined distance is based on a second physiological aspect of the patient.

10. The patient positioning system of claim 8, wherein the second predetermined distance is achieved using a second removable spacer configured to be removably secured to the pair of pelvic pads.

11. The patient positioning system of claim 7, wherein the pelvic support further comprises a pair of removable leg extensions, each leg extension in sliding engagement with a respective pelvic pad.

12. The patient positioning system of claim 11, wherein the removable leg extensions are curved downward away from the patient.

13. The patient positioning system of claim 1, further comprising a head support secured to the thoracic bolster assembly, the head support comprising a base portion and a support portion in sliding relation to the base portion to accommodate patients of different sizes.

14. The patient positioning system of claim 1, wherein the lower portion of the base of the thoracic bolster assembly comprises a pair of rail adaptors for removable engagement with a pair of parallel rails of a support frame, each of the rail adaptors positioned laterally relative to the patient positioning system.

15. The patient positioning system of claim 14, wherein the upper portion of the base of the thoracic bolster assembly comprises a pair of supports pivotally attached to an elongated surface that extends from a first lateral side to a second lateral side with one support positioned near the first lateral side and the other support positioned near the second lateral side, each support configured to rotationally engage a respective rail adaptor to allow the elongated surface to rotate in the coronal plane.

16. The patient positioning system of claim 1, wherein the angular adjustment mechanism is positioned toward a lateral side of the patient.

17. The patient positioning system of claim 1, wherein the lower portion of the base of the pelvic bolster assembly comprises a pair of rail adaptors for removable engagement with a pair of rails of a bed frame, each of the rail adaptors positioned laterally relative to the patient positioning system; and wherein the upper portion of the base of the pelvic bolster assembly comprises an elongated surface that extends from a first lateral side to a second lateral side with each lateral side configured to rotationally engage a respective rail adaptor to allow the elongated surface to rotate in the coronal plane.

18. The patient positioning system of claim 1, further comprising an articulating support comprising an articulating arm and a rib support, the articulating arm having a proximal end and a distal end with the rib support positioned at the distal end.

19. The patient positioning system of claim 18, wherein the proximal end of the articulating arm is secured to the patient positioning system via a carriage slidably secured to the thoracic bolster assembly or the pelvic bolster assembly.

20. The patient positioning system of claim 18, wherein the proximal end of the articulating arm is secured to the patient positioning system via a receiving aperture on the thoracic bolster assembly or on the pelvic bolster assembly.

* * * * *